United States Patent [19]
Kurose et al.

[11] Patent Number: 5,510,140
[45] Date of Patent: Apr. 23, 1996

[54] METHOD FOR PREPARING MAGNETIC RECORDING MEDIUM

[75] Inventors: Shigeo Kurose; Yoshihiro Honjo; Akira Somiya, all of Nagano, Japan

[73] Assignee: TDK Corporation, Tokyo, Japan

[21] Appl. No.: 353,215

[22] Filed: Dec. 1, 1994

[30] Foreign Application Priority Data

| Dec. 1, 1993 | [JP] | Japan | 5-329943 |
|---|---|---|---|
| Dec. 1, 1993 | [JP] | Japan | 5-329944 |
| Dec. 9, 1993 | [JP] | Japan | 5-340794 |
| Dec. 13, 1993 | [JP] | Japan | 5-341819 |
| Dec. 22, 1993 | [JP] | Japan | 5-346251 |
| Feb. 25, 1994 | [JP] | Japan | 6-052736 |
| Feb. 25, 1994 | [JP] | Japan | 6-052737 |
| Feb. 25, 1994 | [JP] | Japan | 6-052738 |
| Feb. 25, 1994 | [JP] | Japan | 6-052739 |

[51] Int. Cl.$^6$ ............................................ B05D 3/12
[52] U.S. Cl. ...................... 427/131; 427/209; 427/407.1
[58] Field of Search ................ 427/131, 209, 427/407.1

[56] References Cited

FOREIGN PATENT DOCUMENTS

| 53-133405 | 11/1978 | Japan . |
|---|---|---|
| 54-143118 | 11/1979 | Japan . |
| 57-147134 | 9/1982 | Japan . |
| 58-102332 | 6/1983 | Japan . |
| 59-58631 | 4/1984 | Japan . |
| 59-117737 | 7/1984 | Japan . |
| 59-185027 | 10/1984 | Japan . |
| 60-69833 | 4/1985 | Japan . |
| 61-82331 | 4/1986 | Japan . |
| 61-122927 | 6/1986 | Japan . |
| 61-248230 | 11/1986 | Japan . |
| 62-6440 | 1/1987 | Japan . |
| 62-134827 | 6/1987 | Japan . |
| 62-258716 | 11/1987 | Japan . |
| 63-217528 | 9/1988 | Japan . |
| 1-106331 | 4/1989 | Japan . |
| 2-87326 | 3/1990 | Japan . |
| 2-240830 | 9/1990 | Japan . |
| 2-270125 | 11/1990 | Japan . |
| 3-3116 | 1/1991 | Japan . |
| 3-119516 | 5/1991 | Japan . |

OTHER PUBLICATIONS

Pall News, P-52, 1984, 3 pages (no month avail.).
Pall News, P-57, 1985, 3 pages (no month avail.).

*Primary Examiner*—Bernard Pianalto
*Attorney, Agent, or Firm*—Oblon, Spivak, McClelland, Maier & Neustadt

[57] ABSTRACT

A first object of the invention is to provide a magnetic recording medium having minimized dropouts immediately after preparation, a reduced dropout increase and an electromagnetic property loss with the lapse of time, and good durability of coatings such as a magnetic layer. A second object is to provide a magnetic recording medium including a backcoat layer having high durability and antistatic effect in addition to the above advantages. A third object is to achieve a productivity increase and a cost reduction in the manufacture of such a magnetic recording medium. To attain these objects, the invention provides a method for preparing a magnetic recording medium comprising a kneading step of kneading solids and a binder solution, a dispersing step of dispersing the solids in the compound resulting from the kneading step, and a viscosity adjusting step of adding a viscosity adjusting solution to the dispersion resulting from the dispersing step to form a paint composition wherein filtering steps are included after the steps for filtering fluids to be filtered (including the binder solution, compound, dispersion, viscosity adjusting solution, and paint) and a filter means having a 95% cut filtration precision within a specific range is used in each of the filtering steps.

43 Claims, 7 Drawing Sheets

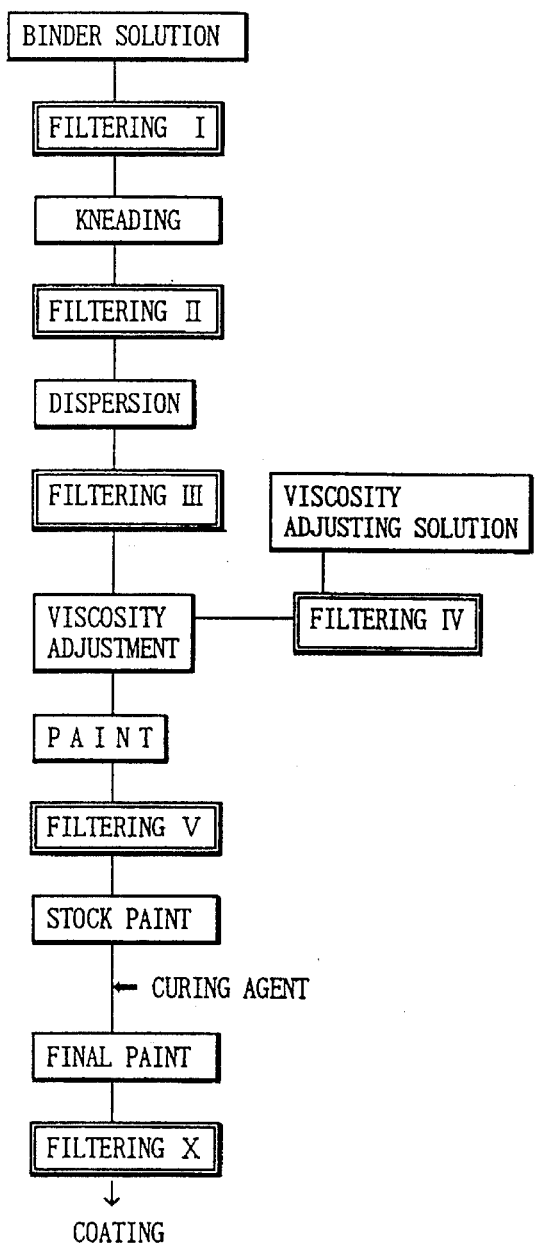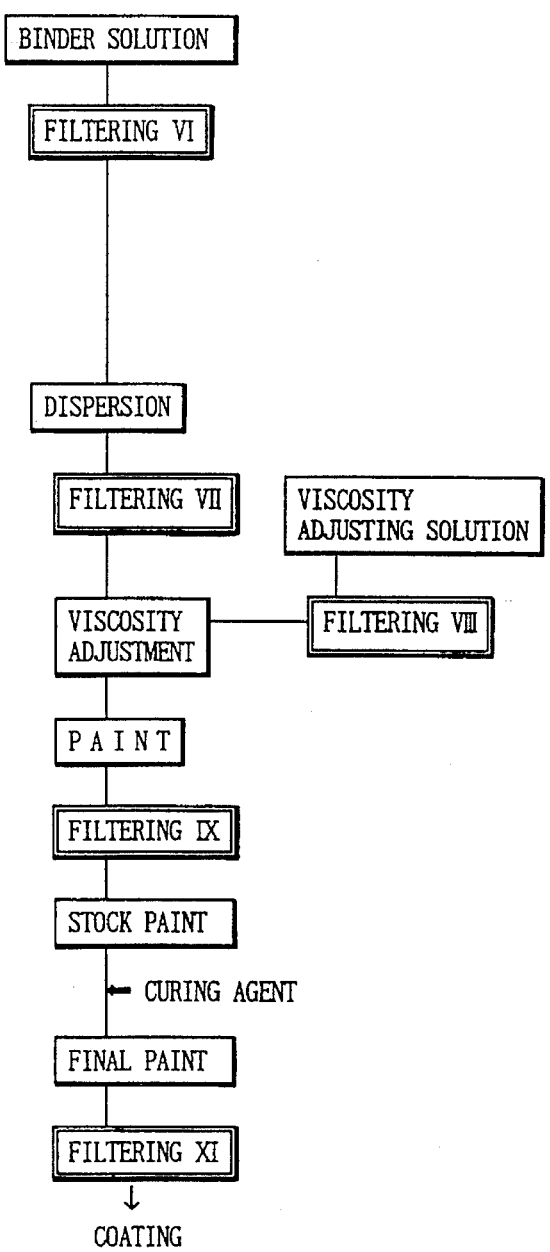

F I G. 6
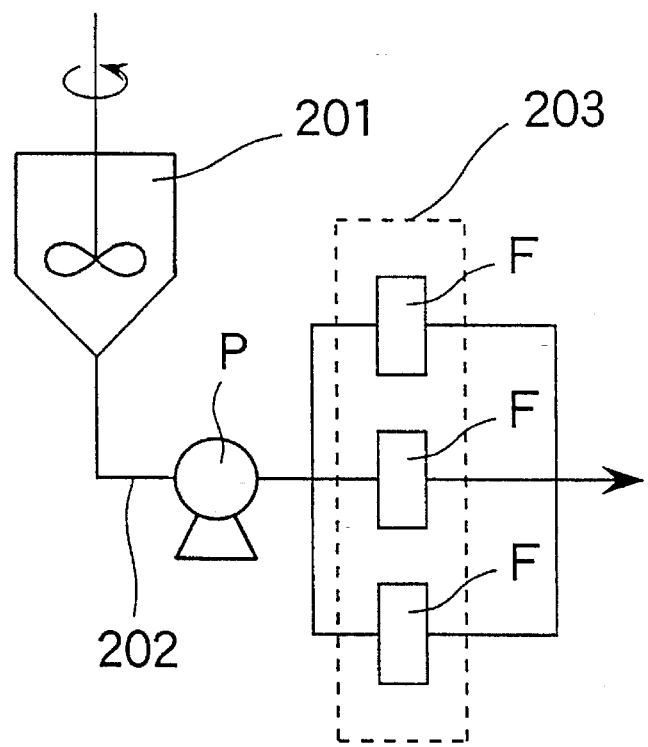
F I G. 7
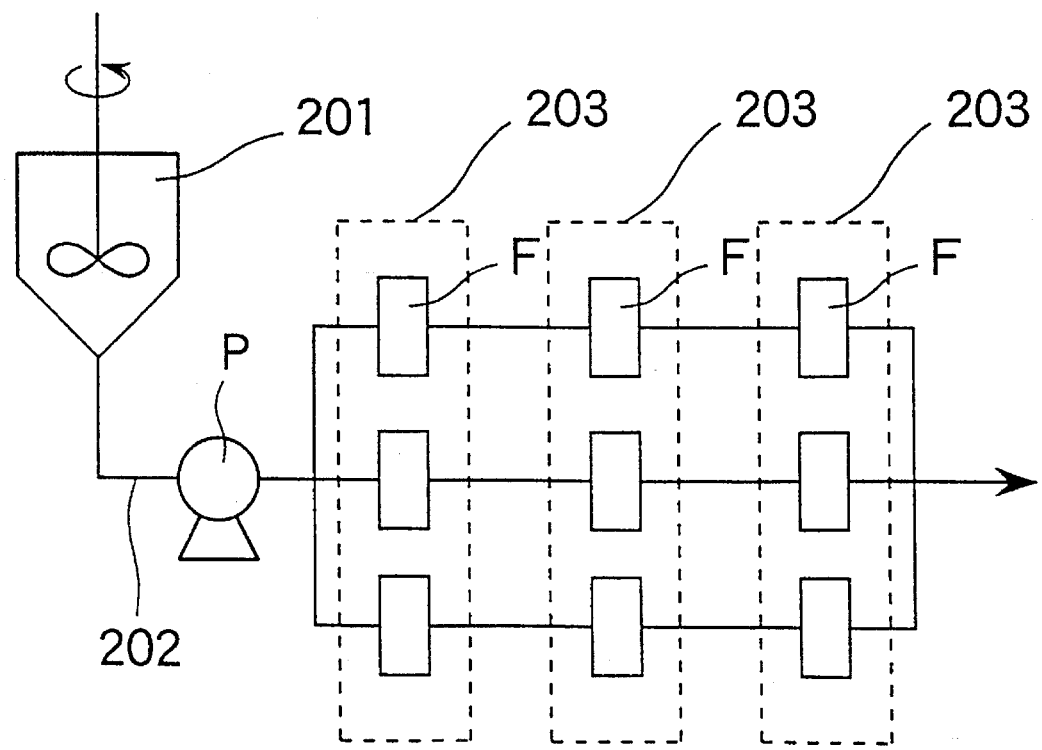

METHOD FOR PREPARING MAGNETIC RECORDING MEDIUM

BACKGROUND OF THE INVENTION

1. Field of the Invention

This invention relates to a method for preparing magnetic recording media.

2. Background Art

If magnetic paint used in the manufacture of magnetic recording media contains non-dispersed matter or reagglomerated matter of magnetic particles, etc. or resin insolubles, they become defects in the resulting magnetic coatings, incurring increased dropouts and increased error rates. Then a step of filtering magnetic paint through a filter is generally involved prior to coating. With respect to filtering in the magnetic paint preparation process, a variety of proposals have been made as mentioned below.

Japanese Patent Application Kokai (JP-A) No. 240830/1990 discloses in Examples that since magnetic paint as kneaded generally contains non-dispersed matters of ferromagnetic powder, binder and other ingredients and foreign matters such as abraded powder from the balls and milling container, the paint is passed through a filter immediately after kneading to effect filtration for removing such contaminants, and that the paint having subjected to dispersion treatment in an AC dispersion means or sand mill is passed through a filter for removing abraded powder resulting from the sand mill and non-dispersed matter. However, no reference is made to the pore size and other details of the filter JP-A 133405/1978 discloses passage of magnetic paint through filter paper (pore size 1 µm and 4 µm) upon its coating. This patent publication describes merely a pore size and no specific definition of the pore size is described therein.

JP-A 143118/1979 discloses a method comprising the steps of filtering a binder, solvent, solution and the like except for a pigment consisting of magnetic powder through a filter having a mesh size not greater than the particle size of the pigment (of the order of 0.05 to 5 µm), dispersing the pigment in the solution, then filtering the dispersion through a filter having a mesh size equal to or greater than the particle size of the pigment, and coating the magnetic paint onto an aluminum substrate.

JP-A 147134/1982 discloses a method comprising the step of removing agglomerates of magnetic powder and fractures of milling balls from magnetic paint by centrifugal separation, followed by filtration through a membrane filter having an average pore size of at least 5 µm. It is noted that the definition of an average pore size is described nowhere in this patent publication.

JP-A 102332/1983 discloses a method of reducing bit errors by passing magnetic paint through a metallic filter (pore size 2 µm or less) and then coating it to a substrate.

JP-A 58631/1984 discloses an apparatus for circulating magnetic paint in a paint tank by passing it through a filter disposed outside the tank. The pore size of this filter is described nowhere.

JP-A 117737/1984 discloses a method of reducing bit errors by kneading and dispersing magnetic paint, then passing it through a filter having a pore size of 3 µm while agitating it for stabilization, and thereafter filtering it through a membrane filter having an average pore size of 20 µm.

JP-A 82331/1986 discloses the manufacture of audio tape having a magnetic layer of 4.5 µm thick by passing magnetic paint through a filter having pores of 3 to 5 µm for filtration, followed by coating and calendering.

JP-A 248230/1986 discloses a method comprising filtering magnetic paint with concurrent ultrasonic treatment, followed by coating. Although the use of a filter of 10 µm is described, the definition of a pore size is unclear.

JP-A 122927/1986 discloses a method comprising cooling magnetic paint to below about 20° C., passing it through a filter, restoring to room temperature and then coating. An apparatus allowing plural passage of magnetic paint through a filter is disclosed in FIG. 2 of this patent publication although the pore size of this filter is described nowhere.

JP-A 6440/1987 discloses a method comprising the steps of passing a magnetic liquid through a first filter built-in ultrasonic tank to effect filtration concurrently with ultrasonic dispersion, and passing a portion of the magnetic liquid through a second filter built-in ultrasonic tank to effect filtration concurrently with ultrasonic dispersion again, or passing a portion of the magnetic liquid through a ultrasonic tank to effect dispersion again and then passing the some through a filter to effect filtration again. The patent publication discloses an apparatus for circulating the magnetic liquid through a filter although the pore size of this filter is described nowhere.

JP-A 134827/1987 discloses a method comprising the steps of previously preparing an abrasive dispersion containing an abrasive and a binder, and thereafter mixing the dispersion with ferromagnetic powder. The patent publication discloses that the magnetic paint is filtered through a filter having an average pore size of 0.5 to 1.5 µm before it is coated. In Examples, using a filter having an average pore size of 1 µm, 8-mm video tape having a thickness of 3 µm after drying was manufactured. Using a 8-mm video recorder, the number of dropouts was counted to find 5 dropouts/minute. It is noted that the definition of an average pore size is described nowhere.

JP-A 258716/1987 discloses a filter apparatus comprising a housing containing a filter for filtering magnetic paint and an agitating blade disposed therein and adapted to rotate in proximity to a filter medium. The medium of the filter used in Examples disclosed therein is constructed of cellulose plus epoxy resin with a nominal removal rate of 2 to 5 µm. It is not clearly understood what is meant by the nominal removal rate described therein.

JP-A 217528/1988 discloses a method comprising passing magnetic paint through an internal entrapment type filter having a mesh size of 40 to 100 µm under gravity for removing gel-like non-dispersed matter and coarse foreign matter and filtering the paint through a precision filter, followed by coating, the method ensuring removal of the gel-like non-dispersed matter. The pore size of the precision filter is described nowhere in the patent publication.

JP-A 106331/1989 discloses a magnetic recording medium comprising first and second magnetic layers formed on a surface of a non-magnetic substrate in this order wherein the second magnetic layer has a thickness of less than 0.5 µm and an abrasive contained in the second magnetic layer and having a Mohs hardness of at least 6 has a mean particle size of up to 0.5 µm, whereby electromagnetic properties and running durability (dynamic durability) are improved. In Examples described therein, magnetic tapes were prepared by filtering a coating liquid for the first magnetic layer and a coating liquid for the second magnetic layer each through a filter having an average pore size of 1

μm and then coating the second magnetic layer to a dry thickness of 0.25 μm, 0.45 μm or 1 μm (Comparative Example). Electromagnetic properties (Y-S/N at 4 MHz) and running durability (still life) were measured. It is noted that the definition of an average pore size is described nowhere.

JP-A 87326/1990 discloses the manufacture of VHS cassettes or 8-mm video cassettes by passing magnetic paint through a filter of 1 μm mesh and coating the thus prepared paint to a dry layer thickness of 3 μm.

JP-A 270125/1990 discloses a magnetic recording medium comprising two magnetic layers, the upper layer having a thickness of up to 0.5 μm and containing perpendicularly oriented ferromagnetic metal powder particles having a particle length of up to 0.1 μm and an aspect ratio major axis/minor axis) of more than 1 and up to 3. In Examples described therein, magnetic recording media for 8-mm video application were prepared by filtering a paint for the upper layer and a paint for the lower layer each through a filter having an average pore size of 1 μm and then forming the upper layer to a thickness of 0.29 μm or 0.5 μm. It is noted that the definition of an average pore size is described nowhere.

JP-A 3116/1991 discloses the filtration of magnetic paint through a filter wherein by adjusting the temperature of the magnetic paint to the range of 10° to 20° C., the flow and flexibility of gel-like non-decomposed matter and undissolved matter are reduced so that they may be fully captured by the filter. This patent publication describes a prior art technique of filtering magnetic paint through a filter having an absolute filtration precision of about 1 to 30 μm. The patent publication discloses an apparatus of circulating a portion of the thus filtered magnetic paint to a pool tank for effecting filtration again although the pore size of a filter for this filtration is described nowhere. Also the definition of an absolute filtration precision is described nowhere.

Meanwhile, magnetic recording media require the magnetic layer at its surface to be smooth and highly stable during operation to comply with wavelength shortening and density increase of record signals. Employed to this end is a method of coating a backcoat layer to a back surface remote from the magnetic layer-bearing surface. If magnetic paint for the backcoat layer contains resin insolubles or non-dispersed matter and re-agglomerated matter of commonly added conductive pigment and various abrasives and solid impurities entrained during the manufacturing process, they, after formation of a backcoat layer, become defects in the backcoat layer surface to detract from the dynamic travel of magnetic recording media and the smoothness of the magnetic layer surface, thus incurring an increase of dropouts and a rise of error rate. Then with respect to filtering of paint for the backcoat layer, a variety of proposals have been made as mentioned below.

Japanese Patent Publication (JP-B) No. 79052/1992 contains an Example wherein VHS format video tapes were prepared by filtering paint for a backcoat layer through a filter having an average particle size of 0.5 μm before and after viscosity adjustment, and forming a backcoat layer of 1 μm or 0.6 μm thick using this paint. These video tapes were measured for dropouts. However, the definition of an average particle size of the filter is described nowhere and the definition of the criterion for rating dropouts is described nowhere. In this patent publication, no filtration is made on paint for a magnetic layer.

JP-A 69833/1985 describes that a paint composition for a backcoat layer having a dispersion liquid and a crosslinking agent added and agitated for viscosity adjustment is coated onto a sheet of polyethylene terephthalate (PET) by means of an applicator to thereby form a backcoat layer of 0.2 to 0.5 μm thick. The paint is filtered through filter paper prior to coating. Data regarding filtration precision such as the pore size of filter paper are described nowhere in this patent publication. In this patent publication, VHS tape having a backcoat layer formed thereon is measured for defect factor. The defect factor used herein is the number per minute of defects with which a level drop of at least 20 dB continues for 15 μm or more and is generally known as a dropout. In Examples described in this patent publication, the defect factor is 5 to 10. No filtration is made on paint for a magnetic layer in this patent publication.

As mentioned above, no precise investigations have been made on the relationship between the properties of a magnetic recording medium and the properties of a filter used in preparing a paint used for the manufacture of the magnetic recording medium. For both the magnetic paint and backcoat layer-forming paint, most prior art techniques carry out filtration on those paint compositions containing a pigment as typified by magnetic powder while the one and only technique of carrying out filtration on a binder solution excluding a pigment is the one disclosed in JP-A 143118/1979.

DISCLOSURE OF THE INVENTION

A first object of the invention is to provide a magnetic recording medium having minimized dropouts immediately after preparation, a reduced dropout increase and an electromagnetic property loss with the lapse of time, and good durability of coatings such as a magnetic layer. A second object is to provide a magnetic recording medium including a backcoat layer having high durability and antistatic effect in addition to the above advantages. A third object is to achieve a productivity increase and a cost reduction in the manufacture of such a magnetic recording medium.

These and other objects are attained by any of the following constructions (1) to (43).

Embodiment 1 includes the following (1) to (2).

(1) A method for preparing a magnetic recording medium having at least two layers of coating on at least one surface of a non-magnetic substrate, the uppermost layer of coating being a magnetic layer of 0.1 to 0.8 μm thick, wherein a step of preparing a paint composition for the uppermost layer of coating includes a paint filtering step of filtering the paint through at least one filter means, the ultimate filter means used in the paint filtering step having a 95% cut filtration precision of 1.0 to 6.0 μm.

(2) A method for preparing a magnetic recording medium according to (1) wherein the step of preparing a paint composition for the uppermost layer of coating includes a kneading step of kneading or milling solids and a binder solution, a dispersing step of dispersing the solids in the compound resulting from the kneading step, and a viscosity adjusting step of adding a viscosity adjusting solution to the dispersion resulting from the dispersing step to form the paint composition.

Embodiment 2 includes the following (3) to (4).

(3) A method for preparing a magnetic recording medium having at least one layer of coating on at least one surface of a non-magnetic substrate, the uppermost layer of coating being a magnetic layer, wherein a step of preparing a paint composition for the uppermost layer of coating includes a paint filtering step of filtering the paint through at least one filter means, the ultimate filter means used in the paint filtering step having a 95% cut filtration precision of up to 10 times the shortest recording wavelength and ranging from 6.0 μm to 1.0 μm.

(4) A method for preparing a magnetic recording medium according to (3) wherein the step of preparing a paint composition for the uppermost layer of coating includes a kneading step of kneading solids and a binder solution, a dispersing step of dispersing the solids in the compound resulting from the kneading step, and a viscosity adjusting step of adding a viscosity adjusting solution to the dispersion resulting from the dispersing step to form the paint composition.

Embodiment 3 includes the following (5) to (9).

(5) A method for preparing a magnetic recording medium having a magnetic layer on a front surface of a non-magnetic substrate and a backcoat layer formed by coating on a back surface of the non-magnetic substrate, the backcoat layer having a thickness of up to 1.0 μm, wherein a step of preparing a paint composition for the backcoat layer includes a paint filtering step of filtering the paint through at least one filter means, the ultimate filter means used in the paint filtering step having a 95% cut filtration precision ranging from 1.0 to 6.0 μm and up to 10 times the thickness of said backcoat layer.

(6) A method for preparing a magnetic recording medium according to (5) wherein the step of preparing a paint composition for the backcoat layer includes a dispersing step of dispersing solids in a binder solution and a viscosity adjusting step of adding a viscosity adjusting solution to the dispersion resulting from the dispersing step to form the paint composition.

(7) A method for preparing a magnetic recording medium according to (5) wherein said magnetic recording medium has at least two layers of coating on the front surface of the non-magnetic substrate, the uppermost layer of coating being a magnetic layer of 0.1 to 0.8 μm thick, and a step of preparing a paint composition for the uppermost layer of coating includes a paint filtering step of filtering the paint through at least one filter means, the ultimate filter means used in the paint filtering step having a 95% cut filtration precision of 1.0 to 6.0 μm.

(8) A method for preparing a magnetic recording medium according to (5) wherein said magnetic recording medium has at least one layer of coating on the front surface of the non-magnetic substrate, the uppermost layer of coating being a magnetic layer, and a step of preparing a paint composition for the uppermost layer of coating includes a paint filtering step of filtering the paint through at least one filter means, the ultimate filter means used in the paint filtering step having a 95% cut filtration precision of up to 10 times the shortest recording wavelength and ranging from 6.0 μm to 1.0 μm.

(9) A method for preparing a magnetic recording medium according to (7) or (8) wherein the step of preparing a paint composition for the uppermost layer of coating includes a kneading step of kneading solids and a binder solution, a dispersing step of dispersing the solids in the compound resulting from the kneading step, and a viscosity adjusting step of adding a viscosity adjusting solution to the dispersion resulting from the dispersing step to form the paint composition.

Embodiment 4 includes the following (10) to (14).

(10) A method for preparing a magnetic recording medium having at least one layer of coating on at least one surface of a non-magnetic substrate, the uppermost layer of coating being a magnetic layer, wherein a step of preparing a paint composition for the uppermost layer of coating includes a kneading step of kneading solids and a binder solution, a dispersing step of dispersing the solids in the compound resulting from the kneading step, and a viscosity adjusting step of adding a viscosity adjusting solution to the dispersion resulting from the dispersing step to form the paint composition, and further includes at least one of a compound filtering step of filtering the compound through at least one filter means and a dispersion filtering step of filtering the dispersion through at least one filter means, the ultimate filter means used in the compound filtering step and the dispersion filtering step both have a 95% cut filtration precision of at least 15 μm, and the ultimate filter means used in at least one of the compound filtering step and the dispersion filtering step has a 95% cut filtration precision of up to 80 μm.

(11) A method for preparing a magnetic recording medium according to (10) wherein said magnetic recording medium has at least two layers of coating on the at least one surface of the non-magnetic substrate, the uppermost layer of coating being the magnetic layer of 0.1 to 0.8 μm thick, and the step of preparing a paint composition for the uppermost layer of coating includes a paint filtering step of filtering the paint through at least one filter means, the ultimate filter means used in the paint filtering step having a 95% cut filtration precision of 1.0 to 6.0 μm.

(12) A method for preparing a magnetic recording medium according to (10) wherein the step of preparing a paint composition for the uppermost layer of coating includes a paint filtering step of filtering the paint through at least one filter means, the ultimate filter means used in the paint filtering step having a 95% cut filtration precision of up to 10 times the shortest recording wavelength and ranging from 6.0 μm to 1.0 μm.

(13) A method for preparing a magnetic recording medium according to (10) wherein said magnetic recording medium has a backcoat layer formed by coating on a back surface of the non-magnetic substrate, the backcoat layer having a thickness of up to 1.0 μm, and a step of preparing a paint composition for the backcoat layer includes a dispersing step of dispersing solids in a binder solution and a viscosity adjusting step of adding a viscosity adjusting solution to the dispersion resulting from the dispersing step to form the paint composition, and further includes a dispersion filtering step of filtering the dispersion through at least one filter means, the ultimate filter means used in the dispersion filtering step having a 95% cut filtration precision of 15 to 80 μm.

(14) A method for preparing a magnetic recording medium according to (13) wherein the step of preparing a paint composition for the backcoat layer includes a paint filtering step of filtering the paint through at least one filter means, the ultimate filter means used in the paint filtering step having a 95% cut filtration precision ranging from 1.0 to 6.0 82 m and up to 10 times the thickness of said backcoat layer.

Embodiment 5 includes the following (15) to (22).

(15) A method for preparing a magnetic recording medium having at least one layer of coating on at least one surface of a non-magnetic substrate, the uppermost layer of coating being a magnetic layer, wherein a step of preparing a paint composition for the uppermost layer of coating includes a kneading step of heading solids and a binder solution, a dispersing step of dispersing the solids in the compound resulting from the kneading step, and a viscosity adjusting step of adding a viscosity adjusting solution to the dispersion resulting from the dispersing step to form the paint composition, and further includes at least one of a binder solution filtering step of filtering said binder solution through at least one filter means and a viscosity adjusting solution filtering step of filtering said viscosity adjusting solution through at least one filter means, the ultimate filter means used in the binder solution filtering step has a 95% cut filtration precision of at least 4.0 µm and the ultimate filter means used in the viscosity adjusting solution filtering step has a 95% cut filtration precision of at least 1.0 µm, and at least one of the requirements that the ultimate filter means used in the binder solution filtering step has a 95% cut filtration precision of up to 80 µm and the ultimate filter means used in the viscosity adjusting solution filtering step has a 95% cut filtration precision of up to 30 µm is met.

(16) A method for preparing a magnetic recording medium according to (15) wherein the step of preparing a paint composition for the uppermost layer of coating includes at least one step of a compound filtering step of filtering the compound through at least one filter means and a dispersion filtering step of filtering the dispersion through at least one filter means, the ultimate filter means used in the compound filtering step and the dispersion filtering step both have a 95% cut filtration precision of at least 15 µm, and the ultimate filter means used in at least one of the compound filtering step and the dispersion filtering step has a 95% cut filtration precision of up to 80 µm.

(17) A method for preparing a magnetic recording medium according to (15) wherein said magnetic recording medium has at least two layers of coating on the at least one surface of the non-magnetic substrate, the uppermost layer of coating being a magnetic layer of 0.1 to 0.8 µm thick, and the step of preparing a paint composition for the uppermost layer of coating includes a paint filtering step of filtering the paint through at least one filter means, the ultimate filter means used in the paint filtering step having a 95% cut filtration precision of 1.0 to 6.0 µm.

(18) A method for preparing a magnetic recording medium according to (15) wherein the step of preparing a paint composition for the uppermost layer of coating includes a paint filtering step of filtering the paint through at least one filter means, the ultimate filter means used in the paint filtering step having a 95% cut filtration precision of up to 10 times the shortest recording wavelength and ranging from 6.0 µm to 1.0 µm.

(19) A method for preparing a magnetic recording medium having a magnetic layer on a front surface of a non-magnetic substrate and a backcoat layer formed by coating on a back surface of the non-magnetic substrate, the backcoat layer having a thickness of up to 1.0 µm, wherein a step of preparing a paint composition for the backcoat layer of coating includes a dispersing step of dispersing solids in a binder solution and a viscosity adjusting step of adding a viscosity adjusting solution to the dispersion resulting from the dispersing step to form the paint composition, and further includes at least one of a binder solution filtering step of filtering said binder solution through at least one filter means and a viscosity adjusting solution filtering step of filtering said viscosity adjusting solution through at least one filter means, the ultimate filter means used in the binder solution filtering step has a 95% cut filtration precision of at least 4.0 µm and the ultimate filter means used in the viscosity adjusting solution filtering step has a 95% cut filtration precision of at least 1.0 µm, and at least one of the requirements that the ultimate filter means used in the binder solution filtering step has a 95% cut filtration precision of up to 80 µm and the ultimate filter means used in the viscosity adjusting solution filtering step has a 95% cut filtration precision of up to 30 µm is met.

(20) A method for preparing a magnetic recording medium according to (19) wherein the step of preparing a paint composition for the backcoat layer includes a dispersion filtering step of filtering the dispersion through at least one filter means, the ultimate filter means used in the dispersion filtering step having a 95% cut filtration precision of 15 to 80 µm.

(21) A method for preparing a magnetic recording medium according to (19) wherein the step of preparing a paint composition for the backcoat layer includes a paint filtering step of filtering the paint through at least one filter means, the ultimate filter means used in the paint filtering step having a 95% cut filtration precision ranging from 1.0 µm to 6.0 µm and up to 10 times the thickness of the backcoat layer.

(22) A method for preparing a magnetic recording medium according to (19) wherein said magnetic recording medium has at least one layer of coating on at least one surface of the non-magnetic substrate, the uppermost layer of coating being a magnetic layer, a step of preparing a paint composition for the uppermost layer of coating includes a kneading step of kneading solids and a binder solution, a dispersing step of dispersing the solids in the compound resulting from the kneading step, and a viscosity adjusting step of adding a viscosity adjusting solution to the dispersion resulting from the dispersing seep to form the paint composition, and further includes at least one step of a binder solution filtering step of filtering said binder solution through at least one filter means and a viscosity adjusting solution filtering step of filtering said viscosity adjusting solution through at least one filter means, the ultimate filter means used in the binder solution filtering step has a 95% cut filtration precision of at least 4.0 µm and the ultimate filter means used in the viscosity adjusting solution filtering step has a 95% cut filtration precision of at least 1.0 µm, and at least one of the requirements that the ultimate filter means used in the binder solution filtering step has a 95% cut filtration precision of up to 80 µm and the ultimate filter means used in the viscosity adjusting solution filtering step has a 95% cut filtration precision of up to 30 µm is met.

Embodiment 6 includes the following (23) to (26).

(23) A method for preparing a magnetic recording medium having at least two layers of coating on at least one surface of a non-magnetic substrate, the uppermost layer of coating being a magnetic layer of 0.1 to 0.8 µm thick, wherein a step of preparing a paint composition for a coating contiguous to at least the uppermost layer of coating includes a paint filtering step of filtering the paint through at least one filter means, the ultimate filter means used in the paint filtering step having a 95% cut filtration precision of 1.0 to 6.0 μm.

(24) A method for preparing a magnetic recording medium according to (23) wherein the step of preparing a paint composition for a coating contiguous to at least the uppermost layer of coating includes a kneading step of kneading solids and a binder solution, a dispersing step of dispersing the solids in the compound resulting from the kneading step, and a viscosity adjusting step of adding a viscosity adjusting solution to the dispersion resulting from the dispersing step to form the paint composition.

(25) A method for preparing a magnetic recording medium according to (23) wherein a step of preparing a paint composition for the uppermost layer of coating includes a paint filtering step of filtering the paint through at least one filter means, the ultimate filter means used in the paint filtering step having a 95% cut filtration precision of 1.0 to 6.0 μm.

(26) A method for preparing a magnetic recording medium according to (25) wherein the step of preparing a paint composition for the uppermost layer of coating includes a kneading step of kneading solids and a binder solution, a dispersing step of dispersing the solids in the compound resulting from the kneading step, and a viscosity adjusting step of adding a viscosity adjusting solution to the dispersion resulting from the dispersing step to form the paint composition.

Embodiment 7 includes the following (27) to (28).

(27) A method for preparing a magnetic recording medium according to (23) wherein said magnetic recording medium has a backcoat layer formed by coating on a back surface of the non-magnetic substrate, the backcoat layer having a thickness of up to 1.0 μm, wherein a step of preparing a paint composition for the backcoat layer includes a paint filtering step of filtering the paint through at least one filter means, the ultimate filter means used in the paint filtering step having a 95% cut filtration precision ranging from 1.0 μm to 6.0 μm and up to 10 times the thickness of said backcoat layer.

(28) A method for preparing a magnetic recording medium according to (27) wherein the step of preparing a paint composition for the backcoat layer includes a dispersing step of dispersing solids in a binder solution and a viscosity adjusting step of adding a viscosity adjusting solution to the dispersion resulting from the dispersing step to form the paint composition.

Embodiment 8 includes the following (29) to (31).

(29) A method for preparing a magnetic recording medium according to (23) wherein the step of preparing a paint composition for a coating contiguous to at least the uppermost layer of coating includes a kneading step of kneading solids and a binder solution, a dispersing step of dispersing the solids in the compound resulting from the kneading step, and a viscosity adjusting step of adding a viscosity adjusting solution to the dispersion resulting from the dispersing step to form the paint composition, and further includes at least one of a compound filtering step of filtering said compound through at least one filter means and a dispersion filtering step of filtering said dispersion through at least one filter means, the ultimate filter means used in the compound filtering step and the dispersion filtering step both have a 95% cut filtration precision of at least 15 μm, and the ultimate filter means used in at least one of the compound filtering step and the dispersion filtering step has a 95% cut filtration precision of up to 80 μm.

(30) A method for preparing a magnetic recording medium according to (29) wherein the step of preparing a paint composition for the uppermost layer of coating includes a kneading step of kneading solids and a binder solution, a dispersing step of dispersing the solids in the compound resulting from the kneading step, and a viscosity adjusting step of adding a viscosity adjusting solution to the dispersion resulting from the dispersing step to form the paint composition, and further includes at least one of a compound filtering step of filtering said compound through at least one filter means and a dispersion filtering step of filtering said dispersion through at least one filter means, and a paint filtering step of filtering the paint through at least one filter means, the ultimate filter means used in the compound filtering step and the dispersion filtering step both have a 95% cut filtration precision of at least 15 μm, the ultimate filter means used in at least one of the compound filtering step and the dispersion filtering step has a 95% cut filtration precision of up to 80 μm, and the ultimate filter means used in the paint filtering step has a 95% cut filtration precision of 1.0 to 6.0 μm.

(31) A method for preparing a magnetic recording medium according to (27) wherein said magnetic recording medium has a backcoat layer formed by coating on a back surface of the non-magnetic substrate, the backcoat layer having a thickness of up to 1.0 μm, a step of preparing a paint composition for the backcoat layer includes a dispersing step of dispersing solids in a binder solution and a viscosity adjusting step of adding a viscosity adjusting solution to the dispersion resulting from the dispersing step to form the paint composition, and further includes a dispersion filtering step of filtering said dispersion through at least one filter means and a paint filtering step of filtering said paint composition through at least one filter means, the ultimate filter means used in the dispersion filtering step has a 95% cut filtration precision ranging from 15 to 80 μm, and the ultimate filter means used in the paint filtering step has a 95% cut filtration precision ranging from 1.0 μm to 6.0 μm and up to 10 times the thickness of said backcoat layer.

Embodiment 9 includes the following (32) to (34).

(32) A method for preparing a magnetic recording medium according to (23) wherein the step of preparing a paint composition for a coating contiguous to at least the uppermost layer of coating includes a kneading step of kneading solids and a binder solution, a dispersing step of dispersing the solids in the compound resulting from the kneading step, and a viscosity adjusting step of adding a viscosity adjusting solution to the dispersion resulting from the dispersing step to form the paint composition, and further includes at least one of a binder solution filtering step of filtering said binder solution through at least one filter means and a viscosity adjusting solution filtering step of filtering said viscosity adjusting solution through at least one filter means, the ultimate filter means used in the binder solution filtering step has a 95% cut filtration precision of at least 4.0 μm, the ultimate filter means used in the viscosity adjusting solution filtering step has a 95% cut filtration precision of at least 1.0 μm, at least one of the requirements that the ultimate filter means used in the binder solution filtering step has a 95% cut filtration precision of up to 80 μm and the ultimate filter means used in the viscosity adjusting solution filtering step has a 95% cut filtration precision of up to 30 μm is met.

(33) A method for preparing a magnetic recording medium according to (32) wherein the step of preparing a paint composition for the uppermost layer of coating includes a kneading step of kneading solids and a binder solution, a dispersing step of dispersing the solids in the compound resulting from the kneading step, and a viscosity adjusting step of adding a viscosity adjusting solution to the dispersion resulting from the dispersing step to form the paint composition, and further includes at least one of a binder solution filtering step of filtering said binder solution through at least one filter means and a viscosity adjusting solution filtering step of filtering said viscosity adjusting solution through at least one filter means, and a paint filtering step of filtering the paint through at least one filter means, the ultimate filter means used in the binder solution filtering step has a 95% cut filtration precision of at least 4.0 μm, the ultimate filter means used in the viscosity adjusting solution filtering step has a 95% cut filtration precision of at least 1.0 μm, at least one of the requirements that the ultimate filter means used in the binder solution filtering step has a 95% cut filtration precision of up to 80 μm and the ultimate filter means used in the viscosity adjusting solution filtering step has a 95% cut filtration precision of up to 30 μm is met, and the ultimate filter means used in the paint filtering step has a 95% cut filtration precision of 1.0 to 6.0 μm.

(34) A method for preparing a magnetic recording medium according to (32) wherein said magnetic recording medium has a backcoat layer formed by coating on a back surface of the non-magnetic substrate, the backcoat layer having a thickness of up to 1.0 μm, a step of preparing a paint composition for the backcoat layer includes a dispersing step of dispersing solids in a binder solution and a viscosity adjusting step of adding a viscosity adjusting solution to the dispersion resulting from the dispersing step to form the paint composition, and further includes at least one of a binder solution filtering step of filtering said binder solution through at least one filter means and a viscosity adjusting solution filtering step of filtering said viscosity adjusting solution through at least one filter means, and a paint filtering step of filtering the paint through at least one filter means, the ultimate filter means used in the binder solution filtering step has a 95% cut filtration precision of at least 4.0 μm, the ultimate filter means used in the viscosity adjusting solution filtering step has a 95% cut filtration precision of at least 1.0 μm, at least one of the requirements that the ultimate filter means used in the binder solution filtering step has a 95% cut filtration precision of up to 80 μm and the ultimate filter means used in the viscosity adjusting solution filtering step has a 95% cut filtration precision of up to 30 μm is met, and the ultimate filter means used in the paint filtering step has a 95% cut filtration precision of from 1.0 μm to 6.0 μm.

In each of the foregoing embodiments, the following (35) to (43) are preferred.

(35) A method for preparing a magnetic recording medium as set forth above wherein in at least one filtering step, at least two filter means are serially disposed in a flowpath of a fluid to be filtered, and a filter means having a greater 95% cut filtration precision than said ultimate filter means is disposed upstream of said ultimate filter means.

(36) A method for preparing a magnetic recording medium according to (35) wherein the filter means are disposed in said flowpath such that their 95% cut filtration precision may gradually decline from the upstream to the downstream side of the flowpath.

(37) A method for preparing a magnetic recording medium according to (35) wherein the filter means disposed upstream of said ultimate filter means has a 95% cut filtration precision which is up to 20 times the 95% cut filtration precision of said ultimate filter means.

(38) A method for preparing a magnetic recording medium as set forth above wherein said filter means includes a parallel filter means comprising at least two filters with an identical 95% cut filtration precision disposed parallel in a flowpath of a fluid to be filtered.

(39) A method for preparing a magnetic recording medium as set forth above wherein a fluid to be filtered is passed at least 2 times through at least one filter means for effecting circulatory filtration.

(40) A method for preparing a magnetic recording medium as set forth above wherein said ultimate filter means includes a depth type filter.

(41) A method for preparing a magnetic recording medium as set forth above wherein said magnetic recording medium has at least two layers of coating on the at least one surface of the non-magnetic substrate, the lowermost layer of coating thereof being a non-magnetic layer.

(42) A method for preparing a magnetic recording medium as set forth above wherein said magnetic recording medium has at least two layers of coating on the at least one surface of the non-magnetic substrate, all of the at least two layers of coating being magnetic layers.

(43) A method for preparing a magnetic recording medium as set forth above wherein the layers of coating on the non-magnetic substrate surface are formed by a wet-on-wet coating technique.

FUNCTIONS AND ADVANTAGES

The present invention is applied to the manufacture of a single-layered or multi-layered magnetic recording medium having at least one layer of coating inclusive of a magnetic layer on at least one surface of a non-magnetic substrate. Among the coatings, at least the uppermost layer of coating is a magnetic layer. The present invention is also applied to the manufacture of a magnetic recording medium having a backcoat layer formed on a back surface of a non-magnetic substrate. In the latter embodiment, a magnetic layer on a front surface of the non-magnetic substrate is not critical. If a magnetic layer of the coating type is formed, however, it is preferable to apply the present invention to the formation of this magnetic layer too.

In the practice of the invention, a paint composition for forming a coating on a front surface of a non-magnetic substrate is generally prepared by the process shown by the left-hand flow chart in FIG. 1 wherein at least one of filtering steps I to V is selected at need in each of the embodiments of the invention. A paint composition for forming a backcoat layer is generally prepared by the process shown by the right-hand flow chart in FIG. 1 wherein at least one of filtering steps VI to IX is selected at need in each of the embodiments of the invention. And in each of the embodiments of the invention, the selected filtering step uses a final or ultimate filter means having a pore size (which is defined herein as a 95% cut filtration precision) in a specific range. It is to be noted that by the ultimate filter means used in the specification, if a single filter means is used in a filtering step, the only filter means is meant and if a plurality of filter means are used in a filtering step, that filter means having a minimum 95% cut filtration precision is meant.

In filtering step I of filtering a binder solution and filtering step IV of filtering a viscosity adjusting solution, objects to be captured such as impurities, gelled binder and undissolved binder in the binder solution or viscosity adjusting solution are captured by the ultimate filter means with a high precision. This prevents deterioration of medium properties that is otherwise caused by the objects to be captured which are entrained in the finally obtained paint and thus present as foreign matter in a coating. In particular, dropouts are significantly reduced. Also a coating is improved in properties and increased in durability.

In filtering step V of filtering a paint composition, filtering step II of filtering a compound, and filtering step III of filtering a dispersion, objects to be captured such as non-dispersed matter and re-agglomerated matter of magnetic powder and non-magnetic powder and resin insolubles are captured by the ultimate filter means with a high precision. As a consequence, magnetic recording media manufactured therefrom are significantly reduced in dropouts. Also since the ultimate filter means used in these filtering steps do not remove beyond necessity the abrasive grains added for improving the durability of a magnetic coating, a coating having improved durability is obtained.

In the process of preparing a paint composition for a backcoat layer, the ultimate filter means used in filtering step VI of filtering a binder solution and filtering step VIII of filtering a viscosity adjustment solution have the some functions as the ultimate filter means used in filtering steps I and IV, respectively. In filtering step IX of filtering a paint composition and filtering step VII of filtering a dispersion, objects to be captured such as resin insolubles, non-dispersed matter and re-agglomerated matter of commonly added conductive pigments and various abrasives, and solid impurities entrained during the manufacturing process are captured by the ultimate filter means with a high precision. As a consequence, magnetic recording media manufactured therefrom are significantly reduced in dropouts. Also the ultimate filter means used in the filtering steps IX and VII do not remove beyond necessity the abrasive grains added for improving the durability of a backcoat layer and the conductive pigment added for antistatic purpose. Then a backcoat layer having improved durability and high antistatic effect is obtained. Furthermore, although carbon black used in the backcoat layer is known of very low dispersibility, dispersion is significantly improved as compared with the sole use of a conventional dispersion step with a ball mill or the like because strong shear forces are applied to the paint or dispersion during filtration by filter means as defined herein. As a consequence, magnetic recording media are further reduced in dropouts.

In general, magnetic recording media are considerably increased in dropouts and deteriorated in electromagnetic properties after they are stored under rigorous conditions such as hot humid conditions. Particularly when in a magnetic recording medium having a multi-layered structure of coatings, the uppermost layer is a magnetic layer which is as thin as 0.8 µm, foreign matter in a coating contiguous to the uppermost layer can have significant influence, tending to increase dropouts and deteriorate electromagnetic properties. However, when the ultimate filter means is used in the step of filtering a paint for a coating contiguous to the uppermost layer as in Embodiments 6 to 9, the dropout increase and electromagnetic property deterioration are little acknowledged even after storage under hot humid conditions.

In addition to the above mentioned advantages, by carrying out specific filtration according to the present invention, it becomes possible to mitigate fouling of calender rolls used for smoothing the surface of a magnetic layer or backcoat layer. This enables to reduce the frequency of replacement of calender rolls and to achieve a productivity increase and cost reduction.

In the patent publications cited as prior art techniques, the pore size of filters is expressed in different ways. For example, pore size, average pore size, mesh, nominal removal rate, and absolute filtration precision are used. However, none of the patent publications refer to the 95% cut filtration precision used herein.

Examples of JP-B 79052/1992 cited as a prior art technique use a filter having an average particle size of 0.5 µm for filtering paint for a backcoat layer while no reference is made to the 95% cut filtration precision. Furthermore, the 95% cut filtration precision of the ultimate filter means used in filtering step IX is correlated to the thickness of a backcoat layer in the present invention although this is not described in JP-B 79052/1992.

In the practice of the invention, multi-stage filtration is preferably carried out in at least one of filtering steps including the above mentioned ultimate filter means. In this multi-stage filtration, as shown in FIG. 5, a plurality of filter means (or filters F) are serially disposed in a flowpath 202 in flow communication with a tank 201 containing a fluid to be filtered (binder solution, viscosity adjusting solution, compound, dispersion or paint). A filter means having a greater pore size than the ultimate filter means is disposed upstream of the ultimate filter means. The filter means having a greater pore size disposed upstream in the flowpath catches coarse objects to be captured in the fluid under filtration while allowing passage of fine objects to be captured. The ultimate filter means disposed downstream in the flowpath catches the fine objects to be captured which have passed the upstream filter means. Since objects to be captures are caught by a plurality of filter means in a sharing manner as mentioned above, the multi-stage filtration according to the present invention retards clogging of the respective filter means. If significant clogging occurs in filter means, not only a significant reduction of filtrate flow rate accompanies, but also even magnetic powder and abrasives to be passed are captured, resulting in a drop of filtration precision. By carrying out multi-stage filtration as mentioned above, however, it becomes possible to extend a useful life and improve the filtration precision.

As previously described, it is known in the art to carry out multi-stage filtration by disposing a plurality of filters in series in a paint flowpath. However, it was first proposed by the present invention to dispose a filter means having a greater pore size at an upstream side and a filter means having a smaller pore size at a downstream side of a flowpath. When a plurality of filters having an equal pore size are used, extension of a useful life is impossible because an upstream filter is shortly clogged. If the pore size of a filter is increased in order to prevent such clogging, then that filter fails to capture fine objects to be captured.

According to the invention, it is preferred to use a parallel filter means 203 having two or more filters F arranged in parallel in a flowpath 202 as shown in FIG. 6. In order to increase productivity, the flow rate of a fluid to be filtered in a filtering step must be increased. To this end, in turn, it is effective to increase the filtration area. A depth type filter having a cylindrical filter medium can be increased in filtration area by increasing the diameter or axial length of the filter medium. However, it is difficult to reduce the variation of pore size in large diameter filter media, leaving a problem with respect to filtration precision. On the other hand, filter media having an increased axial length are liable to clogging, leaving problems with respect to useful life and filtration precision. In contrast, the parallel filter means according to the invention uses a plurality of filter media having a relatively small diameter and a relatively short axial length, which ensures a large filtration area, highly precise filtration and an increased useful life.

In the practice of the invention, it is desired to carry out circulatory filtration by passing a fluid to be filtered in a tank 201 through a filter means (filter F) in a circuit. A compound or dispersion will sometimes have a long residence time in the tank 201. Also, while the paint having been subject to filtering step V or IX is generally supplied to a coating step after introducing a curing agent therein, it will sometimes have a long residence time in the tank 201 depending on the feed rate of paint to the curing agent introducing step. Since fine particles in the compound, dispersion or paint tend to agglomerate and in particular, magnetic fine particles having a high coercivity and a high saturation magnetic flux density tend to agglomerate, agglomerates are likely to form even though dispersion is continued within the tank 201 as by agitation. However, if the compound, dispersion or paint is circulated as shown in FIG. 8, strong shearing forces are applied thereto upon passage through filter means to prevent formation of agglomerates. The circulatory filtration also improves filtration precision.

Maintenance is also improved by combining circulatory filtration with multi-stage filtration as shown in FIGS. 9, 10, and 11. Although a conventional filtering step requires that operation of a filter device be interrupted upon replacement of filter means, a combination of circulatory filtration with multi-stage filtration allows at least a portion of filter means to be replaced without interrupting the operation of a filter device.

BRIEF DESCRIPTION OF THE DRAWINGS

FIG. 1 is a flow chart illustrating processes of preparing magnetic layer-forming paint, non-magnetic layer-forming paint, and backcoat layer-forming paint.

FIGS. 4, 5, 6, 7, 8, 9, 10, and 11 are schematic views showing the arrangement of filters in various filtering steps.

ILLUSTRATIVE CONSTRUCTION

Now the illustrative construction of the present invention is described in detail.

Figure 2A:
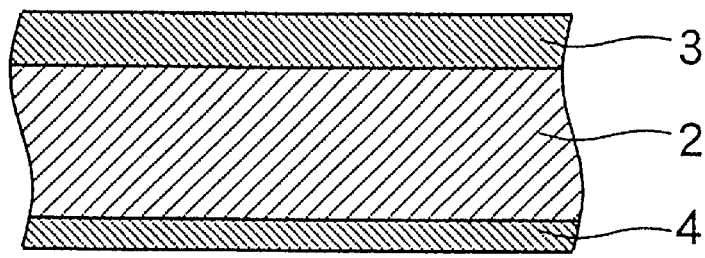
FIGS. 2(a) and 2(b) are partial cross-sectional views showing exemplary structures of magnetic recording media prepared according to the invention.

Embodiments 2 to 5 of the present invention encompass a method for preparing a magnetic recording medium having a single magnetic layer on at least one surface of a non-magnetic substrate. FIG. 2(a) shows an exemplary structure of such a magnetic recording medium. The magnetic recording medium shown in FIG. 2(a) has a magnetic layer 3 formed on a front surface of a non-magnetic substrate 2 and a backcoat layer 4 formed on a back surface of the substrate. Note that the backcoat layer 4 is formed if necessary. Embodiments 2 to 5 also encompass a method for preparing a magnetic recording medium (or multi-layered medium) having at least two layers of coating on at least one surface of a non-magnetic substrate, at least the uppermost layer of coating being a magnetic layer.

Figure 2B:
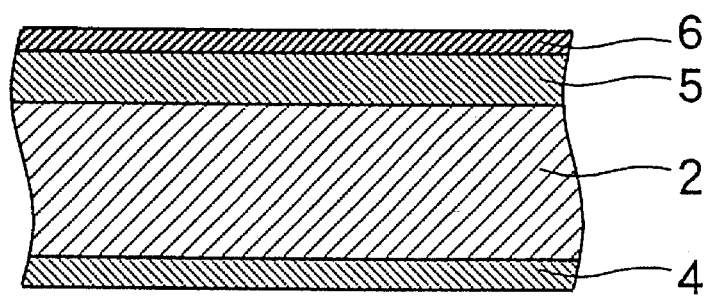

Embodiments 1 and 3 to 9 also encompass a method for preparing a magnetic recording medium of the multi-layered medium type wherein the uppermost layer of coating is a magnetic layer of 0.1 to 0.8 µm thick. FIG. 2(b) shows an exemplary structure of such a magnetic recording medium. The magnetic recording medium shown in FIG. 2(b) has upper and lower layers 5 and 6 formed in the described order on a front surface of a non-magnetic substrate 2 and a backcoat layer 4 formed on a back surface of the substrate. Note that the backcoat layer 4 is formed if necessary. The lower layer 5 is a non-magnetic or magnetic layer and the upper layer 6 is a magnetic layer. The multi-layered medium prepared by the present invention may have three or more layers of coating on a front surface of a non-magnetic substrate. In this embodiment, all the coatings may be magnetic layers or the coatings other than the uppermost layer may be non-magnetic layers. However, where a non-magnetic layer is included, a general practice is that only the lowermost layer is a non-magnetic layer. It is understood that in the practice of the invention, various coatings such as a coating of lubricant and a coating for protecting the magnetic layer may be provided on the uppermost magnetic layer if necessary.

Embodiments 3 to 5 and 7 to 9 of the present invention encompass a method for preparing a magnetic recording medium having a magnetic layer on a front surface of a non-magnetic substrate and a backcoat layer on a back surface of the substrate wherein the backcoat layer has a thickness of up to 1.0 µm. In embodiments 3 and 5, the magnetic layer is not critical and may be either of the coating type or of the continuous thin film type, for example.

Non-Magnetic Substrate

For the non-magnetic substrate, use may be made of well-known films of polyesters such as polyethylene terephthalate (PET) and polyethylene naphthalate (PEN), polyolefins, polyamides, polyimides, polyamide-imides, polysulfons, cellulose triacetate, and polycarbonates, with the PET, PEN, and aromatic polyamides being preferred inter alia. Especially preferred are composite films obtained by multilayer co-extrusion of two or three species of PET or PEN. Use of these films ensures a satisfactory profile of electromagnetic properties, durability, frictional property, film strength, and productivity.

It is also preferred to add inorganic compounds such as oxides and carbonates of Al, Ca, Si, and Ti and organic compounds such as acrylic resin fine powder as a filler to the non-magnetic substrate. A choice of the amount and size of the filler can control the surface properties of a non-magnetic substrate as desired and hence, electromagnetic properties, durability, and frictional property.

Furthermore, the non-magnetic substrates may be previously subject to corona discharge treatment, plasma discharge and/or polymerization treatment, adhesive receptivity enhancing treatment, dust removing treatment, or mitigating treatment by heat and/or humidity control.

The non-magnetic substrate preferably has a surface roughness of up to 0.03 μm, more preferably up to 0.02 μm, further preferably up to 0.01 μm as expressed in center line average roughness Ra. It is preferred that not only the surface roughness be small, but also coarse protrusions of 0.5 μm or more be absent.

Also preferably, the non-magnetic substrate has a longitudinal and transverse thermal shrinkage factor of up to 3%, more preferably up to 1.5% as measured at 100° C. for 30 minutes and up to 1%, more preferably up to 0.5% as measured at 80° C. for 30 minutes.

The non-magnetic substrate is preferably 4.0 to 75.0 μm thick. If it is too thin, it would fail to maintain the mechanical strength of a magnetic recording medium, resulting in a loss of durability. If it is too thick, a magnetic recording medium would have an extra overall thickness, undesirably resulting in a drop of record quantity per unit volume.

Magnetic Layer of Single Layer Structure or
Magnetic Layer as Uppermost Layer of
Multi-Layered Structure The magnetic layer contains at least a magnetic powder and a binder.
<Magnetic powder>
The following examples are preferably used as the magnetic powder.
Iron oxide magnetic powder
The iron oxide magnetic powders which can be used herein include $\gamma$-$Fe_2O_3$, $Fe_3O_4$, a solid solution of $\gamma$-$Fe_2O_3$ and $Fe_3O_4$, cobalt compound-adsorbed $\gamma$-$Fe_2O_3$, cobalt compound-doped $\gamma$-$Fe_2O_3$, cobalt compound-adsorbed $Fe_3O_4$, cobalt compound-doped $Fe_3O_4$, a solid solution of cobalt compound-adsorbed $\gamma$-$Fe_2O_3$ and cobalt compound-adsorbed $Fe_3O_4$, a solid solution of cobalt compound-doped $\gamma$-$Fe_2O_3$ and cobalt compound-doped $Fe_3O_4$, etc. The cobalt compounds used herein include compounds allowing the magnetic anisotropy of cobalt to be utilized for coercivity improvement, for example, cobalt oxide, cobalt hydroxide, cobalt ferrite, and cobalt ion adsorbed substances. Where cobalt-adsorbed or doped $\gamma$-$Fe_2O_3$ is used, the proportion of divalent iron to trivalent iron is preferably 0 to 20%, more preferably 2 to 10%.
Ferromagnetic metal powder
The ferromagnetic metal powders which can be used herein include those powders constructed primarily of ferromagnetic metal elements such as α-Fe, Fe—Co, Fe—Ni, Fe—Co—Ni, Co, and Co—Ni. Where such a ferromagnetic metal powder is used, it should preferably contain at least 70% by weight, more preferably at least 75% by weight of a ferromagnetic metal (e.g., Fe, Co and Ni) or alloy. In a ferromagnetic metal powder containing Fe as a main component and further containing at least Co, the proportion of Co atom to Fe atom is preferably 0 to 40 mol %, more preferably 6 to 35%. Also, a ferromagnetic metal powder containing Fe and/or Co as a main component should preferably further contain at least one of Y and rare earth elements. Moreover, these ferromagnetic metal powders may be those wherein particles have an oxide coating on their surface, are partially carbonized or nitrided at their surface, or have a carbonaceous coating formed on their surface. The ferromagnetic metal powders may contain a minor amount of hydroxide or oxide.

These ferromagnetic metal powders may be prepared in accordance with well-known processes. Exemplary preparation processes include a process of reducing organic acid salts (typically oxalates) of ferromagnetic metals with reducing gases such as hydrogen; a process of reducing hydrous iron oxide or iron oxide obtained by heating hydrous iron oxide with reducing gases such as hydrogen; a process of pyrolyzing metal carbonyl compounds; a process of adding reducing agents such as hydrogenated sodium boride, hypophosphites and hydrazines to an aqueous solution of ferromagnetic alloy to effect reduction; and a process of evaporating metals in low pressure inert gases to produce fine particles. The thus obtained ferromagnetic metal powders having been subject to conventional slow oxidation treatment are also useful. Exemplary slow oxidation treatments include a process of dipping metal particles in organic solvents followed by drying; a process of dipping metal particles in organic solvents and blowing oxygen-containing gases to form an oxide coating on the surface, followed by drying; and a process of forming an oxide coating on the surface by adjusting the partial pressures of oxygen and inert gases without using organic solvents.
Chromium dioxide powder
Acicular $CrO_2$ magnetic powder is useful in the practice of the invention.
Hexagonal ferrite powder
Also useful in the practice of the invention is a magnetic powder in hexagonal plate form and having an axis of easy magnetization perpendicular to a plate plane, for example, plate hexagonal ferrite. Examples of this magnetic powder include Ba-ferrite, Sr-ferrite, Pb-ferrite, Ca-ferrite, and metal atom-substituted ferrites having matched the valence number of Fe atoms. More illustratively, mention may be made of magnetoplumbite type Ba-ferrite and Sr-ferrite, magnetoplumbite type Ba-ferrite and Sr-ferrite partially containing a spinel phase. Especially preferred are metal atom-substituted ferrites having the valence number of Fe atoms matched in order to control the coercivity of Ba-ferrite, Sr-ferrite, etc. The preferred metal atoms which are used as a substitute for coercivity control include Co—Ti, Co—Ti—Sn, Co—Ti—Zr, Cu—Zn, Cu—Ti—Zn, and Ni—Ti—Zn. The plate hexagonal ferrite particles should preferably have an average plate diameter of 0.01 to 0.1 μm and an average plate thickness of ½ to 1/20 of the plate diameter. By the plate diameter of hexagonal plate magnetic particles is meant the diameter of hexagonal plates, which is measured using an electron microscope.
General magnetic powder
It is to be noted that all of the aforementioned magnetic powders may have added thereto a minor amount of such elements as Al, Si, Cr, Mn, Co, Ni, Zn, Cu, Zr, Ti, Bi, Ag, Pt, B, C, P, N, Y, S, Sc, V, Mo, Rh, Pd, Ag, Sn, Sb, Te, Ba, Ta, W, Re, Au, Hg, Pb, La, Sr, and rare earth elements. Among these elements, addition of at least one element selected from Al, Si, P, Y, and rare earth elements is effective for improving a particle size distribution and preventing sintering.

Also the magnetic powders may be either covered with a coating of Al, Si, P or an oxide thereof or surface treated with coupling agents such as Si, Al and Ti or various surfactants.

In the case of ferromagnetic metal powders, some powders may contain water soluble inorganic ions such as Na, K, Ca, Fe, and Ni, preferably in an amount of up to 500 ppm, more preferably up to 300 ppm.

These magnetic powders may be pre-treated with dispersants, lubricants, surfactants, antistatic agents or the like prior to dispersion.

The magnetic powder may have a water content of 0.1 to which should preferably be optimized pursuant to the type of binder.

The pH of magnetic powder should preferably be optimized pursuant to the binder to be combined therewith and preferably ranges from 4 to 12, more preferably from 6 to 10.

Preferably these magnetic powders have a specific surface area of 25 to 80 m²/g, more preferably 40 to 70 m²/g as measured by a BET method. With a smaller specific surface area, noise would increase. With a larger specific surface area, it would be undesirably difficult to provide acceptable surface properties.

In the magnetic layer, the amount of the magnetic powder contained relative to the binder is generally about 100 to 2,000 parts by weight per 100 parts by weight of the binder. The content of the magnetic powder in the entire magnetic layer is preferably 50 to 95% by weight, more preferably 55 to 90% by weight. If the content of the magnetic powder in the magnetic layer is too large, the amount of resin and other additives in the magnetic layer is relatively small, often resulting in disadvantages including a loss of durability of the magnetic layer. With smaller contents, it would become difficult to provide high reproduction outputs.

It is noted that the aforementioned magnetic powders may be used alone or in a mixture of two or more.

Usually the coercivity Hc of the magnetic powder may be selected in the range between 200 Oe and 3,000 Oe in accordance with a system requirement. As a general rule, with too higher Hc, it would be difficult to record or erase signals with conventional heads. With too lower Hc, sufficient outputs would not be reproduced in the case of short wavelength recording. The Hc of ferromagnetic metal powder is preferably 1,100 to 2,500 Oe, more preferably 1,400 to 2,000 Oe, and a Hc of 1,500 Oe or higher is especially preferred for short wavelength recording using a shortest recording wavelength of up to 1 μm.

Saturation magnetization (σs) may also be properly selected. Since high reproduction outputs would not be produced with lower σs, it is preferred to empirically determine par meters so as to provide as high saturation magnetization as possible while considering physical properties such as durability and friction.

These magnetic particles may take the form of needle, spindle, granule, sphere and plate shapes. Depending on the particular application of magnetic recording medium, an appropriate shape may be selected. In the case of magnetic tapes in particular, particles of acicular and spindle shapes are preferred to spherical or granular shapes because more effective orientation in a magnetic field is expectable and the effect of increasing the strength of a magnetic layer in a longitudinal direction is expectable. The aspect ratio major axis minor axis) of acicular or spindle shaped magnetic particles is not critical although advantages as mentioned just above are fully expectable with an aspect ratio of from about 3 to 10.

In general, ferromagnetic metal particles are of acicular shape. The acicular or needle shape is used herein in a broad sense ranging from those ferromagnetic metal particles having relatively pointed major axis edges (which are generally designated spindle shape) to those ferromagnetic metal particles having nearly semi-spherical or flattened major axis edges. More illustrative is a shape which is depicted by rotating X and Y satisfying the following equation about X axis.

equation $(X/k)^n + Y^n = 1$

In the equation, n can have a value in the range: $1 < n > 100$, preferably $1.2 \leq n \leq 20$, more preferably $1.5 \leq n \leq 10$. Note that in the equation, k is a so-called aspect ratio, that is, a ratio of major axis length minor axis diameter.

The magnetic particles may have a mean particle size of about 0.05 to 0.8 μm. For acicular or spindle shaped magnetic particles, an average major diameter of 0.05 to 0.3 and an average aspect ratio of from 3 to 10 are preferred and an average major diameter of 0.08 to 0.2 μm and an average aspect ratio of from 5 to 8 are more preferred. With a larger average major diameter, a resultant tape would have increased bulk noises. With a smaller average major diameter, magnetic particles tend to agglomerate in the magnetic paint.

<Binder>

Any of thermoplastic resins, thermosetting or reactive resins, electron beam sensitive modified resins and mixtures thereof may be used as the binder. Their combination may be appropriately selected in accordance with medium properties and process conditions. Preferred thermoplastic resins are those having a softening temperature of up to 150° C., an average molecular weight of 5,000 to 200,000, and a degree of polymerization of about 50 to 2,000. Preferred thermosetting or reactive resins and electron beam sensitive modified resins have an average molecular weight and a degree of polymerization approximate to those of the thermoplastic resins, and they will increase their molecular weight infinitely through reaction such as condensation and addition by effecting heating and/or electron beam irradiation after coating, drying and calendering.

The resins which are preferred as the binder include combinations of a vinyl chloride copolymer and a polyurethane resin as shown below. Reference is first made to the thermoplastic resins as an example.

Thermoplastic resins

Vinyl chloride copolymers

The vinyl chloride copolymer preferably has a vinyl chloride content of 60 to 95% by weight, more preferably 60 to 90% by weight and a degree of polymerization of about 100 to 500.

Examples of the vinyl chloride copolymer include vinyl chloride-vinyl acetate-vinyl alcohol copolymers, vinyl chloride-hydroxyalkyl meth)acrylate copolymers, vinyl chloride-vinyl acetate-maleic acid, vinyl chloride-vinyl acetate-vinyl alcohol-maleic acid, vinyl chloride-vinyl acetate-hydroxyalkyl (meth)acrylate, vinyl chloride-vinyl acetate-hydroxyalkyl (meth)acrylate-maleic acid, vinyl chloride-vinyl acetate-vinyl alcohol-glycidyl meth)acrylate, vinyl chloride-hydroxyalkyl (meth)acrylate-glycidyl (meth)acrylate, vinyl chloride-vinyl acetate-vinyl alcohol-glycidyl (meth)acrylate copolymers, vinyl chloride-hydroxyalkyl (meth)acrylate-allyl glycidyl ether, vinyl chloride-vinyl acetate-vinyl alcohol-allyl glycidyl ether and other copolymers. Those copolymers of vinyl chloride with a monomer containing an epoxy (or glycidyl) group are especially preferred.

Further, those vinyl chloride copolymers containing a sulfate and/or sulfo group as a polar group (to be referred to as a sulfur-containing polar group, hereinafter) are preferred. In the sulfur-containing polar group ($—SO_4Y$ and $—SO_3Y$), Y may be either H or an alkali metal. Most preferred are those groups wherein Y=K, that is, $—SO_4K$ and $—SO_3K$. Either one or both of the sulfur-containing polar groups may be contained and when both are contained, their proportion is arbitrary. Preferably a sulfur-containing polar group is contained in a molecule in an amount of 0.01 to 10% by weight, more preferably 0.1 to 5% by weight of sulfur atom.

As the polar group, any of $—OPO_2Y$, $—PO_3Y$, and $—COOY$ groups wherein Y is H or alkali metal, and amino ($—NR_2$) and $—NR_3Cl$ groups wherein R is H, methyl or ethyl may also be contained in addition to the sulfur-containing polar group. Among these groups, the amino group need not be combined with the sulfur or be specific although dialkyl amino groups, preferably with an alkyl moiety having 1 to 10 carbon atoms, are preferred. These amino groups are generally obtained by amine modification. For example, amino groups are obtained by dispersing or dissolving a vinyl chloride-alkyl carboxylic acid vinyl ester copolymer in an organic solvent such as alcohol, adding thereto an amine compound (primary, secondary or tertiary amines such as aliphatic amines, cycloaliphatic amines, alkanol amines and alkoxyalkylamines) and an epoxy-containing compound for facilitating saponifying reaction, and effecting saponifying reaction. The vinyl unit having an amino group is preferably 0.05 to 5% by weight. It is acceptable that an ammonium base is eventually contained.

The resin skeleton to which a sulfur-containing polar group is attached is a vinyl chloride resin. The vinyl chloride resin can be obtained by polymerizing vinyl chloride, an epoxy group-containing monomer and optionally, another copolymerizable monomer in the presence of a radical release agent having a sulfur-containing strong acid residue such as potassium persulfate and ammonium persulfate. The radical release agent is generally used in an amount of 0.3 to 9.0% by weight, preferably 1.0 to 5.0% by weight of the monomers. Since most radical release agents are water soluble, emulsion polymerization, suspension polymerization using alcohols such as methanol as a polymerization medium or solution polymerization using ketones as a medium is adequate. Upon polymerization, another radical release agent commonly used in polymerization of vinyl chloride may be used in addition to the radical release agent having a sulfur-containing strong acid residue. It is also possible to combine the radical release agent having a sulfur-containing strong acid residue with a reducing agent such as sodium formaldehydesulfoxylate, sodium sulfite, and sodium thiosulfate.

Examples of the epoxy group-containing monomer include glycidyl ethers of unsaturated alcohols such as (meth)allyl glycidyl ether; glycidyl esters of (meth)acrylic acids such as glycidyl (meth)acrylate; glycidyl esters of unsaturated acids such as glycidyl p-vinylbenzoate, methylglycidyl itaconate, glycidyl ethylmaleate, glycidyl vinylsulfonate, and glycidyl (meth)allylsulfonate; and epoxide olefins such as butadiene monoxide, vinylcyclohexene monoxide, and 2-methyl-5,6-epoxyhexene. This monomer is generally used in an amount to provide at least 0.5% by weight of epoxy group in the copolymer.

Examples of the optional monomer which can be used in addition to the vinyl chloride and epoxy-containing monomer include vinyl carboxylates such as vinyl acetate and vinyl propionate; vinyl ethers such as methyl vinyl ether, isobutyl vinyl ether, and cetyl vinyl ether; vinylidenes such as vinylidene chloride and vinylidene fluoride; esters of unsaturated carboxylic acids such as diethyl maleate, butylbenzyl maleate, di-2-hydroxyethyl maleate, dimethyl itaconate, methyl (meth)acrylate, ethyl (meth)acrylate, lauryl (meth)acrylate, and 2-hydroxypropyl (meth)acrylate; olefins such as ethylene and propylene; and unsaturated nitriles such as (meth)acrylonitrile.

Polyurethane resins

The polyurethane resins which are used in combination with the vinyl chloride resin are especially effective because of wear resistance and adhesion to the substrate. They may have a polar group, hydroxyl group or the like in a side chain, preferably a polar group containing sulfur S or phosphorus P.

The polyurethane resins generally encompass those resins which are obtained by reacting a hydroxyl group-containing resin such as a polyester polyol and/or polyether polyol with a polyisocyanate-containing compound. They are synthesized by polymerizing the reactants which will be described later until a number average molecular weight of about 500 to 200,000 is reached and such that they may have a Q value (weight average molecular weight/number average molecular weight) of about 1.5 to 4.

The preferred polar groups contained in the polyurethane resin are sulfur-containing polar groups such as —$SO_3M$ (sulfonate) and —$SO_4M$ (sulfate) groups and phosphorus-containing polar groups such as phosphonate groups (=$PO_3M$), phosphinate groups (=$PO_2M$), phosphinous groups (=POM), —P=O(OM$^1$)(OM$^2$), and —OP=O(OM$^1$)(OM$^2$) as well as —COOM, —$NR_3X$, —$NR_2$, —OH, epoxy, —SH, and —CN. Herein, M, M$^1$ and M$^2$ represent H, Li, Na, K, —$NR_3$ or —$NHR_2$; R is an alkyl group or H; and X is a halogen atom. Inter alia, Na is the most preferred M. It is preferred to use polyurethane resins wherein at least one polar group selected from these polar groups has been introduced through copolymerization or addition reaction. These polar groups are preferably contained in a molecule in an amount of 0.01 to 10% by weight, especially 0.02 to 3% by weight calculated as atoms. The polar groups may be attached to the backbone or branches of the skeleton resin.

In the practice of the invention, the polyurethane resins are preferably used such that at least two polyurethane resins having a glass transition temperature Tg in the range: $-20°$ C.$\leq Tg \leq 80°$ C. and different Tg values from each other are contained in the binder. The amount of polyurethane resins combined is preferably 10 to 90% by weight of the entire binder. The containment of a plurality of polyurethane resins is preferred in presenting a satisfactory profile of running stability (dynamic stability) in a high temperature environment, calender workability and electromagnetic properties.

These polyurethane resins may be obtained by well-known methods in a solvent or solventless system using a particular polar group-containing compound and/or a source material containing a starting resin having reacted with a particular polar group-containing compound.

Examples of the hydroxyl group-containing compound used as a source reactant in the synthesis of polyurethane resins include polyalkylene glycols such as polyethylene glycol, polybutylene glycol, and polypropylene glycol, alkylene oxide adducts of bisphenol-A, various glycols, and polyester polyols having a hydroxyl group at the end of a molecular chain.

The carboxylic acid components of the polyester polyols used as a source reactant include aromatic dicarboxylic acids such as terephthalic acid, isophthalic acid, orthophthalic acid, and 1,5-naphthalic acid; aromatic oxycarboxylic acids such as p-oxybenzoic acid and p-(hydroxyethoxy)benzoic acid; aliphatic dicarboxylic acids such as succinic acid, adipic acid, azelaic acid, sebacic acid, and dodecanedicarboxylic acid; unsaturated fatty acids and alicyclic dicarboxylic acids such as fumaric acid, maleic acid, itaconic acid, tetrahydrophthalic acid, and hexahydrophthalic acid; and tri- and tetracarboxylic acids such as trimellitic acid, trimesic acid, and pyromellitic acid. The alcohol components include those compounds having 2 to 4 hydroxyl groups, for example, ethylene glycol, propylene glycol, 1,3-propane diol, 1,4-butane diol, 1,5-pentane diol, 1,6-hexane diol, neopentyl glycol, diethylene glycol, dipropylene glycol, 2,2,4-trimethyl-1,3-pentane diol, 1,4-cyclohexane dimethanol, alkylene oxide adducts of bisphenol-A or the like, alkylene oxide adducts of hydrogenated bisphenol-A, polyethylene glycol, polypropylene glycol, polytetramethylene glycol, trimethylol ethane, trimethylol propane, glycerin, and pentaerythritol.

Other useful polyester polyols are lactone series polyester diol chains obtained by ring-opening polymerization of lactones such as caprolactone.

Examples of the polyisocyanate used herein include diisocyanates such as tolylene diisocyanate, phenylene diisocyanate, diphenylmethane diisocyanate, hexamethylene diisocyanate, tetramethylene diisocyanate, naphthalene diisocyanate, isophorone diisocyanate, xylylene diisocyanate, diisocyanatomethylcyclohexane, diisocyanatocyclohexylmethane, dimethoxybiphenylene diisocyanate, and diisocyanate diphenyl ether as well as less than 7 mol % based on the entire isocyanato group of triisocyanate compounds such as tolylene diisocyanate trimers and hexamethylene diisocyanate trimers.

Desirably, the vinyl chloride copolymer and the urethane resin having a sulfur and/or phosphorus-containing polar group are mixed in a weight ratio of from 10:90 to 90:10. In addition to these resins, there may be contained any of well-known resins in an amount of up to 20% by weight of the entire composition.

Other thermoplastic resins

Useful thermoplastic resins other than the above-mentioned ones include, for example, (meth)acryl resins, polyester resins, acrylonitrile-butadiene copolymers, polyamide resins, polyvinyl butyral, nitrocellulose, styrene-butadiene copolymers, polyvinyl alcohol resins, acetal resins, epoxy resins, phenoxy resins, polyether resins, polyfunctional polyethers such as polycaprolacton, polyamide resins, polyamide resins, phenolic resins, polybutadiene elastomers, chlorinated rubber, acrylic rubber, isoprene rubber, and epoxy-modified rubber.

Thermosetting or reactive resins

The thermosetting resins used herein include those resins which undergo polymerization condensation, for example, phenolic resins, epoxy resins, polyurethane curing resins, urea resins, butyral resins, formal resins, melamine resins, alkyd resins, silicone resins, acrylic reaction resins, polyamide resins, epoxy-polyamide resins, saturated polyester resins, and urea-formaldehyde resins.

Among these resins, those having a hydroxyl group at a terminal and/or side chain are preferred as the reactive resin because crosslinking with the aid of isocyanates or electron beam crosslinking can be readily utilized. Moreover, these resins may contain acidic and basic polar groups including —COOH, —SO$_3$M, —OSO$_3$M, —OPO$_3$X, —PO$_3$X, —PO$_2$X, —NR$_3$Cl, and —NR$_2$ as a polar group at a terminal or side chain because their containment is effective for improving dispersity. It is understood that M and X are as defined previously. These resins may be used alone or in a mixture of two or more.

The crosslinking agents which can be used in curing the binder resin are various polyisocyanates. It is preferred to use crosslinking agents in the form of at least one of tolylene diisocyanate, hex methylene diisocyanate and methylene diisocyanate which is modified with trimethylol propane, etc. so as to have a plurality of hydroxyl groups or isocyanurate type crosslinking agents having three molecules of a diisocyanate compound. The content of the crosslinking agent is preferably 10 to 30 parts by weight per 100 parts by weight of the resin. The crosslinking agent causes the binder resin to bond with hydroxyl groups contained therein in a three-dimensional fashion to improve the durability of a coating layer.

Exemplary crosslinking agents include Colonate L, HL and 3041 manufactured by Nippon Polyurethane Industry K.K., 24A-100 and TPI-100 manufactured by Asahi Chemical Industry Co., LTD., and Desmodur L and N manufactured by B. F. Goodrich. The crosslinking agent is used by adding to the resin in an amount of 1 to 50% by weight.

These reactive or thermosetting resins are generally cured by heating in a heating oven at 50° to 80° C. for 6 to 100 hours or moving through an oven at 80° to 120° C. at a low speed.

Electron beam-sensitive modified resins

Also useful are the above mentioned copolymers which have been modified to be sensitive to electron beams by introducing (meth)acrylic double bonds in a conventional manner. By the acrylic double bond used herein is meant a (meth)acryloyl group which is a residue of (meth)acrylic acid, (meth)acrylates or (meth)acryl amides.

Well-known processes of effecting modification to provide electron beam sensitivity include urethane modification of reacting a resin with a reaction product (adduct) of tolylene diisocyanate (TDI) with 2-hydroxyethyl (meth)acrylate (2-HEMA); tailored urethane modification of reacting a resin with a monomer having at least one ethylenic unsaturated double bond and one isocyanate group in a molecule and free of a urethane bond in a molecule (e.g., 2-isocyanatoethyl (meth)acrylate); and ester modification of reacting a resin having a hydroxyl or carboxylic group with a compound having a (meth)acryl group and a carboxylic anhydride or dicarboxylic acid. Among these, the tailored urethane modification process is preferred because increasing the relative content of vinyl chloride copolymer does not cause embrittlement and a coating having improved dispersion and surface properties can be formed.

The content of an electron beam-sensitive group is 1 to 40 mol %, preferably 10 to 30 mol % of the hydroxyl group component from the aspects of stability during manufacture and electron beam curability. Especially in the case of vinyl chloride copolymers, by reacting a monomer so as to provide 1 to 20, preferably 2 to 10 sensitive groups per molecule, there is obtained an electron beam-sensitive resin which is well dispersible and curable.

Where such electron beam-sensitive modified resins are used, conventional well-known polyfunctional acrylates may be mixed in an amount of 1 to 50% by weight in order to improve the crosslinking rate.

Where an electron beam-sensitive modified resin is used as the binder, a process of using electron beams and/or ultraviolet radiation as an irradiation source for effecting curing is advantageous from the standpoints of control of an absorption dose, incorporation into a manufacturing line, and shielding of ionizing radiation. In the case of electron beams, it is convenient to use an electron beam accelerator with an accelerating voltage of 100 to 750 kV, preferably 150 to 300 kV so as to provide irradiation in a dose of 20 to 200 kilogrey. Upon electron beam crosslinking, it is important to irradiate electron beams in an inert gas atmosphere of $N_2$, He, or $CO_2$ having an oxygen concentration of up to 1%. This is to prevent $O_3$, which is created by radiation, from capturing radicals. When ultraviolet radiation is used, on the other hand, a conventional well-known photo-polymerization sensitizer may be added to a binder containing an electron beam-sensitive modified resin, and a UV lamp such as a xenon discharge lamp and hydrogen discharge lamp may be used as an irradiation source.

<Non-magnetic powder>

In order to increase the mechanical strength of a magnetic layer and to prevent clogging of a magnetic head, various non-magnetic powders are preferably contained in the magnetic layer. The non-magnetic powder may be appropriately selected from the following non-magnetic inorganic and organic powders as is necessitated. The non-magnetic powder is preferably used in the magnetic layer in an amount of 0.1 to 20% by weight based on the magnetic powder.

Non-magnetic inorganic powder

Examples of the non-magnetic inorganic powder other than carbon black include metals, metal oxides, metal carbonates, metal sulfates, metal nitrides, metal carbides, and metal sulfides. Illustrative examples are α-alumina, β-alumina, γ-alumina, θ-alumina, δ-alumina, dichromium trioxide, α-iron oxide, γ-iron oxide, goethite, $SiO_2$, ZnO, $TiO_2$, $ZrO_2$, $SnO_2$, silicon nitride, boron nitride, silicon carbide, titanium carbide, molybdenum carbide, boron carbide, tungsten carbide, calcium carbonate, barium carbonate, strontium carbonate, magnesium carbonate, barium sulfate, zinc sulfide, molybdenum disulfide, tungsten disulfide, and artificial diamond, alone or in a admixture thereof.

The non-magnetic inorganic powders may be used in a proper combination so as to comply with the requirements of a magnetic layer and this similarly applies when they are added to a backcoat layer or undercoat layer. The non-magnetic inorganic powders may be of a single system or of a mixed system while a single system may be used alone with its particle size distribution properly selected.

The shape and size of non-magnetic inorganic powder particles may be properly selected in accordance with a balance of the durability required for media, head abrasion, and outputs at the shortest recording wavelength. The preferred particles are of spherical or polygonal shape and have a size of 0.01 to 0.7 μm.

The non-magnetic inorganic powder need not be 100% pure. Its advantage is not lost if the main component occupies at least 70%.

The non-magnetic inorganic powder should have a low content of ions of water-soluble alkali metals, alkaline earth metals, chlorine, sulfuric acid, and nitric acid. Higher ion contents adversely affect the storage property of a resultant medium.

The non-magnetic inorganic powder may be concurrently added during kneading or dispersion of ferromagnetic powder or previously dispersed in a binder which is added during dispersion of a magnetic paint composition.

Carbon black

Carbon black is also used as the non-magnetic inorganic powder and includes furnace carbon black, thermal carbon black, and acetylene black.

The size of carbon black particles may be properly selected in accordance with a balance of various properties required for media, for example, between friction property and outputs at the shortest recording wavelength (which depends on surface roughness) as well as electric resistance.

Carbon black species may be used in a proper combination so as to comply with the requirements of a magnetic layer and this similarly applies when they are added to a backcoat layer or undercoat layer. The carbon black species may be of a single system or of a mixed system while a single system may be used alone with its particle size distribution properly selected.

Carbon black preferably has a mean particle size of 10 to 400 nm, more preferably 20 to 350 nm. When electromagnetic properties are preferentially considered, the preferred size is from 20 to 40 nm. When friction properties are of importance, the preferred size is a maximum size in the range of 40 to 350 nm which is permissible with respect to electromagnetic properties.

Carbon black preferably has a specific surface area (BET value) of 100 to 500 $m^2/g$, more preferably 150 to 400 $m^2/g$.

Since the particle size, BET value and DBP oil absorption amount of carbon black are closely correlated to each other and it is virtually impossible that one of these factors have a value extremely apart from the values of the remaining factors, it is necessary that these three factors be empirically selected pursuant to the requirements of a medium and the dispersion and flow properties of a paint composition.

Carbon black may be concurrently added during kneading of ferromagnetic powder or previously dispersed in a binder which is added during dispersion of a magnetic paint composition.

Carbon black may be surface treated with lubricants, dispersants or the like or partially graphitized at the surface prior to use.

The detail of carbon black which can be used herein is described in the literature, for example, "Carbon Black Manual" edited by the Carbon Black Society.

Non-magnetic organic powder

Examples of the non-magnetic organic powder used herein include acryl-styrene resin powder, benzoguanamine resin powder, melamine resin powder, phthalocyanine pigments, polyolefin resin powder, polyester resin powder, polyamide resin powder, polyamide resin powder, fluorinated hydrocarbon resin powder, and divinylbenzene resin powder.

<Solvent>

A paint composition for forming a magnetic layer is prepared by adding an organic solvent to the aforementioned components. The solvent used in paint preparation is not critical and may be properly selected by taking into account the solubility and compatibility of the binder, drying efficiency and the like. For example, useful diluents or solvents include ketones such as methyl ethyl ketone, methyl isobutyl ketone, and cyclohexanone; aromatic hydrocarbons such as toluene and xylene; esters such as ethyl acetate and butyl acetate; alcohols such as isopropanol and butanol; dioxane, tetrahydrofuran, dimethylformamide, hexane, and chlorinated hydrocarbons, which may be used as a single solvent or a mixture of solvents in an arbitrary mix ratio.

These organic solvents need not be 100% pure and may contain impurities such as isomers, unreacted matter, side reaction products, decomposed products, oxides and water in addition to a main component, with the content of impurities being preferably up to 5% by weight, more preferably up to 3% by weight. Higher impurity contents would adversely affect the dispersion of magnetic powder, storage stability of paint, curing of magnetic layers, and storage properties of media.

Preferably theses organic solvents are used in amounts of 10 to 10,000% by weight, especially 100 to 5,000% by weight based on the total weight of the binder such that a paint composition at a coating stage may have a viscosity of 5 to 100 centipoise as measured by a cone plate type or dual cylinder type viscometer at a shear rate of 3,000 $sec^{-1}$. With respect to the proportion of solvent used relative to the entire paint composition, the solvent may be used to give a non-volatile concentration of about 5 to 45% by weight, preferably about 10 to 40% by weight. The type, mix ratio and amount of the solvent(s) are preferably determined so as to fall in the above-defined viscosity range by taking into account the type, specific surface area and particle size of pigment used in paint, the magnetization thereof if the pigment is a magnetic powder, and the volume or weight packing fraction of pigment as well as the dilution stability of paint.

Also preferably, the addition of an organic solvent is successively carried out in various steps of the paint preparation process, for example, by a procedure of successively adding the solvent to the tank with stirring while regulating the flow rate, or gradually mixing the solvent with paint in piping. It is further preferred that filtration and/or dispersion treatment be carried out at the time of addition of or dilution with the solvent, if possible. These procedures, if carries out, can improve the stability of a paint composition and prevent formation of agglomerates and foreign matter.

<Additives>

Additionally, dispersants, lubricants, and various other additives may be added to the magnetic layer if necessary.

Lubricants

As the lubricant used herein, fatty acids and/or fatty acid esters are especially preferred among numerous well-known lubricants. Preferred are mono-basic fatty acids having 12 to 24 carbon atoms (which may contain an unsaturated bond or be branched), and mono-fatty acid esters, di-fatty acid ester and tri-fatty acid esters of mono-basic fatty acids having 10 to 24 carbon atoms (which may contain an unsaturated bond or be branched) with any one of mono-, di-, tri-, tetra-, penta- and hexa-hydric alcohols and cyclic or polysaccharide reduced alcohols (e.g., sorbitan and sorbitol) having 2 to 22 carbon atoms (which may contain an unsaturated bond or be branched), with a mixture of two or more of them being acceptable.

Illustrative examples of the lubricant include such mono-basic fatty acids as lauric acid, myristic acid, palmitic acid, stearic acid, oleic acid, linoleic acid, linolenic acid, behenic acid, erucic acid, and elaidic acid; and such fatty acid esters as butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

These fatty acids and/or fatty acid esters exert their effect as lubricant or dispersant when their total content is at least 0.1% by weight based on the magnetic powder. The effect becomes more prominent with an increasing content. However, with a total content in excess of 20% by weight based on the magnetic powder, the fatty acids and/or fatty acid esters cannot dwell within a magnetic layer and are exposed at the coating surface, causing adverse influences such as contamination of magnetic heads and output drops. Therefore, the total content of fatty acids and/or fatty acid esters in a magnetic layer should preferably be 0.1 to 20% by weight, more preferably 1 to 15% by weight, further preferably 1 to 12% by weight based on the magnetic powder.

Beside the magnetic layer, it is preferred that the lubricant be contained in a backcoat layer, undercoat layer or the like. Especially for a thin magnetic layer, containment of the lubricant in an undercoat layer is effective since still durability is improved. Where a backcoat layer is provided, the lubricant is contained more on the backcoat layer side whereby surface lubricity is improved by transfer of the lubricant to the magnetic layer surface.

These fatty acids and/or fatty acid esters need not be 100% pure and may contain impurities such as isomers, unreacted matter, side reaction products, decomposed products, and oxides in addition to a main component. It is noted that the content of impurities is preferably up to 40% by weight, more preferably up to 20% by weight of the entire lubricant.

Other additives

Additives other than the above mentioned are those having lubricating, antistatic, dispersing and plasticizing functions.

Exemplary additives are nonionic surfactants, for example, silicone oils, fluoride oils, fluorinated hydrocarbon group-containing alcohols, fatty acids, esters, ethers, paraffins, metal (Li, Na, K, Ca, Ba, Cu, Pb, etc.) salts of the aforementioned mono-basic fatty acids, alcohols for preparing the fatty acid esters, alkoxyalcohols, polyethylene oxide-added monoalkyl ether fatty acid esters, aliphatic or cyclic amines, fatty acid amides, quaternary ammonium salts, polyolefins, polyglycols, polyphenyl ethers, fluorine-containing alkyl sulfates and alkali metal salts thereof, alkylene oxides, glycerins, glycidols, and alkyl-phenol ethylene oxide adducts; cationic surfactants and alkali metal salts thereof such as phosphoniums and sulfoniums; anionic surfactants containing acid groups such as carboxylic acid, sulfonic acid, phosphoric acid, sulfate ester, and phosphate ester groups and alkali metal salts thereof; ampholytic surfactants such as amino acids, aminosulfonic acids, sulfuric acid or phosphoric acid esters of aminoalcohols, and alkyl betaines. These surfactants are described in detail in "Surfactant Manual" (published by Sangyo Tosho K.K.).

The amount of these additives added is preferably up to 10% by weight, especially 0.01 to 5% by weight in total based on the magnetic powder.

All or some of the fatty acids, fatty acid esters and additives used herein may be added at any step of the paint preparation process. For example, the additives may be mixed with pigment powder prior to the kneading step, or added during the kneading step of pigment powder, binder and solvent, during the dispersing step, after dispersion, or immediately before coating. Alternatively a solution of the additives diluted with or dispersed in a solvent may be applied onto a coating.

<Magnetic layer thickness>

The thickness of the magnetic layer is not critical and may be properly determined in accordance with various conditions such as recording wavelength. In a single layer structure, the preferred thickness is 0.5 to 10.0 μm, more preferably 1.0 to 7.0 μm. A too thin magnetic layer would lead to low coating strength and poor durability. A too thick magnetic layer would lead to poor coatability and deteriorated electromagnetic properties and in the case of a short recording wavelength, an increased self-demagnetizing loss and deteriorated overwrite properties.

In a multi-layered structure, the magnetic layer formed as the uppermost layer should have a thickness of 0.1 to 0.8 μm, more preferably 0.15 to 0.6 μm though it varies with different embodiments as mentioned above. A too thin magnetic layer would lead to low coating strength and poor durability. A too thick magnetic layer would lead to poor coatability and deteriorated electromagnetic properties and in the case of a short recording wavelength, an increased self-demagnetizing loss and deteriorated overwrite properties.

Magnetic Layer Other Than Uppermost Layer in Multi-Layered Structure

Where a coating other than the uppermost layer is a magnetic layer, this magnetic layer may have approximately the some construction as the magnetic layer formed as the uppermost layer. It is to be noted that the non-magnetic inorganic powder in the magnetic layer formed as the uppermost layer plays the main role of preventing head clogging, the amount of non-magnetic inorganic powder in the magnetic layer other than the uppermost layer is preferably less than that of the magnetic layer as the uppermost layer in order to prevent any loss of electromagnetic properties. Since the non-magnetic inorganic powder in the magnetic layer other than the uppermost layer is added mainly for the purpose of improving coating strength, its mean particle size should preferably be equal to or greater than that of non-magnetic inorganic powder added to the uppermost layer.

The magnetic layer other than the uppermost layer preferably has a thickness of 0.1 to 3.0 µm, more preferably 0.3 to 2.5 µm, further preferably 0.5 to 1.5 µm. If the magnetic layer other than the uppermost layer is too thin, it would be more readily affected by the surface property of the non-magnetic substrate, which would result in deteriorated surface roughness, deteriorated surface roughness of the uppermost layer, and a lowering of electro-magnetic properties. Additionally, light transmittance would become high, which raises a problem when the tape end is detected by a change of light transmittance. Also, even if the magnetic layer other than the uppermost layer is made thicker than a certain level, performance is not noticeably improved.

Non-Magnetic Layer

The non-magnetic layer provided as a coating other than the uppermost layer in a multi-layered structure contains at least a non-magnetic powder and a binder.

As the non-magnetic powder, any of the above-mentioned non-magnetic powders may be used.

The binder, solvent, lubricant and additives used in the non-magnetic layer may be similar to the above-described ones used in the magnetic layer.

Among the non-magnetic powders, the non-magnetic inorganic powder is preferably used in an amount of 50 to 2,000% by weight based on the binder, the non-magnetic organic powder is preferably used in an amount of 0.1 to 20% by weight based on the binder, and carbon black is preferably used in an amount of 10 to 500% by weight based on the binder. Also the total content of fatty acids and/or fatty acid esters as the lubricant in the non-magnetic layer is preferably 0.01 to 100% by weight based on the binder. Further the total content of the other additives in the non-magnetic layer is preferably 0.005 to 50% by weight based on the binder.

The non-magnetic layer preferably has a thickness of 0.1 to 3.0 µm, more preferably 0.3 to 2.5 µm, further preferably 0.5 to 1.5 µm. If the non-magnetic layer is too thin, it would be more readily affected by the surface property of the non-magnetic substrate, which would result in deteriorated surface roughness of the non-magnetic layer and hence, deteriorated surface roughness of the uppermost layer, and a lowering of electromagnetic properties. Additionally, light transmittance would become high, which raises a problem when the tape end is detected by a change of light transmittance. Also, even if the non-magnetic layer is made thicker than a certain level, performance is not noticeably improved.

Backcoat Layer

The backcoat layer is provided for the purposes of improving running stability and preventing electric charging of the magnetic layer. The backcoat layer preferably contains the aforementioned carbon black. Preferably carbon black is used in an amount of 10 to 500% by weight based on the binder. Too low contents of carbon black tend to lose the antistatic effect and running stability. Additionally, light transmittance would become high, which raises a problem in a system where the tape end is detected by a change of light transmittance. Too high contents of carbon black, on the other hand, would cause the backcoat layer to lose strength and hence deteriorate in running durability. Also, too high contents of the binder would invite an excessive increase of friction with the medium slide contact path and a lowering of running stability, causing accidents during operation. There also occur problems like blocking with the magnetic layer. With too low contents of the binder, the backcoat layer would lose strength to lower running durability.

In addition to the aforementioned carbon black, the backcoat layer may contain non-magnetic inorganic powders such as abrasives as described in the explanation of the magnetic layer in order to increase mechanical strength. The content of these non-magnetic inorganic powders is preferably 0.1 to 5 parts, more preferably 0.5 to 2 parts by weight per 100 parts by weight of carbon black. The non-magnetic inorganic powder preferably has a mean particle size of about 0.1 to 0.5 µm. Too low contents of the non-magnetic inorganic powder would provide the backcoat layer with insufficient mechanical strength whereas too high contents of the non-magnetic inorganic powder would increase the abrasion quantity of guides and other members in the medium slide contact path. It is to be noted that when non-magnetic organic powder is added to the backcoat layer, it is preferably used in an amount of 0.1 to 20% by weight based on the binder.

The binder, crosslinking agent, solvent, lubricant and additives used in the backcoat layer may be similar to the above-described ones used in the magnetic layer-forming paint. The total content of fatty acids and/or fatty acid esters as the lubricant in the backcoat layer is preferably 0.01 to 100% by weight based on the binder. Further the total content of the other additives in the backcoat layer is preferably 0.005 to 50% by weight based on the binder.

The backcoat layer preferably has a thickness of up to 1.0 µm, more preferably 0.1 to 1.0 µm, further preferably 0.2 to 0.8 µm (at the end of calendering). A too thick backcoat layer tends to increase its friction with the medium slide contact path, losing running stability. With a too reduced thickness, on the other hand, the backcoat layer would deteriorate in surface property by the influence of the surface property of a non-magnetic substrate. Then when the backcoat layer is thermoset, the surface roughness of the backcoat layer is transferred to the surface of the magnetic layer, resulting in losses of high-frequency range outputs, S/N and C/N. Further if the backcoat layer is too thin, it can be scraped during operation of the medium.

Preparation Process

A process of preparing a magnetic recording medium is described below.

FIG. 1 at the left side shows the preferred procedure used when the invention is applied to the preparation of a magnetic layer-forming paint composition and a non-magnetic layer-forming paint composition and FIG. 1 at the right side shows the preferred procedure used when the invention is applied to the preparation of a backcoat layer-forming paint composition.

The procedure for the preparation of a magnetic layer-forming paint composition and a non-magnetic layer-forming paint composition includes a kneading step of kneading or milling solids with a binder solution, a dispersing step of dispersing the solids in the kneaded product resulting from the kneading step, and a viscosity adjusting step of adding a viscosity adjusting solution to the dispersion resulting from the dispersing step to form a paint composition. The procedure for the preparation of a back layer-forming paint composition includes a dispersing step of dispersing solids in a binder solution and a viscosity adjusting step of adding a viscosity adjusting solution to the dispersion resulting from the dispersing step to form a paint composition.

Each of the steps may be divided into two or more stages while a raw material may be added in divided portions in two or more steps.

In FIG. 1, the procedure for the preparation of a magnetic layer-forming paint composition and a non-magnetic layer-forming paint composition is shown as involving a step of filtering a binder solution (filtering step I), a step of filtering a kneaded product (filtering step II), a step of filtering a dispersion (filtering step III), a step of filtering a viscosity adjusting solution (filtering step IV), and a step of filtering a paint composition (filtering step V). The procedure for the preparation of a backcoat layer-forming paint composition is shown as involving a step of filtering a binder solution (filtering step VI), a step of filtering a dispersion (filtering step VII), a step of filtering a viscosity adjusting solution (filtering step VIII), and a step of filtering a paint composition (filtering step IX). Among these filtering steps, essential steps and optional steps are different with respective embodiments as previously mentioned.

The binder solution is prepared by dissolving a binder resin in an organic solvent. The ratio of binder resin to organic solvent, binder resin/organic solvent, is from about 10/100 to about 80/100 in weight ratio. Ratios within this range facilitate preparation of a uniform solution, allowing smooth operation of subsequent filtering steps. In contrast, with too high ratios, the binder resin would be dissolved with more difficulty, a uniform solution be difficult to prepare, and a larger load be applied in subsequent filtering steps. With too low ratios, a headed product would become low in viscosity during the following step of heading so that desirable shear forces are not available.

The preparation of the binder solution is followed by filtering step I for the magnetic layer-forming paint composition and non-magnetic layer-forming paint composition, and by filtering step VI for the backcoat layer-forming paint composition. Filtering steps I and VI are to filter the binder solution through filter means for removing impurities, gelled binder and undissolved binder.

For the magnetic layer-forming paint composition and non-magnetic layer-forming paint composition, a kneading step is inserted. In the kneading step, solids such as magnetic powder, non-magnetic powder, and abrasive are headed with the binder solution. The kneaded product should preferably have a solids concentration of 65 to 95% by weight, more preferably 70 to 90% by weight. If the solids concentration is too low, the kneaded product would be too low in viscosity to ensure sufficient shear forces during kneading, resulting in insufficient dispersion of solids. On the other hand, if the solids concentration is too high, the kneaded product would be too high in viscosity to ensure optimum shear forces during kneading. For the kneading purpose, machines having strong milling forces are preferably used, for example, open kneaders, pressure kneaders, high speed mixers, continuous kneaders, three-roll mills, and two-roll mills.

After kneading, the kneaded product is diluted by adding a binder solution or an organic solvent, in order to adjust the kneaded product to a viscosity adequate for dispersion. In a batchwise processing system, dilution is carried out within the kneader with the advantages that the kneader is cleaned and the manufacturing yield is improved. The binder solution used for dilution is preferably the one that has passed the aforementioned filtering step I.

After dilution, filtering step II is provided. Filtering step II is to remove agglomerates of solids from the kneaded product by filter means.

The dispersing step following filtering step II is to disperse solids such as magnetic powder and non-magnetic powder in the kneaded product. The dispersing step following filtering step VI is to knead and disperse solids such as carbon black in the binder solution. The dispersion should preferably have a solids concentration of 30 to 65% by weight, more preferably 35 to 60% by weight for the magnetic layer-forming paint composition and non-magnetic layer-forming paint composition and 15 to 45% by weight, more preferably 15 to 40% by weight for the backcoat layer-forming paint composition. If the solids concentration is too low, the viscosity during dispersion would be too low, resulting in insufficient dispersion of solids. On the other hand, if the solids concentration is too high, the viscosity during dispersion would be too high, also resulting in insufficient dispersion of solids. For the dispersing purpose, media agitation type dispersing machines such as sand grinder mills, pin mills, and agitator mills are preferably used. High specific gravity dispersing media are desirably used in these dispersing machines. Ceramic media such as zirconia are suitable while conventionally used glass beads, metal beads and alumina beads may also be selected for a particular blend of components.

The dispersing step is followed by filtering step III for the magnetic layer-forming paint composition and non-magnetic layer-forming paint composition, and by filtering step VII for the backcoat layer-forming paint composition. Filtering steps III and VII are to filter the dispersion through filter means to remove non-dispersed matter and at the same time, to improve the dispersion of magnetic powder, non-magnetic powder and carbon black.

The viscosity adjusting step is to add a viscosity adjusting solution to the dispersion and mix them for adjusting the viscosity to a level adequate as a paint composition. The viscosity adjusting solution contains an organic solvent and/or binder solution as a solvent, preferably an organic solvent as a solvent. It is prepared by dissolving in this solvent a lubricant such as fatty acids and fatty acid esters. The ratio of lubricant to solvent, lubricant/solvent, is from about 0.1/100 to about 5/100 in weight ratio. Ratios within this range facilitate preparation of a uniform solution, allowing smooth operation of subsequent filtering steps. In contrast, with too high ratios, the lubricant would be dissolved with more difficulty, a uniform solution be difficult to prepare, and a larger load be applied in subsequent filtering steps. With too low ratios, the amount of lubricant is too short to form a satisfactory paint composition. As shown in the figure, the viscosity adjusting solution is filtered by filter means in filtering step IV for the magnetic layer-forming paint composition and non-magnetic layer-forming paint composition and in filtering step VIII for the backcoat layer-forming paint composition, both for removing impurities, gelled matter and undissolved matter like the above mentioned filtering steps I and VI. The paint composition should preferably have a solids concentration of 5 to 45% by weight, more preferably 10 to 40% by weight for the magnetic layer-forming paint composition and non-magnetic layer-forming paint composition and 8 to 30% by weight, more preferably 10 to 25% by weight for the backcoat layer-forming paint composition. With higher or lower solids concentrations, formation of an even coating would be difficult.

After the paint composition is prepared by viscosity adjustment, there follows filtering step V for the magnetic layer-forming paint composition and non-magnetic layer-forming paint composition, or filtering step IX for the backcoat layer-forming paint composition. Filtering steps V and IX are to filter the paint through filter means to remove agglomerates of magnetic powder, non-magnetic powder, and carbon black and non-dispersed matter.

The thus prepared paint composition is a stock paint composition. In a general practice, a curing agent is added to the stock paint composition prior to coating to form a final paint which is supplied to a coating step. Immediately before the final paint is coated, there is preferably provided filtering step X for the magnetic layer-forming paint composition and non-magnetic layer-forming paint composition and filtering step XI for the backcoat layer-forming paint composition as shown in FIG. 1. Since there is the likelihood that the addition of a curing agent change the dispersion state of particles in the paint composition to form agglomerates, filtering steps X and XI are inserted for the purposes of removing the agglomerates formed after filtering steps V and IX, respectively. The pressure applied to the paint compositions in filtering steps X and XI is controlled so as to provide a constant amount of paint supplied to the applicator.

In general, the paint is applied to a non-magnetic substrate in the form of a length of film unraveled from a payoff roll by various coating means including gravure coating machines, reverse roll coating machines, and extrusion nozzle coating machines.

In general, the non-magnetic substrate is processed prior to coating of the paint by various well-known means including wet cleaning with water or solvents, dry cleaning using unwoven fabric and ultrafine fiber woven fabric as a wiper, and non-contact cleaning with compressed air, vacuum or ionized air, for the purposes of cleaning and surface tailoring. Also, various well-known non-contact surface treatments such as corona discharge, ultraviolet ray irradiation and electron beam irradiation are often carried out for the purposes of improving the adhesion between paint and non-magnetic substrate and modifying the surface to be coated.

Further, for the purposes of improving adhesion, primers such as aqueous primers, emulsion system primers, and solvent system primers may be applied alone or in combination with the above mentioned surface treatment. Instead of undercoating of such primer resins alone, a paint composition having a non-magnetic inorganic or organic pigment dispersed in a binder may be coated to form a primer or undercoat layer, optionally in combination with the above-mentioned surface treatment.

After the coating step, generally various treatments intended for smoothing of a wet coating of magnetic paint applied on the non-magnetic substrate and regulation of the coating may be carried out as the next step. As the smoothing means there may be used well-known techniques including contacting of resinous, metallic, and ceramic films or bars, and non-contact techniques as by vibration by a magnetic field or ultrasonic wave using permanent magnets or electromagnets while these techniques may be used alone or in combination pursuant to the required properties.

Further, after a magnetic layer is formed, it is necessary to effect orientation of magnetic particles in the layer by applying a magnetic field thereacross. The orientation may be in a longitudinal, perpendicular or oblique direction with respect to the medium. To achieve orientation in a selected direction, permanent magnets such as ferrite magnets and rare earth magnets, electromagnets or solenoids are preferably used alone or in combination to apply a magnetic field of 1,000 G or more. To achieve the maximum orientation at the end of drying, a step of adequate drying may be inserted prior to orientation or drying may be carried out concurrent with orientation. In the case of floppy disks, magnetic particles once oriented spontaneously by coating are re-oriented to provide as much a randomly oriented state as possible by permanent magnets, electromagnets or solenoids.

The magnetic coating which has been treated after coating in this way is generally dried and fixed by well-known drying and evaporating means, for example, hot air, far-infrared radiation, electric heater, and vacuum line built in a drying furnace or well-known curing means, for example, UV lamps and radiation irradiating devices. The drying temperature ranges from room temperature to about 300° C. and may be suitably determined in accordance with the heat resistance of the non-magnetic substrate, solvent type, concentration and the like. It is also acceptable to provide the drying furnace with a temperature gradient. The atmosphere gas in the drying furnace may be ambient air or inert gases. Since curing reaction takes place where drying is effected by UV lamps or radiation irradiating devices, it is preferred to utilize other drying means as much as possible when post-treatment is considered. Also since irradiation of ultraviolet or other radiation to a solvent-containing coating can cause ignition or smoking, it is also preferred in this case to utilize or combine other drying means as much as possible.

After the magnetic layer is dried in this way, calendering is carried out as a surface smoothing treatment if necessary. Used as the calendering rolls are a combination of a plastic roll made of heat resistant resins such as epoxy, polyester, nylon, polyamide, polyamide, and polyamide-amide resins (which may have carbon, metal or other inorganic compounds incorporated therein) with a metallic roll (three to seven stages of this combination) or a combination of metallic rolls alone. The preferred calendering treatment includes a temperature of at least 70° C., more preferably at least 80° C., a linear pressure of at least 200 kg/cm, more preferably at least 300 kg/cm, and a processing speed in the range of 20 to 700 m/min.

After the calendering treatment, heat curing treatment at 40° to 80° C. and/or electron beam irradiating treatment may be carried out in order to promote curing of the magnetic layer, backcoat layer and non-magnetic layer.

Thereafter, processing to a predetermined shape and secondary working follow, obtaining a magnetic recording medium.

According to the present invention, the filtering step or steps assigned in the respective embodiments use the following filter means including an ultimate filter means.

The ultimate filter means used in filtering steps I and VI of filtering a binder solution have a 95% cut filtration precision of at least 4.0 µm; and the ultimate filter means used in filtering steps IV and VIII of filtering a viscosity adjusting solution have a 95% cut filtration precision of at least 1.0 µm. And at least one of the requirements that the ultimate filter means used in the binder solution filtering step have a 95% cut filtration precision of up to 80 µm, preferably up to 75 µm and that the ultimate filter means used in the viscosity adjusting solution filtering step have a 95% cut filtration precision of up to 30 µm, preferably up to 15 µm must be met. The ultimate filter means used in filtering step V of filtering a paint has a 95% cut filtration precision of up to 10 times the shortest recording wavelength and ranging from 6.0 µm to 1.0 µm, preferably of up to 9 times the shortest recording wavelength and ranging from 6.0 μm to 1.0 μm; and particularly when a multi-layered magnetic recording medium wherein the uppermost layer of coating is a magnetic layer of 0.1 to 0.8 μm thick is prepared, the some has a 95% cut filtration precision of 1.0 to 6.0 μm, preferably 1.0 to 5.0 μm. The ultimate filter means used in filtering step IX of filtering a backcoat layer-forming paint composition has a 95% cut filtration precision of from 1.0 μm to 6.0 μm and ranging up to 10 times the thickness of the backcoat layer, preferably from 1.0 μm to 6.0 μm and ranging up to 9 times the thickness of the backcoat layer. The ultimate filter means used in filtering step II of filtering a kneaded product and filtering step III of filtering a dispersion both have a 95% cut filtration precision of at least 15 μm. And the ultimate filter means used in at least one of filtering steps II and III and filtering step VII must have a 95% cut filtration precision of up to 80 μm, preferably up to 75 μm.

Table 1 exemplifies the shortest recording wavelengths associated with distinct recording formats.

small, greater pressure losses occur across the filter means, which requires more frequent replacement of filter means, resulting in a lowering of filtration efficiency and a substantial loss of productivity. If the pressure loss is significantly increased, it is sometimes impossible to proceed to the next step.

On the other hand, if the 95% cut filtration precision of the ultimate filter means is too large, objects to be captured are insufficiently captured, failing to fully achieve the advantages of the invention.

Figure 3:
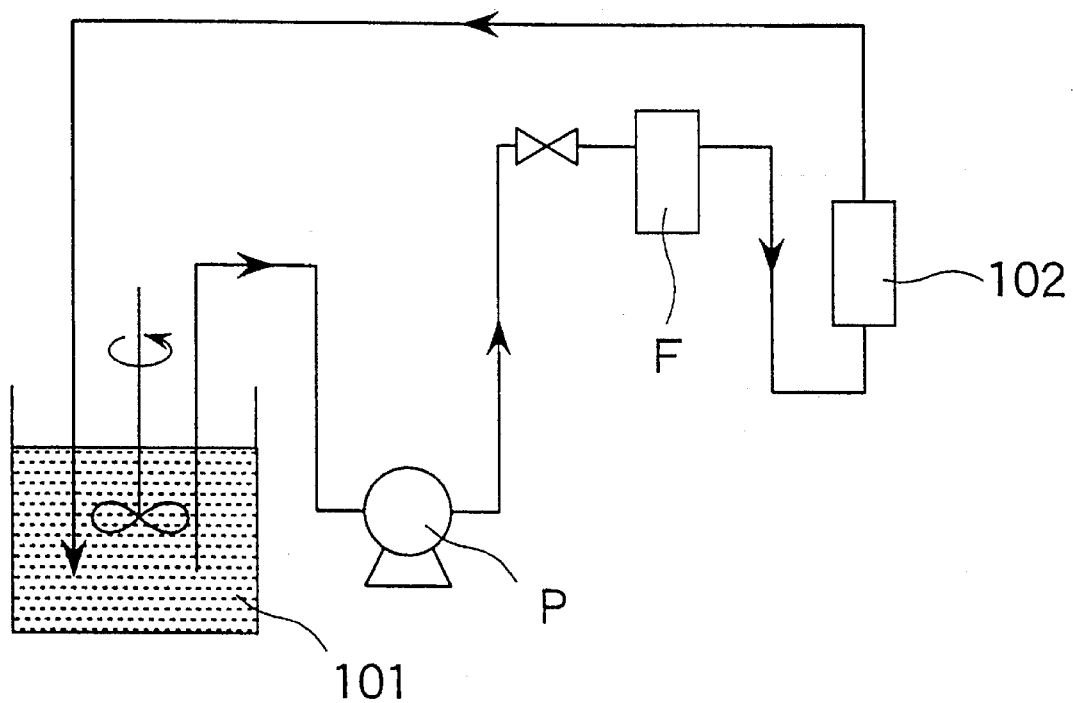
FIG. 3 is a schematic diagram of an apparatus used in a process of determining the 95% cut filtration precision of a filter.

In the present specification, the 95% cut filtration precision of filter means is determined by the following process using the apparatus shown in FIG. 3, for example.

(1) 80 liters of city water is poured into a stock solution tank 101.

(2) 4 g of test dust (8 or 11 species as prescribed in JIS Z 8901) is added to the stock solution tank 101 and the contents are agitated to form a stock solution. It is to be noted that 11 species of test dust are used when the 95% cut

TABLE 1

| | System (analog) | | | | | | | |
|---|---|---|---|---|---|---|---|---|
| | VHS | | S-VHS | | 8 mm | | Hi 8 | |
| | NTSC | PAL SECAM | NTSC | PAL SECAM | NTSC | PAL SECAM | NTSC | PAL SECAM |
| Relative speed (m/s) | 5.9 | 4.9 | 5.8 | 4.9 | 3.8 | 3.1 | 3.8 | 3.1 |
| White peak frequency (MHz) | 4.4 | 4.8 | 7.0 | 7.0 | 5.4 | 5.4 | 7.7 | 7.7 |
| Shortest record wavelength (μm) | 1.32 | 1.02 | 0.83 | 0.70 | 0.70 | 0.57 | 0.49 | 0.40 |

| | System (analog) | | | | | |
|---|---|---|---|---|---|---|
| | Beta cam | | Beta cam SP | | M-II | |
| | NTSC | PAL SECAM | NTSC | PAL SECAM | NTSC | PAL SECAM |
| Relative speed (m/s) | 6.895 | 5.746 | 6.895 | 5.746 | 7.09 | 5.90 |
| White peak frequency (MHz) | 6.4 | 6.4 | 7.7 | 8.8 | 7.7 | 9.2 |
| Shortest record wavelength (μm) | 1.08 | 0.90 | 0.90 | 0.65 | 0.92 | 0.64 |

| | System (digital) | | | |
|---|---|---|---|---|
| | D-1 | | D-2 | |
| | NTSC | PAL SECAM | NTSC | PAL SECAM |
| Relative speed (m/s) | 35.63 | 35.63 | 27.4 | 30.4 |
| Shortest record wavelength (μm) | 0.95 | 0.95 | 0.85 | 0.79 |

In Table 1, the shortest record wavelength in the analog video recording system is (relative speed of recording medium relative to recording head)/(white peak frequency) and the shortest record wavelength in the digital video recording system is (relative speed of recording medium relative to recording head)/{(transfer rate)×(½)× (1/number of tracks per scan)}.

If the 95% cut filtration precision of the ultimate filter means is too small, the effect of capturing objects to be captured is saturated; in filtering steps V, II and III, abrasive grains and other particles which must pass through the filter means are captured by the filter means, failing to enhance the mechanical strength of a coating; and in filtering steps VII and IX, conductive pigment and non-magnetic inorganic powder particles which must pass through the filter means are captured by the filter means, failing to enhance the conductivity and mechanical strength of a backcoat layer. On the other hand, if the 95% cut filtration precision is too filtration precision of filter means is 10 μm or less and 8 species of test dust are used when the some is more than 10 μm.

(3) The stock solution is pressurized by a pump P and circulated in a direction as shown by arrows whereby it is continuously filtered through a filter means (filter F). By monitoring the flow rate of circulating stock solution by a flow meter 102, the pressurizing quantity of pump P is controlled so as to give a flow rate of 40 liter min.

(4) After 2 minutes from the start of filtration, the stock solution (or filtrate) in tank 101 is sampled out.

(5) The quantity of test dust contained in a filtrate sample is measured by a particle counter (for example, light shielding type HIAC/ROYCO).

(6) The quantity after filtration measured in (5) is compared with the previously measured quantity of test dust in the stock solution before filtration to depict a capture efficiency curve.

(7) From the capture efficiency curve, the particle size at which the capture efficiency of filter F is 95% is determined. This particle size is a 95% cut filtration precision.

As the filter means used in the respective filtering steps, a choice may be made among various filters including depth type filters and membrane type filters. Use of depth type filters is preferred since they can retain a large amount of foreign matter and have a long life. The depth type filters are volume filtration type filters and generally of the structure wherein a cylindrical filter medium is received in a housing. The filter media used in the depth type filters include spongy PVA and other resins having a three-dimensional network of voids formed therein, windings of polypropylene and other resin fibers and glass fibers, wound fibers bound by resin binders, and bonded beads. The depth type filter generally has a filtration direction extending from the outer periphery to the inner periphery and is generally provided with a pore density gradient that the pore size is reduced stepwise or progressively from the outer periphery to the inner periphery. This density gradient is provided in order to prolong the filter life. In the invention, various commercially available depth type filters may be used. For the ultimate filter means in the respective filtering steps, for example, a filter having a 95% cut filtration precision within the specified range as measured by the above-defined process is selected from commercially available depth type filters. More illustratively, a filter having a desired 95% cut filtration precision is preferably selected from depth type cartridge filters (Kanefeel R series, RS series and RP series) manufactured by Kanegafuchi K.K. and depth type filters of Ultra Filter HT type manufactured by Rokitechno K.K.

Upon filtration, conditions other than the 95% cut filtration precision are not critical. The pressure applied to a fluid to be filtered is preferably 0.5 to 10 kg/cm$^2$ and the pressure loss is preferably up to 5 kg/cm$^2$.

Figure 4:
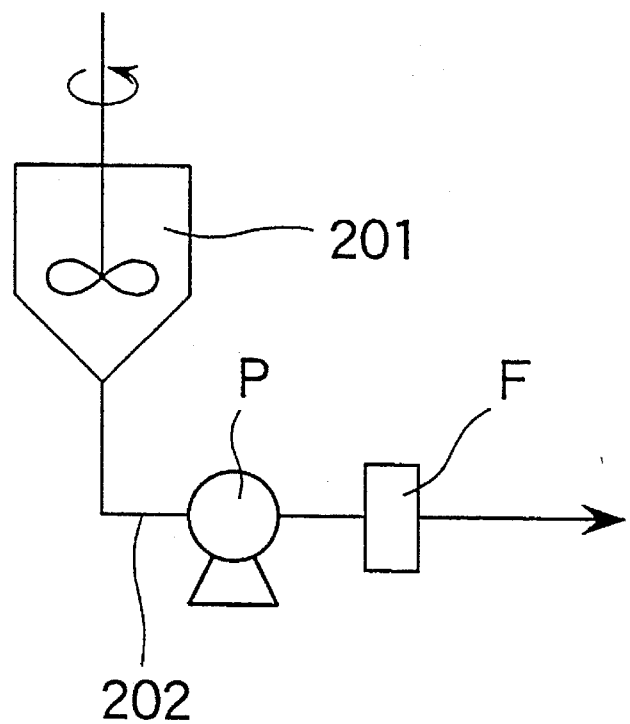

In each of the filtering steps, a filter F disposed midway in a flowpath 202 of a fluid to be filtered in flow communication with a tank 201 as shown in FIG. 4 is generally the ultimate filter means mentioned above, and a pump P disposed upstream of the filter F pressurizes the fluid to be filtered for filtration. It is preferred in the practice of the present invention to carry out multi-stage filtration, parallel filtration and circulatory filtration as mentioned previously in a suitable combination in at least one of these filtering steps.

Figure 5:
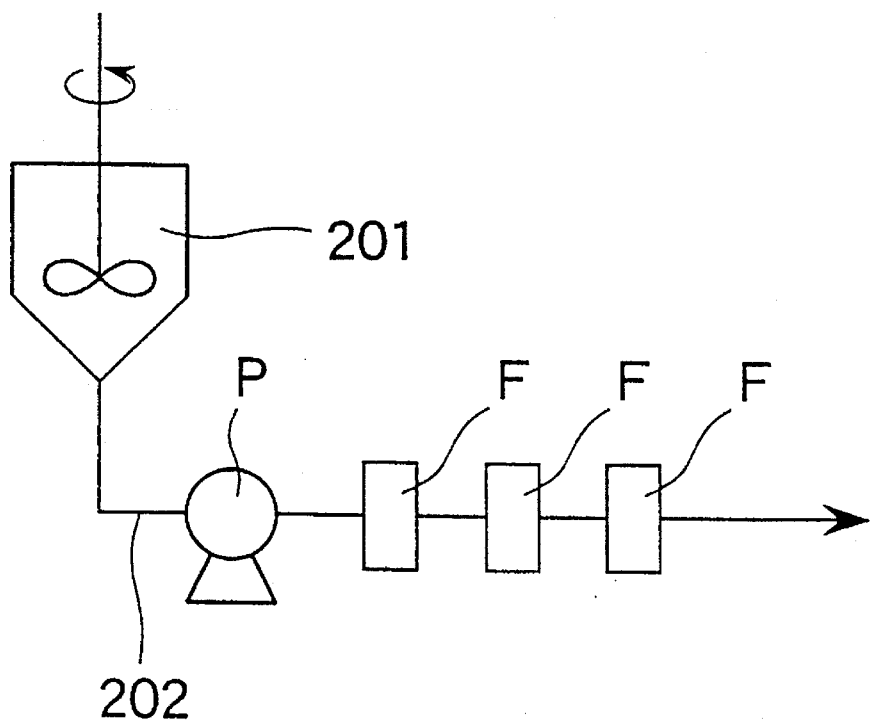

For multi-stage filtration, at least two filter means including an ultimate filter means are serially provided in a flowpath and a filter means having a higher 95% cut filtration precision than the ultimate filter means is disposed upstream of the ultimate filter means. Preferably the filter means are arranged in the flowpath such that their 95% cut filtration precision may gradually decline from the upstream to the downstream side of the flowpath. The filter means disposed upstream of the ultimate filter means has a 95% cut filtration precision which is preferably up to 20 times, more preferably up to 10 times and at least 1.5 times the 95% cut filtration precision of the ultimate filter means. If the 95% cut filtration precision of the filter means disposed upstream of the ultimate filter means is outside this range, the aforementioned advantages of multi-stage filtration would become insufficient. FIG. 5 shows an exemplary arrangement of such multi-stage filtration. In FIG. 5, three filters F are serially arranged in a flowpath 202 such that their 95% cut filtration precision may gradually decline from the upstream to the downstream side of the flowpath. To take full advantage of the multi-stage filtration, multi-stage filtration are preferably carried out in three or more stages although six or more stages of multi-stage filtration are less desirable because of productivity drop.

For parallel filtration, parallel filter means having a plurality of filters arranged in parallel in a flowpath is used. The parallel filter means generally includes a plurality of filters having an equal 95% cut filtration precision. The parallel filter means may be of the arrangement that a plurality of filters are received in a single housing or of the arrangement that a plurality of housings each having a filter received therein are juxtaposed. The aforementioned advantages are obtained by use of the parallel filter means. FIG. 6 shows an exemplary arrangement of the parallel filter means. In FIG. 6, three filters F are arranged in parallel in a flowpath 202 to construct a parallel filter means 203. The number of filters constructing the parallel filter means is not critical and may be properly determined in accordance with various conditions including the filtration area of a filter and the required flow rate.

The parallel filtration may be used in combination with the multi-stage filtration. In this embodiment, all filter means are parallel filter means as a general rule although it is acceptable that only some filter means are parallel filter means. FIG. 7 shows an exemplary arrangement of the combined used of parallel filtration and multi-stage filtration. In FIG. 7, three parallel filter means 203 are serially disposed in a flowpath 202. Although the flowpath 202 is branched upstream of the parallel filter means and the branches are merged together after the fluid to be filtered has passed all the parallel filter means in the embodiment of FIG. 7, the flowpath may be branched and merged across each of the parallel filter means.

Figure 8:
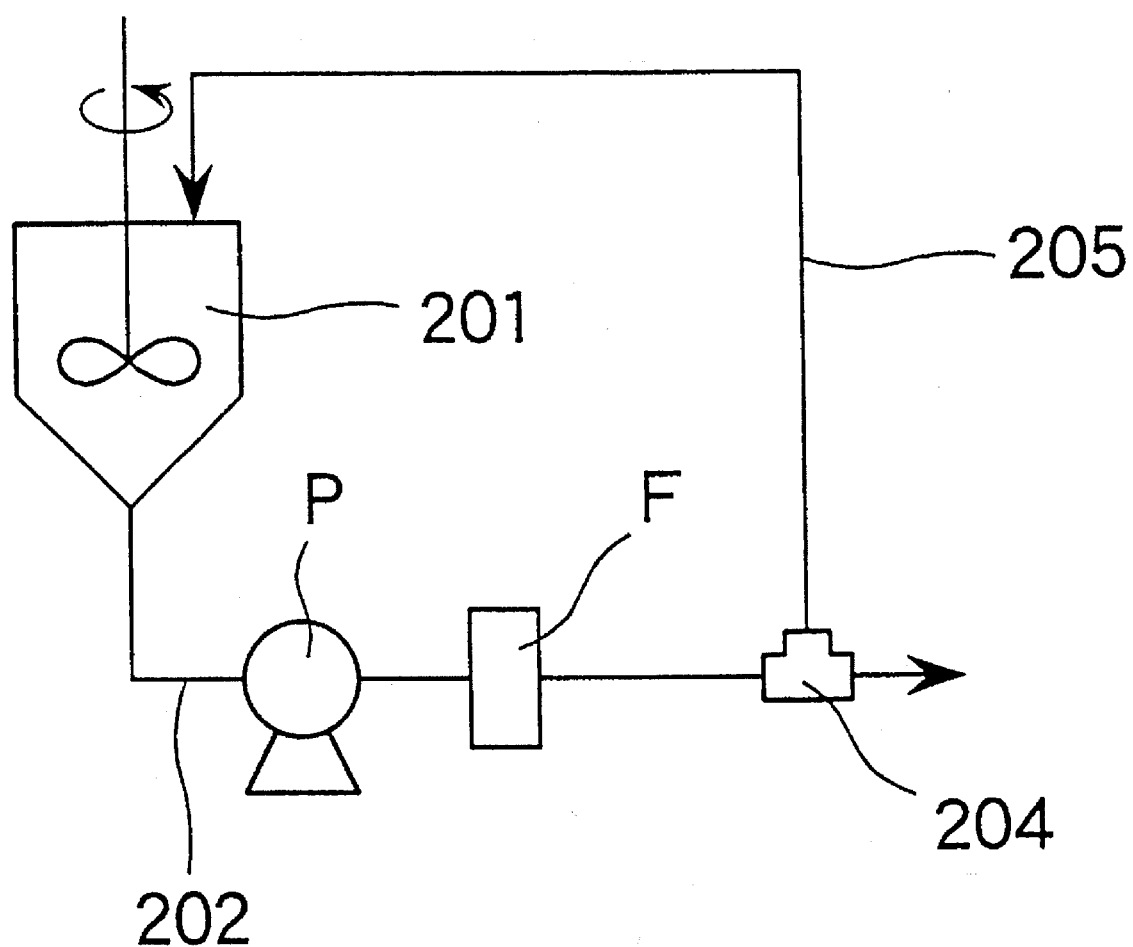

For circulatory filtration, a fluid to be filtered is at least twice passed through at least one filter means. The aforementioned advantages are obtained by carrying out circulatory filtration. FIG. 8 shows an exemplary arrangement of the circulatory filtration. In the embodiment of FIG. 8, a fluid to be filtered flows from a tank 201 to a three-way valve 204 through a filter F and is fed back to the tank 201 through a circulatory line 205. When it is desired to deliver the fluid to be filtered to a subsequent step, the three-way valve 204 is manipulated so as to shut off the outlet to the circulatory line 205. The number of circulation cycles is not critical and may be properly determined in accordance with the amount of the fluid to be filtered delivered to the subsequent step and the tank volume.

Figure 9:
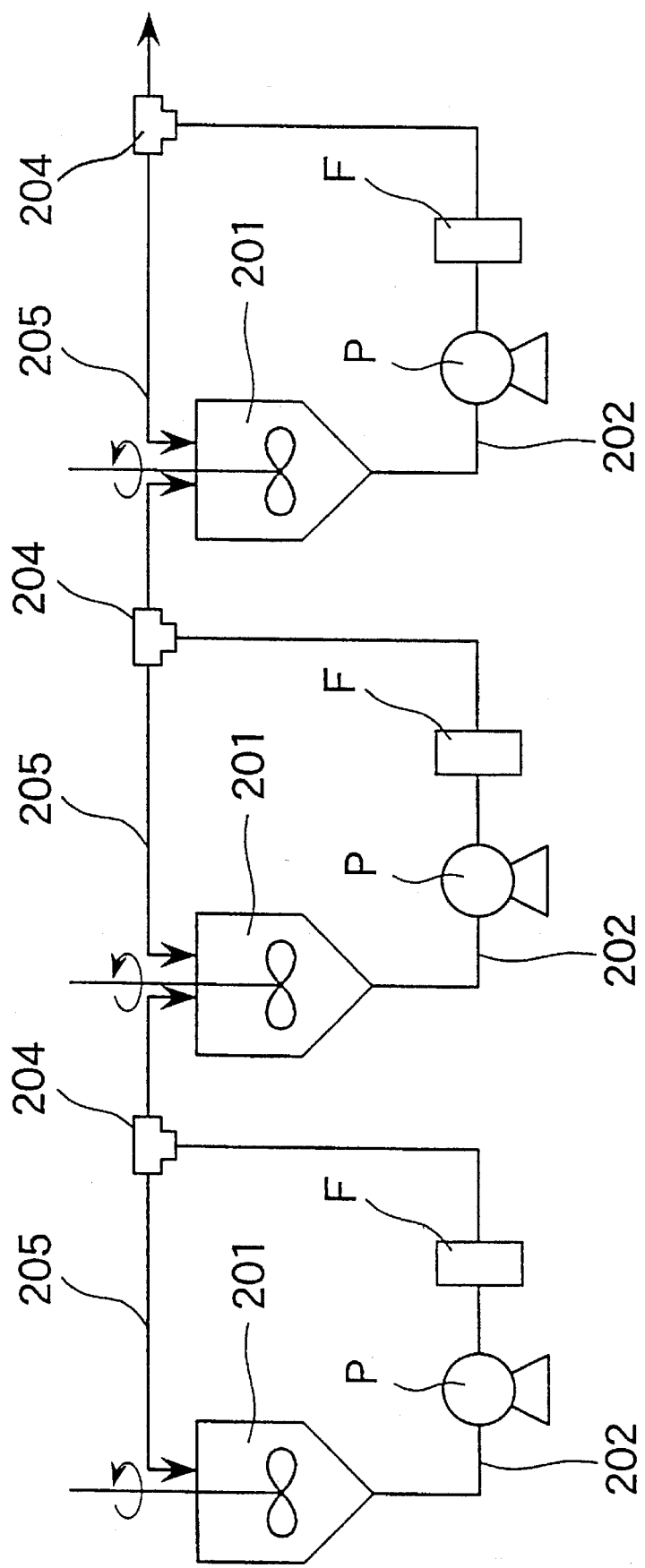
Figure 10:
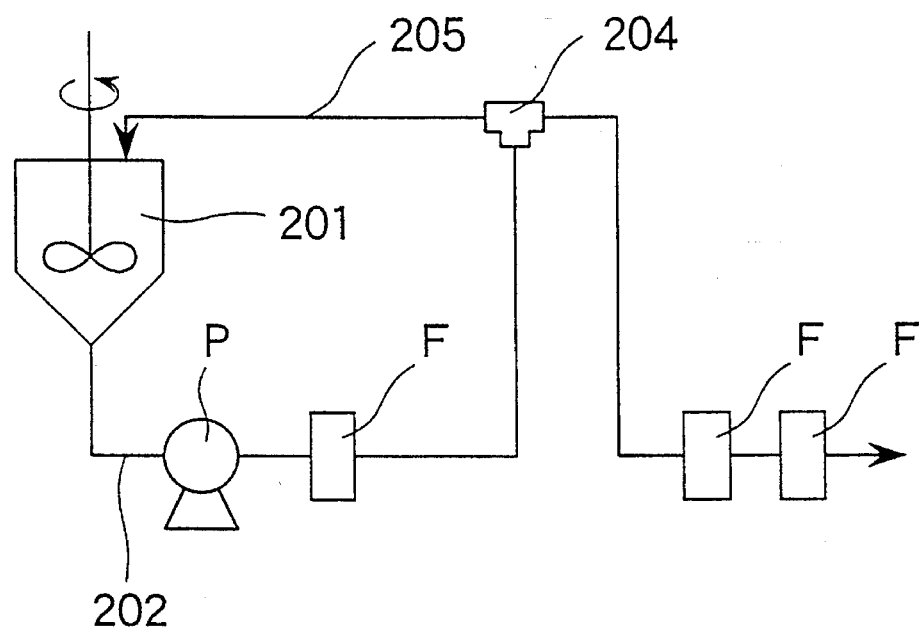
Figure 11:
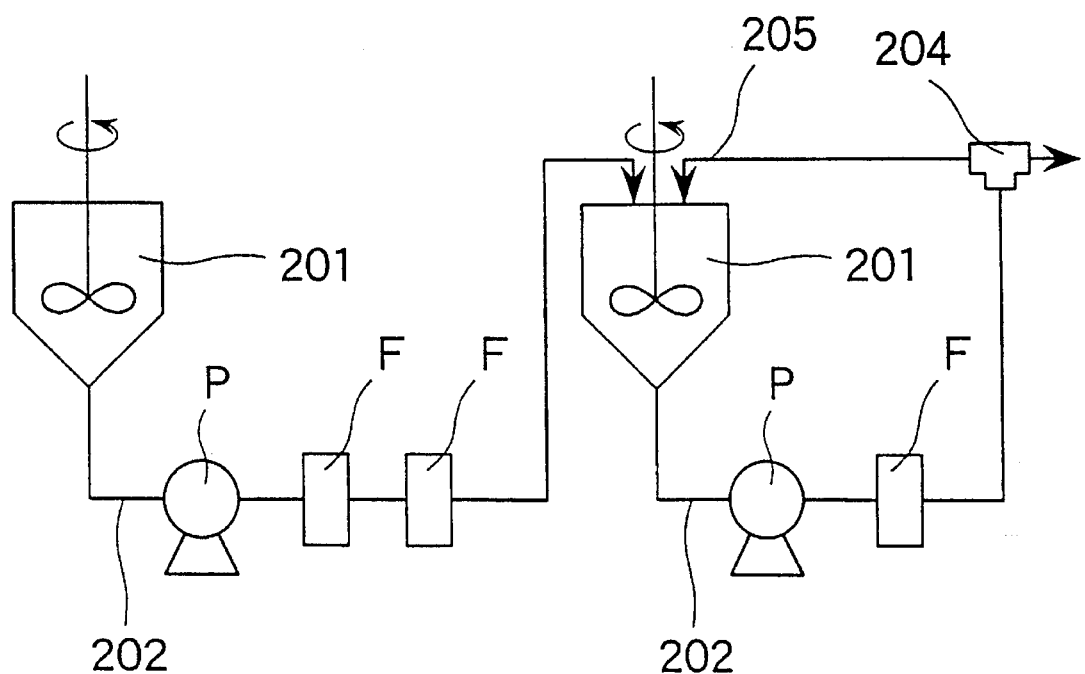

The circulatory filtration is preferably used in combination with the above mentioned parallel filtration or multi-stage filtration, most preferably in combination with both the parallel filtration and multi-stage filtration. FIGS. 9 to 11 show exemplary arrangements of the combined use of circulatory filtration and multi-stage filtration. The embodiment of FIG. 9 includes three stages of multi-stage filtration wherein filtration of each stage is by circulatory filtration. The embodiment of FIG. 10 includes three stages of multi-stage filtration wherein the first stage of circulatory filtration is followed by two stages of multi-stage filtration. The embodiment of FIG. 11 includes three stages of multi-stage filtration wherein two stages of multi-stage filtration are followed by circulatory filtration. A choice among the arrangements of FIGS. 9 to 11 may be properly made in accordance with the amount of the fluid to be filtered delivered to a subsequent step and the tank volume. The arrangement of FIG. 9 wherein circulatory filtration is effected in each stage is preferred because of a satisfactory filtration precision, and especially preferred in filtering steps II, III, V, VII and IX because of enhanced dispersion. It is understood that an arrangement other than those shown in FIGS. 9 to 11 may be constructed by combining circulatory filtration with multi-stage filtration.

In the respective embodiments, filter means other than the ultimate filter means specified herein are not critical and a filter having a pore size suitable for a particular purpose may be properly selected. It is noted that filtering step X should preferably use the ultimate filter means having an equivalent 95% cut filtration precision to that of the ultimate filter means used in filtering step V and that filtering step XI should preferably use the ultimate filter means having an equivalent 95% cut filtration precision to that of the ultimate filter means used in filtering step IX. It is understood that any of the above mentioned multi-stage filtration, parallel filtration and circulatory filtration may be employed in other filtering steps.

The process of applying the above-prepared paint composition to a non-magnetic substrate is not critical and any of commonly used processes is acceptable. When a coating of a multi-layered structure including a magnetic layer is formed, for example, it is possible to use either a so-called wet-on-wet coating process of applying lower and upper layers onto a non-magnetic substrate in a wet state in superposed relationship or a so-called wet-on-dry coating process of applying and drying a lower layer and then applying an upper layer, with the wet-on-wet coating process being preferably used. In the wet-on-wet coating process, it is preferred that at least 10% of the organic solvent remain in the lower layer when the upper layer is applied. Application of a backcoat layer may be done either before or after application of the upper and lower layers or concurrently therewith.

It is to be noted that the magnetic recording medium of the invention may further include an undercoat layer formed between the non-magnetic substrate and the lowermost layer of coating for the purposes of improving surface property, adhesion, durability and the like. Also a protective lubricating layer in the form of a lubricant layer, plasma-polymerized film or diamond-like film may be formed on the magnetic layer for the purposes of lubricating and protecting the magnetic layer.

EXAMPLE

Examples of the present invention are given below for illustrating the invention in further detail.

Magnetic tape samples of the structures shown in the following Tables were prepared by forming a single magnetic layer or a lower layer (non-magnetic layer or magnetic layer) and an upper layer magnetic layer) on a front surface of a non-magnetic substrate and further forming a backcoat layer on a back surface of the non-magnetic substrate. In the Tables, the backcoat layer is abbreviated as BC layer. The paint compositions used for forming the single magnetic layer, upper layer, lower layer, and backcoat layer were prepared according to the procedures shown in FIG. 1.

Example 1 (Embodiment 1)

Paint composition for upper layer
Preparation of binder solution

| | |
|---|---|
| Vinyl chloride resin (MR-110 by Nippon Zeon K.K.) | 10 pbw |
| Polyurethane resin (containing —$SO_3Na$ group, Mn = 27,000) | 7 pbw |
| MEK | 21 pbw |
| Toluene | 21 pbw |
| Cyclohexanone | 21 pbw |

The above composition was admitted into a Hyper mixer where it was mixed and agitated for 6 hours to form a binder solution.
Filtering I
The binder solution was filtered through a filter.
Kneading
The following composition was admitted into a pressure kneader and kneaded for 7 hours.

| | |
|---|---|
| ($\alpha$-Fe magnetic powder (Hc = 1650 Oe, $\sigma s$ = 126 emu/g, BET = 57 m²/g) | 100 pbw |
| ($\alpha$-$Al_2O_3$ (HIT-60A by Sumitomo Chemical K.K.) | 5 pbw |
| $Cr_2O_3$ (U-1 by Nippon Chemical Industry K.K.) | 5 pbw |
| Binder solution | 40 pbw |

Dilution
The slurry resulting from the kneading step was adjusted to an optimum viscosity for dispersion treatment by adding the following composition thereto.

| | |
|---|---|
| Binder solution | 40 pbw |
| MEK | 15 pbw |
| Toluene | 15 pbw |
| Cyclohexanone | 15 pbw |

Filtering II
The slurry was filtered through a filter.
Dispersion
The slurry after filtering was subject to dispersion treatment using a sand mill.
Filtering III
The slurry after dispersion was filtered through a filter.
Viscosity adjusting solution
The following composition was admitted into a Hyper mixer where it was mixed and agitated for 1 hour to form a viscosity adjusting solution.

| | |
|---|---|
| Stearic acid | 0.5 pbw |
| Myristic acid | 0.5 pbw |
| Butyl stearate | 0.5 pbw |
| MEK | 65 pbw |
| Toluene | 65 pbw |
| Cyclohexanone | 65 pbw |

Filtering IV
The viscosity adjusting solution was filtered through a filter.
Viscosity adjustment
The viscosity adjusting solution was mixed and agitated with the slurry resulting from the dispersion step and the mixture was subject to dispersion treatment again in a sand mill to form a paint composition.

Filtering V

The paint composition was filtered through a filter.

Final paint 100 parts by weight of the paint composition as filtered was mixed and agitated with 0.8 part by weight of an isocyanate compound (Colonate L by Nippon Polyurethane Industry K.K.) to form a final paint for forming a magnetic layer.

Paint composition for lower layer (1) (for magnetic layer)

A final paint composition for a magnetic layer was prepared by the some procedure as the paint composition for the upper layer except that the following composition was used in the kneading step.

| | |
|---|---|
| Co-containing $\delta\text{-Fe}_2\text{O}_3$ (Hc = 700 Oe, $\sigma s$ = 75 emu/g, BET = 44 m$^2$/g) | 100 pbw |
| Carbon black | 9 pbw |
| $Cr_2O_3$ (U-1 by Nihon Chemical K.K.) | 4 pbw |
| Binder solution | 40 pbw |

Paint composition for lower layer (2) (for non-magnetic layer)

A final paint composition for a non-magnetic layer was prepared by the some procedure as the paint composition for the upper layer except that the following composition was used in the kneading step.

| | |
|---|---|
| acicular $\beta\text{-Fe}_2\text{O}_3$ (major axis length = 0.15 μm, aspect ratio = 10) | 100 pbw |
| Carbon black | 9 pbw |
| Binder solution | 40 pbw |

Paint composition for backcoat layer Preparation of binder solution

| | |
|---|---|
| Vinyl chloride-vinyl acetate-vinyl alcohol copolymer (monomer weight ratio = 92:3:5, average degree of polymerization = 420) | 40 pbw |
| Vinyl chloride-vinyl acetate-vinyl alcohol copolymer (monomer weight ratio = 91:2:7, nitrogen atom = 390 ppm, average degree of polymerization = 340) | 25 pbw |
| Polyurethane resin (containing —SO$_3$Na group, Mn = 40,000) | 35 pbw |
| MEK | 260 pbw |
| Toluene | 260 pbw |
| Cyclohexanone | 260 pbw |

The above composition was admitted into a Hyper mixer where it was mixed and agitated for 6 hours to form a binder solution.

Filtering VI

The binder solution was filtered through a filter.

Dispersion

The following composition was admitted into a ball mill and dispersed for 24 hours.

| | |
|---|---|
| Carbon black (Colombian Carbon Co., center particle size = 21 nm, BET = 220 m$^2$/g) | 80 pbw |
| Carbon black (Colombian Carbon Co., center particle size = 350 nm, BET = 8 m$^2$/g) | 1 pbw |
| $\alpha\text{-Fe}_2\text{O}_3$ (mean particle size 0.1 μm) | 1 pbw |
| Binder solution | 880 pbw |

Filtering VII

The slurry after dispersion was filtered through a filter.

Viscosity adjusting solution

The following composition was admitted into a Hyper mixer where it was mixed and agitated for 1 hour to form a viscosity adjusting solution.

| | |
|---|---|
| Stearic acid | 1 pbw |
| Myristic acid | 1 pbw |
| Butyl stearate | 2 pbw |
| MEK | 210 pbw |
| Toluene | 210 pbw |
| Cyclohexanone | 210 pbw |

Filtering VIII

The viscosity adjusting solution was filtered through a filter.

Viscosity adjustment

The viscosity adjusting solution was mixed and agitated with the slurry resulting from the dispersion step and the mixture was subject to dispersion treatment again in a ball mill to form a paint composition.

Filtering IX

The paint composition was filtered through a filter.

Final paint 100 parts by weight of the paint composition as filtered was mixed and agitated with 1 part by weight of an isocyanate compound (Colonate L by Nippon Polyurethane K.K.) to form a final paint for forming a backcoat layer.

Note that the filtering steps in this Example and the following Examples used depth type filters. The filters used in the respective filtering steps had a 95% cut filtration precision as shown in the following Tables. Filter media in those depth type filters having a 95% cut filtration precision of 15.0 μm or more were melamine resin-treated cylinders of spongy PVA resin having a three-dimensional network of voids. Filter media in those depth type filters having a 95% cut filtration precision of less than 15.0 μm were an assembly of mated small and large diameter filter medium cylinders both made of polypropylene with a filter medium of glass fibers interposed therebetween.

Essentially in the filtering steps in this Example and the following Examples, parallel filtration through parallel arranged six identical filters was carried out in the single stage circulatory filtration shown in FIG. 8. And in multi-stage filtering steps as shown by filtering steps V-1, V-2 and V-3 in Table 4, for example, multi-stage filtration plus circulatory filtration as shown in FIG. 9 was carried out in addition to the parallel filtration as above. In this case, filtering steps V-1, V-2 and V-3 were arranged from the upstream side of a paint flowpath.

It is to be noted that in Table 4 of this Example, sample No. 1-2 which was prepared without carrying out multi-stage filtration is additionally reported for comparison purposes.

Preparation of magnetic tape

The paint composition for a lower layer was coated onto a front surface of a non-magnetic substrate (polyethylene terephthalate film of 8.3 μm thick), the paint composition for the upper layer was coated onto the lower layer while the lower layer was still wet, both the coatings were dried, and then calendering treatment was carried out. The calender roll unit used included seven stages each of a heat resistant plastic roll combined with a metallic roll, with the metallic rolls being in contact with the coating. The treatment was done at a temperature of 100° C. and a linear pressure of 250 kg/cm. After treatment of the magnetic layer surface over 200,000 meters, the metallic rolls were evaluated for a degree of fouling according to the following criterion.

o: No fouling

Δ: Fouling to a substantially non-detrimental extent, no need for cleaning

X: Noticeable fouling, a need for cleaning

The results are shown in the following Tables.

The paint composition for a backcoat layer was coated onto the back surface of the non-magnetic substrate, dried, and similarly subject to calendering treatment. Note that the paint compositions on the non-magnetic substrate front surface were filtered in filtering step X immediately before coating. Used in filtering step X were filters having the some 95% cut filtration precision as the corresponding filters used in filtering step V. Also the paint composition for a backcoat layer was filtered in filtering step XI immediately before coating. Used in filtering step XI was a filter having the some 95% cut filtration precision as the filter used in filtering step IX. After the respective coatings were cured, the web was cut to a width of 8 mm and assembled in a cassette, obtaining a magnetic tape sample. The thicknesses of the upper layer, lower layer and backcoat layer after curing are shown in the Tables.

For each sample, dropouts (DO) were counted. On this measurement, a dropout was counted when an output drop of 16 dB or more continued over 15 μs or longer. Measurement was done for 10 minutes. Dropouts per minute were reported in the Tables. EV-S900 by Sony Corporation (8-mm format VTR) was used for measurement.

TABLE 2

(Embodiment 1)

| | Sample No. | | | | |
|---|---|---|---|---|---|
| | 1-1 (Comparison) | 1-2 | 1-3 | 1-4 (Comparison) | 1-5 (Comparison) |
| Lower layer | Magnetic layer | Magnetic layer | Magnetic layer | Magnetic layer | Magnetic layer |
| Coating thickness(μm) | | | | | |
| Upper layer | — | 0.3 | 0.3 | 0.3 | 0.3 |
| Lower layer | — | 1.7 | 1.7 | 1.7 | 1.7 |
| BC layer | — | 0.5 | 0.5 | 0.5 | 0.5 |
| | 95% cut filtration precision (μm) | | | | |
| Upper layer | | | | | |
| Filtering I (binder solution) | 105.0 | 105.0 | 105.0 | 105.0 | 105.0 |
| Filtering II (after kneading) | 105.0 | 105.0 | 105.0 | 105.0 | 105.0 |
| Filtering III (after dispersion) | 105.0 | 105.0 | 105.0 | 105.0 | 105.0 |
| Filtering IV (viscosity adjusting solution) | 32.0 | 32.0 | 32.0 | 32.0 | 32.0 |
| Filtering V (after viscosity adjustment) | 0.8* | 1.2 | 1.7 | 8.0* | 15.0* |
| Lower layer | | | | | |
| Filtering I (binder solution) | — | 105.0 | 105.0 | 105.0 | 105.0 |
| Filtering II (after kneading) | — | 105.0 | 105.0 | 105.0 | 105.0 |
| Filtering III (after dispersion) | — | 105.0 | 105.0 | 105.0 | 105.0 |
| Filtering IV (viscosity adjusting solution) | — | 32.0 | 32.0 | 32.0 | 32.0 |
| Filtering V (after viscosity adjustment) | — | 15.0 | 15.0 | 15.0 | 15.0 |
| BC layer | | | | | |
| Filtering VI (binder solution) | — | 105.0 | 105.0 | 105.0 | 105.0 |
| Filtering VII (after dispersion) | — | 105.0 | 105.0 | 105.0 | 105.0 |
| Filtering VIII (viscosity adjusting solution) | — | 32.0 | 32.0 | 32.0 | 32.0 |
| Filtering IX (after viscosity adjustment) | — | 15.0 | 15.0 | 15.0 | 15.0 |
| DO (15 μs-16 dB) | — | 3.0 | 3.5 | 15.0 | 25.0 |
| Measurement format | — | 8 mm | 8 mm | 8 mm | 8 mm |
| Calender roll fouling (magnetic layer side) | — | ○ | ○ | Δ | X |
| Filtering system | | | | | |
| parallel + circulatory filtration | ○ | ○ | ○ | ○ | ○ |
| multi-stage filtration | — | — | — | — | — |

| | Sample No. | | | |
|---|---|---|---|---|
| | 1-6 | 1-7 | 1-8 (Comparison) | 1-9 (Comparison) |
| Lower layer | Magnetic layer | Magnetic layer | Magnetic layer | Magnetic layer |
| Coating thickness (μm) | | | | |
| Upper layer | 0.6 | 0.6 | 0.6 | 0.6 |
| Lower layer | 1.4 | 1.4 | 1.4 | 1.4 |
| BC layer | 0.5 | 0.5 | 0.5 | 0.5 |
| | 95% cut filtration precision (μm) | | | |
| Upper layer | | | | |
| Filtering I (binder solution) | 105.0 | 105.0 | 105.0 | 105.0 |
| Filtering II (after kneading) | 105.0 | 105.0 | 105.0. | 105.0 |
| Filtering III (after dispersion) | 105.0 | 105.0 | 105.0 | 105.0 |
| Filtering IV (viscosity adjusting solution) | 32.0 | 32.0 | 32.0 | 32.0 |

TABLE 2-continued (Embodiment 1)

| | | | | |
|---|---|---|---|---|
| Filtering V (after viscosity adjustment) | 1.7 | 5.0 | 8.0* | 15.0* |
| Lower layer | | | | |
| Filtering I (binder solution) | 105.0 | 105.0 | 105.0 | 105.0 |
| Filtering II (after kneading) | 105.0 | 105.0 | 105.0 | 105.0 |
| Filtering III (after dispersion) | 105.0 | 105.0 | 105.0 | 105.0 |
| Filtering IV (viscosity adjusting solution) | 32.0 | 32.0 | 32.0 | 32.0 |
| Filtering V (after viscosity adjustment) | 15.0 | 15.0 | 15.0 | 15.0 |
| BC layer | | | | |
| Filtering VI (binder solution) | 105.0 | 105.0 | 105.0 | 105.0 |
| Filtering VII (after dispersion) | 105.0 | 105.0 | 105.0 | 105.0 |
| Filtering VIII (viscosity adjusting solution) | 32.0 | 32.0 | 32.0 | 32.0 |
| Filtering IX (after viscosity adjustment) | 15.0 | 15.0 | 15.0 | 15.0 |
| DO (15 μs-16 dB) | 2.5 | 2.7 | 18.0 | 30.0 |
| Measurement format | 8 mm | 8 mm | 8 mm | 8 mm |
| Calendar roll fouling (magnetic layer side) | ○ | ○ | Δ | X |
| Filtering system | | | | |
| parallel + circulatory filtration | ○ | ○ | ○ | ○ |
| multi-stage filtration | — | — | — | — |

*) values outside the limited range

TABLE 3

(Embodiment 1)

| | Sample No. | | | |
|---|---|---|---|---|
| | 1-10 | 1-11 | 1-12 (Comparison) | 1-13 (Comparison) |
| Lower layer | Non-Magnetic layer | Non-Magnetic layer | Non-Magnetic layer | Non-Magnetic layer |
| Coating thickness (μm) | | | | |
| Upper layer | 0.2 | 0.2 | 0.2 | 0.2 |
| Lower layer | 1.8 | 1.8 | 1.8 | 1.8 |
| BC layer | 0.5 | 0.5 | 0.5 | 0.5 |
| | 95% cut filtration precision (μm) | | | |
| Upper layer | | | | |
| Filtering I (binder solution) | 105.0 | 105.0 | 105.0 | 105.0 |
| Filtering II (after kneading) | 105.0 | 105.0 | 105.0 | 105.0 |
| Filtering III (after dispersion) | 105.0 | 105.0 | 105.0 | 105.0 |
| Filtering IV (viscosity adjusting solution) | 32.0 | 32.0 | 32.0 | 32.0 |
| Filtering V (after viscosity adjustment) | 1.2 | 1.7 | 8.0* | 15.0* |
| Lower layer | | | | |
| Filtering I (binder solution) | 105.0 | 105.0 | 105.0 | 105.0 |
| Filtering II (after kneading) | 105.0 | 105.0 | 105.0 | 105.0 |
| Filtering III (after dispersion) | 105.0 | 105.0 | 105.0 | 105.0 |
| Filtering IV (viscosity adjusting solution) | 32.0 | 32.0 | 32.0 | 32.0 |
| Filtering V (after viscosity adjustment) | 15.0 | 15.0 | 15.0 | 15.0 |
| BC layer | | | | |
| Filtering VI (binder solution) | 105.0 | 105.0 | 105.0 | 105.0 |
| Filtering VII (after dispersion) | 105.0 | 105.0 | 105.0 | 105.0 |
| Filtering VIII (viscosity adjusting solution) | 32.0 | 32.0 | 32.0 | 32.0 |
| Filtering IX (after viscosity adjustment) | 15.0 | 15.0 | 15.0 | 15.0 |
| DO (15 μs-16 dB) | 2.3 | 2.9 | 13.0 | 35.0 |
| Measurement format | 8 mm | 8 mm | 8 mm | 8 mm |
| Calendar roll fouling (magnetic layer side) | ○ | ○ | Δ | X |
| Filtering system | | | | |
| parallel + circulatory filtration | ○ | ○ | ○ | ○ |
| multi-stage filtration | — | — | — | — |

*) values outside the limited range

TABLE 4

(Embodiment 1)

| | Sample No. | | | |
|---|---|---|---|---|
| | 1-2 | 1-14 | 1-15 | 1-16 (Comparison) |
| Lower layer | Magnetic layer | Magnetic layer | Magnetic layer | Magnetic layer |
| Coating thickness (μm) | | | | |
| Upper layer | 0.3 | 0.3 | 0.3 | — |
| Lower layer | 1.7 | 1.7 | 1.7 | — |
| BC layer | 0.5 | 0.5 | 0.5 | — |
| 95% cut filtration precision (μm) | | | | |
| Upper layer | | | | |
| Filtering I (binder solution) | 105.0 | 105.0 | 105.0 | 105.0 |
| Filtering II (after kneading) | 105.0 | 105.0 | 105.0 | 105.0 |
| Filtering III (after dispersion) | 105.0 | 105.0 | 105.0 | 105.0 |
| Filtering IV (viscosity adjusting solution) | 32.0 | 32.0 | 32.0 | 32.0 |
| Filtering V-1 (after viscosity adjustment) | — | — | 6.0 | — |
| Filtering V-2 (after viscosity adjustment) | — | 2.9 | 2.9 | 2.9 |
| Filtering V-3 (after viscosity adjustment) | 1.2 | 1.2 | 1.2 | 0.8* |
| Lower layer | | | | |
| Filtering I (binder solution) | 105.0 | 105.0 | 105.0 | — |
| Filtering II (after kneading) | 105.0 | 105.0 | 105.0 | — |
| Filtering III (after dispersion) | 105.0 | 105.0 | 105.0 | — |
| Filtering IV (viscosity adjusting solution) | 32.0 | 32.0 | 32.0 | — |
| Filtering V (after viscosity adjustment) | 15.0 | 15.0 | 15.0 | — |
| BC layer | | | | |
| Filtering VI (binder solution) | 105.0 | 105.0 | 105.0 | — |
| Filtering VII (after dispersion) | 105.0 | 105.0 | 105.0 | — |
| Filtering VIII (viscosity adjusting solution) | 32.0 | 32.0 | 32.0 | — |
| Filtering IX (after viscosity adjustment) | 15.0 | 15.0 | 15.0 | — |
| DO (15 μs-16 dB) | 3.0 | 2.8 | 2.5 | — |
| Measurement format | 8 mm | 8 mm | 8 mm | — |
| Calendar roll fouling (magnetic layer side) | ○ | ○ | ○ | — |
| Filtering system | | | | |
| parallel + circulatory filtration | ○ | ○ | ○ | ○ |
| multi-stage filtration | — | ○ | ○ | ○ |

*) values outside the limited range

The advantages of the invention are evident from the data shown in the Tables. More specifically, the samples wherein a filter having a 95% cut filtration precision within the range of the invention was used in filtering step V during preparation of the upper layer-forming paint composition produced substantially less dropouts as compared with the comparative samples wherein a filter having a 95% cut filtration precision exceeding the range of the invention was used. It is also seen that dropouts were reduced by multi-stage filtration plus circulatory filtration. Note that where a filter having a 95% cut filtration precision of 0.8 μm was used in filtering step V, a pressure loss of more than 10 kg/cm$^2$ occurred to prohibit formation of a paint composition.

Examined next was the effect achieved by carrying out kneading and dispersing steps independently in the step of preparing the magnetic layer-forming paint composition. In the above-mentioned step of preparing the upper layer-forming paint composition, kneading was followed by dilution for concentration adjustment and then by dispersion. In contrast, the binder solution after filtering step I and the following composition were admitted into a ball mill in such amounts as to provide the as-diluted concentration from the first where they were mixed and dispersed for 24 hours to form a dispersion.

| | |
|---|---|
| α-Fe magnetic powder (Hc = 1650 Oe, σs = 126 emu/g, BET = 57 m$^2$/g) | 100 pbw |
| α-Al$_2$O$_3$ (HIT-60A by Sumitomo Chemical K.K.) | 5 pbw |
| Cr$_2$O$_3$ (U-1 by Nippon Chemical Industry K.K.) | 5 pbw |
| Binder solution | 80 pbw |
| MEK | 15 pbw |
| Toluene | 15 pbw |
| Cyclohexanone | 15 pbw |

The steps subsequent to the dispersion step were carried out as above, obtaining a comparative magnetic paint composition. Using the upper layer-forming paint composition and the comparative magnetic paint composition, magnetic layers of 2.0 μm thick were respectively formed and measured for maximum magnetic flux density Bm. As a result, it was found that Bm was 3,300 G when kneading and dispersion were independently carried out whereas Bm was reduced to 3,000 G when mixing dispersion was carried out.

Example 2 (Embodiment 2)

Paint composition for magnetic layer (Composition (1) for Hi 8 format)

A final paint composition was obtained by the some procedure as the upper layer-forming paint composition of Example 1.

Paint composition for magnetic layer (Composition (2) for S-VHS format)

A final paint composition was obtained by the same procedure as the upper layer-forming paint composition of Example 1 except that the following composition was used in the kneading step.

| | |
|---|---|
| Co-containing $\gamma$-Fe$_2$O$_3$ (Hc = 830 Oe, BET = 47 m$^2$/g) | 100 pbw |
| $\alpha$-Al$_2$O$_3$ (HIT-60A by Sumitomo Chemical K.K.) | 8 pbw |
| Cr$_2$O$_3$ (U-1 by Nihon Chemical K.K.) | 4 pbw |
| Carbon black | 4 pbw |
| Binder solution | 40 pbw |

Paint composition for magnetic layer (Composition (3) for VHS format)

A paint composition was obtained by the same procedure as the magnetic layer-forming paint of composition (2) except that Co-containing $\gamma$-Fe$_2$O$_3$ (Hc=730 Oe, BET=40 m$^2$/g) was used instead of the Co-containing $\gamma$-Fe$_2$O$_3$ (Hc= 830 Oe, BET=47 m$^2$/g) in composition (2).

Paint composition for backcoat layer

A final paint composition was obtained by the same procedure as the backcoat layer-forming paint composition of Example 1.

Preparation of magnetic tape

Using the above-prepared magnetic paint compositions, magnetic tape samples as reported in the following Tables were prepared as in Example 1. Note that non-magnetic substrates as in Example 1 were used for samples of the Hi 8 format while a polyethylene terephthalate film of 14.5 μm thick was used as the non-magnetic substrate and a tape width of ½ inch was used for samples of the S-VHS or VHS format. The following Tables report the degree of fouling of the calender rolls on the magnetic layer side after calendering treatment.

For each sample, dropouts (DO) were counted. On this measurement, a dropout was counted when an output drop of 16 dB or more continued over 15 μs or longer. Measurement was done for 10 minutes. Dropouts per minute were reported in the Tables. EV-S900 by Sony Corporation (Hi 8 format VTR), BR-S711 by Victor Company of Japan Ltd. (S-VHS format VTR), and BR-7000 by Victor Company of Japan Ltd. (VHS format VTR) were used for measurement. The measurement formats and shortest record wavelengths are shown in the Tables.

TABLE 5

| | 2-1 (Comparison) | 2-2 | 2-3 | 2-4 | 2-5 | 2-6 (Comparison) | 2-7 (Comparison) |
|---|---|---|---|---|---|---|---|
| Paint composition Magnetic layer | ① | ① | ① | ① | ① | ① | ① |
| Coating thickness (μm) | | | | | | | |
| Magnetic layer | — | 2.0 | 2.0 | 2.0 | 2.0 | 2.0 | 2.0 |
| BC layer | — | 0.5 | 0.5 | 0.5 | 0.5 | 0.5 | 0.5 |
| 95% cut filtration precision (μm) | | | | | | | |
| Magnetic layer | | | | | | | |
| Filtering I (binder solution) | 105.0 | 105.0 | 105.0 | 105.0 | 105.0 | 105.0 | 105.0 |
| Filtering II (after kneading) | 105.0 | 105.0 | 105.0 | 105.0 | 105.0 | 105.0 | 105.0 |
| Filtering III (after dispersion) | 105.0 | 105.0 | 105.0 | 105.0 | 105.0 | 105.0 | 105.0 |
| Filtering IV (viscosity adjusting solution) | 32.0 | 32.0 | 32.0 | 32.0 | 32.0 | 32.0 | 32.0 |
| Filtering V-1 (after viscosity adjustment) | — | — | — | 6.0 | — | — | — |
| Filtering V-2 (after viscosity adjustment) | — | — | 2.9 | 2.9 | — | — | — |
| Filtering V-3 (after viscosity adjustment) | 0.8* | 1.2 | 1.2 | 1.2 | 4.0 | 8.0* | 15.0* |
| BC layer | | | | | | | |
| Filtering VI (binder solution) | — | 105.0 | 105.0 | 105.0 | 105.0 | 105.0 | 105.0 |
| Filtering VII (after dispersion) | — | 105.0 | 105.0 | 105.0 | 105.0 | 105.0 | 105.0 |
| Filtering VIII (viscosity adjusting solution) | — | 32.0 | 32.0 | 32.0 | 32.0 | 32.0 | 32.0 |
| Filtering IX (after viscosity adjustment) | — | 15.0 | 15.0 | 15.0 | 15.0 | 15.0 | 15.0 |
| DO (15 μs-16 dB) | — | 2.0 | 1.8 | 1.5 | 2.5 | 13.0 | 25.0 |
| Measurement format | — | Hi 8 | Hi 8 | Hi 8 | Hi 8 | Hi 8 | Hi 8 |
| NTSC shortest record wavelength (μm) | — | 0.49 | 0.49 | 0.49 | 0.49 | 0.49 | 0.49 |
| Calendar roll fouling (magnetic layer side) | — | ○ | ○ | ○ | ○ | Δ | X |
| Filtering system | | | | | | | |
| parallel + circulatory filtration | ○ | ○ | ○ | ○ | ○ | ○ | ○ |
| multi-stage filtration | — | — | ○ | ○ | — | — | — |

*) values outside the limited range

TABLE 6

(Embodiment 2)

| | Sample No. | | | | | | | |
|---|---|---|---|---|---|---|---|---|
| | 2-8 (Comparison) | 2-9 | 2-10 | 2-11 (Comparison) | 2-12 (Comparison) | 2-13 | 2-14 | 2-15 (Comparison) |
| Paint composition Magnetic layer | ② | ② | ② | ② | ③ | ③ | ③ | ③ |
| Coating thickness (μm) | | | | | | | | |
| Magnetic layer | — | 3.0 | 3.0 | 3.0 | — | 3.0 | 3.0 | 3.0 |
| BC layer | — | 0.5 | 0.5 | 0.5 | — | 0.5 | 0.5 | 0.5 |
| | | | 95% cut filtration precision (μm) | | | | | |
| Magnetic layer | | | | | | | | |
| Filtering I (binder solution) | 105.0 | 105.0 | 105.0 | 105.0 | 105.0 | 105.0 | 105.0 | 105.0 |
| Filtering II (after kneading) | 105.0 | 105.0 | 105.0 | 105.0 | 105.0 | 105.0 | 105.0 | 105.0 |
| Filtering III (after dispersion) | 105.0 | 105.0 | 105.0 | 105.0 | 105.0 | 105.0 | 105.0 | 105.0 |
| Filtering IV (viscosity adjusting solution) | 32.0 | 32.0 | 32.0 | 32.0 | 32.0 | 32.0 | 32.0 | 32.0 |
| Filtering V-1 (after viscosity adjustment) | — | — | — | — | — | — | — | — |
| Filtering V-2 (after viscosity adjustment) | — | — | — | — | — | — | — | — |
| Filtering V-3 (after viscosity adjustment) | 0.8* | 1.7 | 6.0 | 15.0* | 0.8* | 1.7 | 6.0 | 15.0* |
| BC layer | | | | | | | | |
| Filtering VI (binder solution) | — | 105.0 | 105.0 | 105.0 | — | 105.0 | 105.0 | 105.0 |
| Filtering VII (after dispersion) | — | 105.0 | 105.0 | 105.0 | — | 105.0 | 105.0 | 105.0 |
| Filtering VIII (viscosity adjusting solution) | — | 32.0 | 32.0 | 32.0 | — | 32.0 | 32.0 | 32.0 |
| Filtering IX (after viscosity adjustment) | — | 15.0 | 15.0 | 15.0 | — | 15.0 | 15.0 | 15.0 |
| DO (15 μs-16 dB) | — | 3.0 | 3.5 | 20.0 | — | 2.5 | 2.7 | 15.0 |
| Measurement format | — | S-VHS | S-VHS | S-VHS | — | VHS | VHS | VHS |
| NTSC shortest record wavelength( um) | — | 0.83 | 0.83 | 0.83 | — | 1.32 | 1.32 | 1.32 |
| Calender roll fouling (magnetic layer side) | — | ○ | ○ | X | — | ○ | ○ | X |
| Filtering system | | | | | | | | |
| parallel + circulatory filtration | ○ | ○ | ○ | ○ | ○ | ○ | ○ | ○ |
| multi-stage filtration | — | — | — | — | — | — | — | — |

*) values outside the limited range

The advantages of the invention are evident from the data shown in the Tables. More specifically, the samples wherein a filter having a 95% cut filtration precision within the range of the invention was used in filtering step V during preparation of the magnetic layer-forming paint composition produced substantially less dropouts as compared with the comparative samples wherein a filter having a 95% cut filtration precision exceeding the range of the invention was used. It is also seen that dropouts were reduced by multi-stage filtration plus circulatory filtration. Note that where a filter having a 95% cut filtration precision of 0.8 μm was used in filtering step V, a pressure loss of more than 10 kg/cm$^2$ occurred to prohibit formation of a paint composition.

Example 3 (Embodiment 3)

Paint composition for backcoat layer

A final paint composition was obtained by the same procedure as in Example 1.

Paint composition for magnetic layer (Composition (1) for Hi 8 format)

A final paint composition was obtained by the same procedure as the upper layer-forming paint composition of Example 1.

Paint composition for magnetic layer (Composition (2) for S-VHS format)

A final paint composition was obtained by the same procedure as the magnetic layer-forming paint of composition (2) in Example 2.

Paint composition for magnetic layer (Composition (3) for VHS format)

A final paint composition was obtained by the same procedure as the magnetic layer-forming paint of composition (3) in Example 2.

Paint composition for lower layer (for magnetic layer)

A final paint composition was obtained by the same procedure as the lower layer-forming paint composition (1) (for magnetic layer) in Example 1.

Paint composition for lower layer (for non-magnetic layer)

A final paint composition was obtained by the same procedure as the lower layer-forming paint composition (2) (for non-magnetic layer) in Example 1.

Preparation of magnetic tape

Using the above-prepared magnetic paint compositions, magnetic tape samples as reported in the following Tables were prepared as in the foregoing Examples. The following Tables report the degree of fouling of the calender rolls on the backcoat layer side after calendering treatment.

For each sample, dropouts (DO) were counted. On this measurement, a dropout was counted when an output drop of 12 dB or more continued over 10 μs or longer. Measurement was done for 10 minutes. Dropouts per minute were reported in the Tables. EV-S900 by Sony Corporation (Hi 8 format VTR), BR-S711 by Victor Company of Japan Ltd. (S-VHS format VTR), and BR-7000 by Victor Company of Japan Ltd. (VHS format VTR) were used for measurement. The measurement formats and shortest record wavelengths are shown in the Tables.

TABLE 7

| | (Embodiment 3) | | | | |
|---|---|---|---|---|---|
| | Sample No. | | | | |
| | 3-1 (Comparison) | 3-2 | 3-3 | 3-4 | 3-5 |
| Magnetic layer composition | ① | ① | ① | ① | ① |
| Coating thickness (μm) | | | | | |
| Magnetic layer | — | 2.0 | 2.0 | 2.0 | 2.0 |
| BC layer | — | 0.5 | 0.5 | 0.5 | 0.5 |
| | 95% cut filtration precision (μm) | | | | |
| Magnetic layer | | | | | |
| Filtering I (binder solution) | — | 105.0 | 105.0 | 105.0 | 105.0 |
| Filtering II (after kneading) | — | 105.0 | 105.0 | 105.0 | 105.0 |
| Filtering III (after dispersion) | — | 105.0 | 105.0 | 105.0 | 105.0 |
| Filtering IV (viscosity adjusting solution) | — | 32.0 | 32.0 | 32.0 | 32.0 |
| Filtering V (after viscosity adjustment) | — | 1.2 | 1.2 | 1.2 | 1.2 |
| BC layer | | | | | |
| Filtering VI (binder solution) | 105.0 | 105.0 | 105.0 | 105.0 | 105.0 |
| Filtering VII (after dispersion) | 105.0 | 105.0 | 105.0 | 105.0 | 105.0 |
| Filtering VIII (viscosity adjusting solution) | 32.0 | 32.0 | 32.0 | 32.0 | 32.0 |
| Filtering IX-1 (after viscosity adjustment) | — | — | — | 6.0 | — |
| Filtering IX-2 (after viscosity adjustment) | — | — | 2.9 | 2.9 | — |
| Filtering IX-3 (after viscosity adjustment) | 0.8* | 1.2 | 1.2 | 1.2 | 4.0 |
| DO (10 μs-12 dB) | — | 2.2 | 2.1 | 1.7 | 2.5 |
| Measurement format | — | Hi-8 | Hi-8 | Hi-8 | Hi-8 |
| NTSC shortest record wavelength(gm) | — | 0.49 | 0.49 | 0.49 | 0.49 |
| Calender roll fouling (BC layer side) | — | ○ | ○ | ○ | ○ |
| Filtering system | | | | | |
| parallel + circulatory filtration | ○ | ○ | ○ | ○ | ○ |
| multi-stage filtration | — | — | ○ | ○ | — |

| | Sample No. | | | |
|---|---|---|---|---|
| | 3-6 (Comparison) | 3-7 | 3-8 (Comparison) | 3-9 (Comparison) |
| Magnetic layer composition | ① | ① | ① | ① |
| Coating thickness (μm) | | | | |
| Magnetic layer | 2.0 | 2.0 | 2.0 | 3.0 |
| BC layer | 0.5 | 1.0 | 1.0 | 1.0 |
| | 95% cut filtration precision (μm) | | | |
| Magnetic layer | | | | |
| Filtering I (binder solution) | 105.0 | 105.0 | 105.0 | 105.0 |
| Filtering II (after kneading) | 105.0 | 105.0 | 105.0 | 105.0 |
| Filtering III (after dispersion) | 105.0 | 105.0 | 105.0 | 105.0 |
| Filtering IV (viscosity adjusting solution) | 32.0 | 32.0 | 32.0 | 32.0 |
| Filtering V (after viscosity adjustment) | 1.2 | 1.2 | 1.2 | 1.2 |
| BC layer | | | | |
| Filtering VI (binder solution) | 105.0 | 105.0 | 105.0 | 105.0 |
| Filtering VII (after dispersion) | 105.0 | 105.0 | 105.0 | 105.0 |
| Filtering VIII (viscosity adjusting solution) | 32.0 | 32.0 | 32.0 | 32.0 |
| Filtering IX-1 (after viscosity adjustment) | — | — | — | — |
| Filtering IX-2 (after viscosity adjustment) | — | — | — | — |
| Filtering IX-3 (after viscosity adjustment) | 15.0* | 6.0 | 8.0* | 15.0* |
| DO (10 μs-12 dB) | 23.0 | 1.5 | 18.0 | 25.0 |
| Measurement format | Hi-8 | Hi-8 | Hi-8 | Hi-8 |
| NTSC shortest record wavelength (μm) | 0.49 | 0.49 | 0.49 | 0.49 |
| Calendar roll fouling (BC layer side) | X | ○ | Δ | X |
| Filtering system | | | | |
| parallel + circulatory filtration | ○ | ○ | ○ | ○ |
| multi-stage filtration | — | — | — | — |

*) values outside the limited range

TABLE 8

(Embodiment 3)

| | Sample No. | | | |
|---|---|---|---|---|
| | 3-10 | 3-11 | 3-12 | 3-13 |
| Magnetic layer composition (upper layer) | ① | ① | ① | ① |
| Coating thickness (μm) | | | | |
| Magnetic layer (upper layer) | 0.3 | 0.2 | 3.0 | 3.0 |
| lower magnetic layer | 1.7 | — | — | — |
| lower non-magnetic layer | — | 1.8 | — | — |
| BC layer | 0.5 | 0.5 | 0.5 | 0.5 |
| 95% cut filtration precision (μm) | | | | |
| Upper layer | | | | |
| Filtering I (binder solution) | 105.0 | 105.0 | 105.0 | 105.0 |
| Filtering II (after kneading) | 105.0 | 105.0 | 105.0 | 105.0 |
| Filtering III (after dispersion) | 105.0 | 105.0 | 105.0 | 105.0 |
| Filtering IV (viscosity adjusting solution) | 32.0 | 32.0 | 32.0 | 32.0 |
| Filtering V (after viscosity adjustment) | 1.2 | 1.2 | 1.2 | 1.2 |
| Lower layer | | | | |
| Filtering I (binder solution) | 105.0 | 105.0 | — | — |
| Filtering II (after kneading) | 105.0 | 105.0 | — | — |
| Filtering III (after dispersion) | 105.0 | 105.0 | — | — |
| Filtering IV (viscosity adjusting solution) | 32.0 | 32.0 | — | — |
| Filtering V (after viscosity adjustment) | 15.0 | 15.0 | — | — |
| BC layer | | | | |
| Filtering VI (binder solution) | 105.0 | 105.0 | 105.0 | 105.0 |
| Filtering VII (after dispersion) | 105.0 | 105.0 | 105.0 | 105.0 |
| Filtering VIII (viscosity adjusting solution) | 32.0 | 32.0 | 32.0 | 32.0 |
| Filtering IX-1 (after viscosity adjustment) | — | — | — | — |
| Filtering IX-2 (after viscosity adjustment) | — | — | — | — |
| Filtering IX-3 (after viscosity adjustment) | 1.2 | 1.2 | 1.2 | 1.2 |
| DO (10 μs-12 dB) | 2.5 | 1.9 | 2.8 | 1.8 |
| Measurement format | Hi-8 | Hi-8 | S-VHS | VHS |
| NTSC shortest record wavelength (μm) | 0.49 | 0.49 | 0.83 | 1.32 |
| Calendar roll fouling (BC layer side) | ○ | ○ | ○ | ○ |
| Filtering system | | | | |
| parallel + circulatory filtration | ○ | ○ | ○ | ○ |
| multi-stage filtration | — | — | — | — |

The advantages of the invention are evident from the data shown in the Tables. More specifically, when the Hi 8 measurement format was used and dropout measuring conditions were set at the above mentioned slice level, the samples wherein using a filter having a 95% cut filtration precision within the range of the invention, "parallel filtration plus circulatory filtration" was carried out in filtering step IX during preparation of the backcoat layer-forming paint composition produced substantially less dropouts and was very advantageous as compared with the comparative samples wherein a filter having a 95% cut filtration precision exceeding the range of the invention was used. It is also seen that dropouts were further reduced by carrying out multi-stage filtration. Note that where a filter having a 95% cut filtration precision of 0.8 μm was used in filtering step IX, a pressure loss of more than 10 kg/cm² occurred to prohibit formation of a paint composition.

Example 4 (Embodiment 4)

Paint composition for magnetic layer (Composition (1) for Hi 8 format)

A final paint composition was obtained by the same procedure as the upper layer-forming paint composition of Example 1.

Paint composition for magnetic layer (Composition (2) for S-VHS format)

A final paint composition was obtained by the same procedure as the magnetic layer-forming paint of composition (2) in Example 2.

Paint composition for magnetic layer (Composition (3) for VHS format)

A final paint composition was obtained by the same procedure as the magnetic layer-forming paint of composition (3) in Example 2.

Paint composition for lower layer (for magnetic layer)

A final paint composition was obtained by the same procedure as the lower layer-forming paint composition (1) (for magnetic layer) in Example 1.

Paint composition for lower layer (for non-magnetic layer)

A final paint composition was obtained by the same procedure as the lower layer-forming paint composition (2) (for non-magnetic layer) in Example 1.

Paint composition for backcoat layer

A final paint composition was obtained as in Example 1.

Preparation of magnetic tape

Using the above-prepared magnetic paint compositions, magnetic tape samples as reported in the following Tables were prepared as in the foregoing Examples. The following Tables report the degree of fouling of the calender rolls on the magnetic layer side after calendering treatment.

For each sample, dropouts (DO) were counted. On this measurement, a dropout was counted when an output drop of 10 dB or more continued over 5 μs or longer. Measurement was done for 10 minutes. Dropouts per minute were reported in the Tables. EV-S900 by Sony Corporation (Hi 8 format VTR), BR-S711 by Victor Company of Japan Ltd. (S-VHS format VTR), and BR-7000 by Victor Company of Japan Ltd. (VHS format VTR) were used for measurement. The measurement formats and shortest record wavelengths are shown in the Tables.

TABLE 9

(Embodiment 4)

| | Sample No. | | | | |
|---|---|---|---|---|---|
| | 4-1 (Comparison) | 4-2 (Comparison) | 4-3 | 4-4 | 4-5 |
| Paint Magnetic layer Coating thickness (μm) | ① | ① | ① | ① | ① |
| Magnetic layer | — | — | 2.0 | 2.0 | 2.0 |
| BC layer | — | — | 0.5 | 0.5 | 0.5 |
| 95% cut filtration precision (μm) | | | | | |
| Magnetic layer | | | | | |
| Filtering I (binder solution) | 105.0 | 105.0 | 105.0 | 105.0 | 105.0 |
| Filtering II-1 (atter kneading) | — | — | — | — | — |
| Filtering II-2 (after kneading) | — | — | — | — | — |
| Filtering II-3 (after kneading) | 8.0* | 15.0 | 15..0 | 15.0 | 105.0* |
| Filtering III-1 (after dispersion) | — | — | — | — | — |
| Filtering III-2 (after dispersion) | — | — | — | — | — |
| Filtering III-3 (after dispersion) | — | 8.0* | 15.0 | 105.0* | 15.0 |
| Filtering IV (viscosity adjusting solution) | — | — | 32.0 | 32.0 | 32.0 |
| Filtering V (after viscosity adjustment) | — | — | 1.2 | 1.2 | 1.2 |
| BC layer | | | | | |
| Filtering VI (binder solution) | — | — | 105.0 | 105.0 | 105.0 |
| Filtering VII (after dispersion) | — | — | 15.0 | 15.0 | 15.0 |
| Filtering VIII (viscosity adjusting solution | — | — | 32.0 | 32.0 | 32.0 |
| Filtering IX (after viscosity adjustment) | — | — | 1.2 | 1.2 | 1.2 |
| DO (5 μs-10 dB) | — | — | 2.5 | 2.9 | 2.8 |
| Measurement format | — | — | Hi-8 | Hi-8 | Hi-8 |
| NTSC shortest record wavelength (μm) | — | — | 0.49 | 0.49 | 0.49 |
| Calender roll fouling (BC layer side) | — | — | ○ | ○ | ○ |
| Filtering system | | | | | |
| parallel + circulatory filtration | ○ | ○ | ○ | ○ | ○ |
| multi-stage filtration | — | — | — | — | — |

| | Sample No. | | | | |
|---|---|---|---|---|---|
| | 4-6 | 4-7 | 4-8 | 4-9 | 4-10 (Comparison) |
| Paint Magnetic layer Coating thickness (μm) | ① | ① | ① | ① | ① |
| Magnetic layer | 2.0 | 2.0 | 2.0 | 2.0 | 2.0 |
| BC layer | 0.5 | 0.5 | 0.5 | 0.5 | 0.5 |
| 95% cut filtration precision (μm) | | | | | |
| Magnetic layer | | | | | |
| Filtering I (binder solution) | 105.0 | 105.0 | 105.0 | 105.0 | 105.0 |
| Filtering II-1 (atter kneading) | — | — | 105.0 | — | — |
| Filtering II-2 (after kneading) | — | 45.0 | 45.0 | — | — |
| Filtering II-3 (after kneading) | 75.0 | 15.0 | 15.0 | 15.0 | 105.0* |
| Filtering III-1 (after dispersion) | — | — | — | 105.0 | — |
| Filtering III-2 (after dispersion) | — | — | — | 45.0 | — |
| Filtering III-3 (after dispersion) | 75.0 | 15.0 | 15.0 | 15.0 | 105.0* |
| Filtering IV (viscosity adjusting solution) | 32.0 | 32.0 | 32.0 | 32.0 | 32.0 |
| Filtering V (after viscosity adjustment) | 1.2 | 1.2 | 1.2 | 1.2 | 1.2 |
| BC layer | | | | | |
| Filtering VI (binder solution) | 105.0 | 105.0 | 105.0 | 105.0 | 105.0 |
| Filtering VII (after dispersion) | 15.0 | 15.0 | 15.0 | 15.0 | 15.0 |
| Filtering VIII (viscosity adjusting solution | 32.0 | 32.0 | 32.0 | 32.0 | 32.0 |
| Filtering IX (after viscosity adjustment) | 1.2 | 1.2 | 1.2 | 1.2 | 1.2 |
| DO (5 μs-10 dB) | 2.7 | 2.4 | 2.2 | 2.0 | 30.0 |
| Measurement format | Hi-8 | Hi-8 | Hi-8 | Hi-8 | Hi-8 |
| NTSC shortest record wavelength(iam) | 0.49 | 0.49 | 0.49 | 0.49 | 0.49 |
| Calender roll fouling (BC layer side) | ○ | ○ | ○ | ○ | ○ |

TABLE 9-continued (Embodiment 4)

| Filtering system | | | | | |
|---|---|---|---|---|---|
| parallel + circulatory filtration | ◯ | ◯ | ◯ | ◯ | ◯ |
| multi-stage filtration | — | ◯ | ◯ | ◯ | — |

*) values outside the limited range

TABLE 10

(Embodiment 4)

| | Sample No. | |
|---|---|---|
| | 4-11 | 4-12 |
| Paint Magnetic layer | ② | ③ |
| Coating thickness (μm) | | |
| Magnetic layer | 3.0 | 3.0 |
| BC layer | 0.5 | 0.5 |
| *95% cut filtration precision (μm)* | | |
| Magnetic layer | | |
| Filtering I (binder solution) | 105.0 | 105.0 |
| Filtering II-1 (after kneading) | — | — |
| Filtering II-2 (after kneading) | — | — |
| Filtering II-3 (after kneading) | 15.0 | 15.0 |
| Filtering III-1 (after dispersion) | — | — |
| Filtering III-2 (after dispersion) | — | — |
| Filtering III-3 (after dispersion) | 15.0 | 15.0 |
| Filtering IV (viscosity adjusting solution) | 32.0 | 32.0 |
| Filtering V (after viscosity adjustment) | 1.2 | 1.2 |
| BC layer | | |
| Filtering VI (binder solution) | 105.0 | 105.0 |
| Filtering VII (after dispersion) | 15.0 | 15.0 |
| Filtering VIII (viscosity adjusting solution) | 32.0 | 32.0 |
| Filtering IX (after viscosity adjustment) | 1.2 | 1.2 |
| DO (5 μs-10 dB) | 1.5 | 2.0 |
| Measurement format | S-VHS | VHS |
| NTSC shortest record wavelength (μm) | 0.83 | 1.32 |
| Calender roll fouling (BC layer side) | 0 | 0 |
| Filtering system | | |
| parallel + circulatory filtration | ◯ | ◯ |
| multi-stage filtration | — | — |

TABLE 11

(Embodiment 4)

| | Sample No. | |
|---|---|---|
| | 4-13 | 4-14 |
| Paint Upper magnetic layer | ① | ① |
| Coating thickness (μm) | | |
| Upper magnetic layer | 0.3 | 0.2 |
| Lower magnetic layer | 1.7 | — |
| Lower non-magnetic layer | — | 1.8 |
| BC layer | 0.5 | 0.5 |
| *95% cut filtration precision (μm)* | | |
| Upper layer | | |
| Filtering I (binder solution) | 105.0 | 105.0 |
| Filtering II (after kneading) | 15.0 | 15.0 |
| Filtering III (after dispersion) | 15.0 | 15.0 |
| Filtering IV (viscosity adjusting solution) | 32.0 | 32.0 |
| Filtering V (after viscosity adjustment) | 1.2 | 1.2 |

TABLE 11-continued (Embodiment 4)

| | Sample No. | |
|---|---|---|
| | 4-13 | 4-14 |
| Lower layer | | |
| Filtering I (binder solution) | 105.0 | 105.0 |
| Filtering II (after kneading) | 15.0 | 15.0 |
| Filtering III (after dispersion) | 15.0 | 15.0 |
| Filtering IV (viscosity adjusting solution) | 32.0 | 32.0 |
| Filtering V (after viscosity adjustment) | 15.0 | 15.0 |
| BC layer | | |
| Filtering VI (binder solution) | 105.0 | 105.0 |
| Filtering VII (after dispersion) | 15.0 | 15.0 |
| Filtering VIII (viscosity adjusting solution) | 32.0 | 32.0 |
| Filtering IX (after viscosity adjustment) | 1.2 | 1.2 |
| DO (5 μs-10 dB) | 2.3 | 2.1 |
| Measurement format | Hi-8 | Hi-8 |
| NTSC shortest record wavelength (μm) | 0.49 | 0.49 |
| Calender roll fouling (magnetic layer side) | ◯ | ◯ |
| Filtering system | | |
| parallel + circulatory filtration | ◯ | ◯ |
| multi-stage filtration | — | — |

The advantages of the invention are evident from the data shown in the Tables. More specifically, the samples wherein filters having a 95% cut filtration precision within the range of the invention were used in filtering steps II and III during preparation of the magnetic layer-forming paint composition produced substantially less dropouts even under the very rigorous slice level as compared with the comparative samples wherein a filter having a 95% cut filtration precision exceeding the range of the invention was used. Note that where filters having a 95% cut filtration precision of 0.8 μm were used in filtering steps II and III, a pressure loss of more than 10 kg/cm² occurred to prohibit formation of a paint composition.

Example 5 (Embodiment 5)

Paint composition for magnetic layer (Composition (1) for Hi 8 format)

A final paint composition was obtained by the same procedure as the upper layer-forming paint composition of Example 1.

Paint composition for magnetic layer (Composition (2) for S-VHS format)

A final paint composition was obtained by the same procedure as the magnetic layer-forming paint of composition (2) in Example 2.

Paint composition for magnetic layer (Composition (3) for VHS format)

A final paint composition was obtained by the same procedure as the magnetic layer-forming paint of composition (3) in Example 2.

Paint composition for lower layer (for magnetic layer)

A final paint composition was obtained by the same procedure as the lower layer-forming paint composition (1) (for magnetic layer) in Example 1.

Paint composition for lower layer (for non-magnetic layer)

A final paint composition was obtained by the same procedure as the lower layer-forming paint composition (2) (for non-magnetic layer) in Example 1.

Paint composition for backcoat layer

A final paint composition was obtained as in Example 1.

Preparation of magnetic tape

Using the above-prepared magnetic paint compositions, magnetic tape samples as reported in the following Tables were prepared as in the foregoing Examples. The following Tables report the degree of fouling of the calender rolls on the magnetic layer side after calendering treatment.

For each sample, dropouts (DO) were counted. On this measurement, a dropout was counted when an output drop of 10 dB or more continued over 5 μs or longer. Measurement was done for 10 minutes on the samples as prepared and the samples which were stored for 5 days in a 50° C./RH 80% environment and then allowed to stand for 24 hours in a 20° C./RH 60% environment (after hot humid storage). Dropouts per minute were reported in the Tables. EV-S900 by Sony Corporation (Hi 8 format VTR), BR-S711 by Victor Company of Japan Ltd. (S-VHS format VTR), and BR-7000 by Victor Company of Japan Ltd. (VHS format VTR) were used for measurement. The measurement formats and shortest record wavelengths are shown in the Tables.

TABLE 12

(Embodiment 5)

| | Sample No. | | | | | | |
|---|---|---|---|---|---|---|---|
| | 5-1 (Comparison) | 6-2 (Comparison) | 5-3 (Comparison) | 5-4 (Comparison) | 5-5 | 5-6 | 5-7 |
| Paint Magnetic layer | ① | ① | ① | ① | ① | ① | ① |
| Coating thickness (μm) | | | | | | | |
| Magnetic layer | 2.0 | 2.0 | 2.0 | 2.0 | | | |
| BC layer | 0.5 | 0.5 | 0.5 | 0.5 | | | |
| | 95% cut filtration precision (μm) | | | | | | |
| Magnetic layer | | | | | | | |
| Filtering I-1 (binder solution) | — | — | — | — | | | |
| Filtering I-2 (binder solution) | — | — | — | — | | | |
| Filtering I-3 (binder solution) | 0.8* | 3.0* | 5.0 | 105.0* | 105.0* | 5.0 | 5.0 |
| Filtering II (after kneading) | — | — | 15.0 | 15.0 | 15.0 | 15.0 | 15.0 |
| Filtering III (after dispersion) | — | — | 15.0 | 15.0 | 15.0 | 15.0 | 15.0 |
| Filtering IV-1 (viscosity adjusting solution) | — | — | — | — | — | — | — |
| Filtering IV-2 (viscosity adjusting solution) | — | — | — | — | — | — | — |
| Filtering IV-3 (viscosity adjusting solution) | 0.8* | — | 0.8* | 32.0* | 1.2 | 32.0* | 1.2 |
| Filtering V (after viscosity adjustment) | — | — | — | 1.2 | 1.2 | 1.2 | 1.2 |
| BC layer | | | | | | | |
| Filtering VI (binder solution) | — | — | — | 105.0* | 105.0* | 105.0* | 105.0* |
| Filtering VII (after dispersion) | — | — | — | 15.0 | 15.0 | 15.0 | 15.0 |
| Filtering VIII (viscosity adjusting solution) | — | — | — | 32.0* | 32.0* | 32.0* | 32.0* |
| Filtering IX (after viscosity adjustment) | — | — | — | 1.2 | 1.2 | 1.2 | 1.2 |
| DO (5 μs-10 dB) after hot humid storage** | — | — | — | 30.0 | 2.5 | 2.1 | 1.9 |
| Measurement format | — | — | — | Hi-8 | Hi-8 | Hi-8 | Hi-8 |
| NTSC shortest record wavelength (μm) | — | — | — | 0.49 | 0.49 | 0.49 | 0.49 |
| Calender roll fouling (magnetic layer side) | — | — | — | ○ | ○ | ○ | ○ |
| Filtering system | | | | | | | |
| parallel + circulatory filtration | ○ | ○ | ○ | ○ | ○ | ○ | ○ |
| multi-stage filtration | — | — | — | — | — | — | — |

| | Sample No. | | | |
|---|---|---|---|---|
| | 5-8 (Comparison) | 5-9 (Comparison) | 5-10 (Comparison) | 5-11 (Comparison) |
| Paint Magnetic layer | ① | ① | ① | ① |
| Coating thickness (μm) | | | | |
| Magnetic layer | 2.0 | 2.0 | 2.0 | 2.0 |
| BC layer | 0.5 | 0.5 | 0.5 | 0.5 |
| | 95% cut filtration precision (μm) | | | |
| Magnetic layer | | | | |
| Filtering I-1 (binder solution) | — | 75.0 | — | — |
| Filtering I-2 (binder solution) | 15.0 | 15.0 | — | — |
| Filtering I-3 (binder solution) | 5.0 | 5.0 | 5.0 | 75.0 |
| Filtering II (after kneading) | 15.0 | 15.0 | 15.0 | 15.0 |

TABLE 12-continued (Embodiment 5)

|  |  |  |  |  |
|---|---|---|---|---|
| Filtering III (after dispersion) | 15.0 | 15.0 | 15.0 | 15.0 |
| Filtering IV-1 (viscosity adjusting solution) | — | — | 6.0 | — |
| Filtering IV-2 (viscosity adjusting solution) | — | — | 2.9 | — |
| Filtering IV-3 (viscosity adjusting solution) | 1.2 | 1.2 | 1.2 | 25.0 |
| Filtering V (after viscosity adjustment) | 1.2 | 1.2 | 1.2 | 1.2 |
| BC layer |  |  |  |  |
| Filtering VI (binder solution) | 105.0* | 105.0* | 105.0* | 105.0* |
| Filtering VII (after dispersion) | 15.0 | 15.0 | 15.0 | 15.0 |
| Filtering VIII (viscosity adjusting solution) | 32.0* | 32.0* | 32.0* | 32.0* |
| Filtering IX (after viscosity adjustment) | 1.2 | 1.2 | 1.2 | 1.2 |
| DO (5 μs-10 dB) after hot humid storage** | 1.7 | 1.5 | 1.6 | 2.0 |
| Measurement format | Hi-8 | Hi-8 | Hi-8 | Hi-8 |
| NTSC shortest record wavelength (μm) | 0.49 | 0.49 | 0.49 | 0.49 |
| Calender roll fouling (magnetic layer side) | ○ | ○ | ○ | ○ |
| Filtering system |  |  |  |  |
| parallel + circulatory filtration | ○ | ○ | ○ | ○ |
| multi-stage filtration | ○ | ○ | ○ | — |

*) values outside the limited range
**) Measured after tape samples were stored for 5 days in a 50° C./RH 80% environment and then allowed to stand for 24 hours in a 20° C./RH 60% environment.

TABLE 13

(Embodiment 5)

|  | Sample No. | |
|---|---|---|
|  | 5-12 | 5-13 |
| Paint Magnetic layer Coating thickness (μm) | ② | ③ |
| Magnetic layer | 3.0 | 3.0 |
| BC layer | 0.5 | 0.5 |
| 95% cut filtration precision (μm) | | |
| Magnetic layer | | |
| Filtering I (binder solution) | 5.0 | 5.0 |
| Filtering II (after kneading) | 15.0 | 15.0 |
| Filtering III (after dispersion) | 15.0 | 15.0 |
| Filtering IV (viscosity adjusting solution) | 1.2 | 1.2 |
| Filtering V (after viscosity adjustment) | 1.2 | 1.2 |
| BC layer | | |
| Filtering VI (binder solution) | 105.0* | 105.0* |
| Filtering VII (after dispersion) | 15.0 | 15.0 |
| Filtering VIII (viscosity adjusting solution) | 32.0* | 32.0* |
| Filtering IX (after viscosity adjustment) | 1.2 | 1.2 |
| DO (5 μs-10 dB) after hot humid storage** | 2.1 | 1.9 |
| Measurement format | S-VHS | VHS |
| NTSC shortest record wavelength (μm) | 0.83 | 1.32 |
| Calender roll fouling (magnetic layer side) | ○ | ○ |
| Filtering system | | |
| parallel + circulatory filtration | ○ | ○ |
| multi-stage filtration | — | — |

*) values outside the limited range
**) Measured after tape samples were stored for 5 days in a 50° C./RH 80% environment and then allowed to stand for 24 hours in a 20° C./RH 60% environment.

TABLE 14

(Embodiment 5)

|  | Sample No. | |
|---|---|---|
|  | 5-14 | 5-15 |
| Pain Upper magnetic layer Coating thickness (μm) | ① | ① |
| Upper magnetic layer | 0.3 | 0.2 |
| Lower magnetic layer | 1.7 | — |
| Lower non-magnetic layer | — | 1.8 |
| BC layer | 0.5 | 0.5 |
| 95% cut filtration precision (μm) | | |
| Upper layer | | |
| Filtering I (binder solution) | 5.0 | 5.0 |
| Filtering II (after kneading) | 15.0 | 15.0 |
| Filtering III (after dispersion) | 15.0 | 15.0 |
| Filtering IV (viscosity adjusting solution) | 1.2 | 1.2 |
| Filtering V (after viscosity adjustment) | 1.2 | 1.2 |
| Lower layer | | |
| Filtering I (binder solution) | 5.0 | 5.0 |
| Filtering II (after kneading) | 15.0 | 15.0 |
| Filtering III (after dispersion) | 15.0 | 15.0 |
| Filtering IV (viscosity adjusting solution) | 1.2 | 1.2 |
| Filtering V (after viscosity adjustment) | 15.0 | 15.0 |
| BC layer | | |
| Filtering VI (binder solution) | 105.0* | 105.0* |
| Filtering VII (after dispersion) | 15.0 | 15.0 |
| Filtering VIII (viscosity adjusting solution) | 32.0* | 32.0* |
| Filtering IX (after viscosity adjustment) | 1.2 | 1.2 |
| DO (5 μs-10 dB) after hot humid storage | 2.2 | 2.1 |
| Measurement format | Hi-8 | Hi-8 |
| NTSC shortest record wavelength (μm) | 0.49 | 0.49 |
| Calender roll fouling (magnetic layer side) | ○ | ○ |
| Filtering system | | |
| parallel + circulatory filtration | ○ | ○ |
| multi-stage filtration | — | — |

*) values outside the limited range

TABLE 15

(Embodiment 5)

| | Sample No. | | | | |
|---|---|---|---|---|---|
| | 5-16 (Comparison) | 5-17 (Comparison) | 5-18 (Comparison) | 5-19 | 5-20 |
| Paint Magnetic layer | ① | ① | ① | ① | ① |
| Coating thickness (μm) | | | | | |
| Magnetic layer | — | — | 2.0 | 2.0 | 2.0 |
| BC layer | — | — | 0.5 | 0.5 | 0.5 |
| 95% cut filtration precision (μm) | | | | | |
| Magnetic layer | | | | | |
| Filtering I (binder solution) | — | — | 105.0* | 105.0* | 105.0* |
| Filtering II (after kneading) | — | — | 15.0 | 15.0 | 15.0 |
| Filtering III (after dispersion) | — | — | 15.0 | 15.0 | 15.0 |
| Filtering IV (viscosity adjusting solution) | — | — | 32.0* | 32.0* | 32.0* |
| Filtering V (after viscosity adjustment) | — | — | 1.2 | 1.2 | 1.2 |
| BC layer | | | | | |
| Filtering VI-1 (binder solution) | — | — | — | — | — |
| Filtering VI-2 (binder solution) | — | — | — | — | — |
| Filtering VI-3 (binder solution) | 0.8* | 5.0 | 105.0* | 105.0* | 5.0 |
| Filtering VII (after dispersion) | — | 15.0 | 15.0 | 15.0 | 15.0 |
| Filtering VIII-1 (viscosity adjusting solution) | — | — | — | — | — |
| Filtering VIII-2 (viscosity adjusting solution) | — | — | — | — | — |
| Filtering VIII-3 (viscosity adjusting solution) | 0.8* | 0.8* | 32.0* | 1.2 | 32.0* |
| Filtering IX (after viscosity adjustment) | — | — | 1.2 | 1.2 | 1.2 |
| DO (5 μs-10 dB) after hot humid storage** | — | — | 35.0 | 2.3 | 2.1 |
| Measurement format | — | — | Hi-8 | Hi-8 | Hi-8 |
| NTSC shortest record wavelength (μm) | — | — | 0.49 | 0.49 | 0.49 |
| Calender roll fouling (magnetic layer side) | — | — | ○ | ○ | ○ |
| Filtering system | | | | | |
| parallel + circulatory filtration | ○ | ○ | ○ | ○ | ○ |
| multi-stage filtration | — | — | — | — | — |

| | Sample No. | | | | |
|---|---|---|---|---|---|
| | 5-21 | 5-22 | 5-23 | 5-24 | 5-25 |
| Paint Magnetic layer | ① | ① | ① | ① | ① |
| Coating thickness (μm) | | | | | |
| Magnetic layer | 2.0 | 2.0 | 2.0 | 2.0 | 2.0 |
| BC layer | 0.5 | 0.5 | 0.5 | 0.5 | 0.5 |
| 95% cut filtration precision (μm) | | | | | |
| Magnetic layer | | | | | |
| Filtering I (binder solution) | 105.0* | 105.0* | 105.0* | 105.0* | 105.0* |
| Filtering II (after kneading) | 15.0 | 15.0 | 15.0 | 15.0 | 15.0 |
| Filtering III (after dispersion) | 15.0 | 15.0 | 15.0 | 15.0 | 15.0 |
| Filtering IV (viscosity adjusting solution) | 32.0* | 32.0* | 32.0* | 32.0* | 32.0* |
| Filtering V (after viscosity adjustment) | 1.2 | 1.2 | 1.2 | 1.2 | 1.2 |
| BC layer | | | | | |
| Filtering VI-1 (binder solution) | — | — | 75.0 | — | — |
| Filtering VI-2 (binder solution) | — | 15.0 | 15.0 | — | — |
| Filtering VI-3 (binder solution) | 5.0 | 5.0 | 5.0 | 5.0 | 75.0 |
| Filtering VII (after dispersion) | 15.0 | 15.0 | 15.0 | 15.0 | 15.0 |
| Filtering VIII-1 (viscosity adjusting solution) | — | — | — | 6.0 | — |
| Filtering VIII-2 (viscosity adjusting solution) | — | — | — | 2.9 | — |
| Filtering VIII-3 (viscosity adjusting solution) | 1.2 | 1.2 | 1.2 | 1.2 | 25.0 |
| Filtering IX (after viscosity adjustment) | 1.2 | 1.2 | 1.2 | 1.2 | 1.2 |
| DO (5 μs-10 dB) after hot humid storage** | 1.9 | 1.3 | 1.2 | 1.3 | 2.2 |
| Measurement format | Hi-8 | Hi-8 | Hi-8 | Hi-8 | Hi-8 |
| NTSC shortest record wavelength (μm) | 0.49 | 0.49 | 0.49 | 0.49 | 0.49 |
| Calender roll fouling (magnetic layer side) | ○ | ○ | ○ | ○ | ○ |
| Filtering system | | | | | |
| parallel + circulatory filtration | ○ | ○ | ○ | ○ | ○ |
| multi-stage filtration | — | ○ | ○ | ○ | — |

*) values outside the limited range

TABLE 15-continued (Embodiment 5)

**) Measured after tape samples were stored for 5 days in a 50° C./RH 80% environment and then allowed to stand for 24 hours in a 20° C./RH 60% environment.

TABLE 16

(Embodiment 5)

| | Sample No. | |
|---|---|---|
| | 5-26 | 5-27 |
| Paint Magnetic layer | ② | ③ |
| Coating thickness (μm) | | |
| Magnetic layer | 3.0 | 3.0 |
| BC layer | 0.5 | 0.5 |
| 95% cut filtration precision (μm) | | |
| Magnetic layer | | |
| Filtering I (binder solution) | 105.0* | 105.0* |
| Filtering II (after kneading) | 15.0 | 15.0 |
| Filtering III (after dispersion) | 15.0 | 15.0 |
| Filtering IV (viscosity adjusting solution) | 32.0* | 32.0* |
| Filtering V (after viscosity adjustment) | 1.2 | 1.2 |
| BC layer | | |
| Filtering VI (binder solution) | 5.0 | 5.0 |
| Filtering VII (after dispersion) | 15.0 | 15.0 |
| Filtering VIII (viscosity adjusting solution) | 1.2 | 1.2 |
| Filtering IX (after viscosity adjustment) | 1.2 | 1.2 |
| DO (5 μs-10 dB) after hot humid storage** | 2.0 | 1.5 |
| Measurement format | S-VHS | VHS |
| NTSC shortest record wavelength (μm) | 0.83 | 1.32 |
| Calender roll fouling (magnetic layer side) | O | O |
| Filtering system | | |
| parallel + circulatory filtration | O | O |
| multi-stage filtration | — | — |

*) values outside th limited range
**) Measured after tape s&nples were stored for 5 days in a 50° C./RH 80% environment and then allowed to stand for 24 hours in a 20° C./RH 60% envirorment.

TABLE 17

(Embodiment 5)

| | Sample No. | |
|---|---|---|
| | 5-28 | 5-29 |
| Paint Upper magnetic layer | ① | ① |
| Coating thickness (μm) | | |
| Upper magnetic layer | 0.3 | 0.2 |
| Lower magnetic layer | 1.7 | — |
| Lower non-magnetic layer | — | 1.8 |
| BC layer | 0.5 | 0.5 |
| 95% cut filtration precision (μm) | | |
| Upper layer | | |
| Filtering I (binder solution) | 105.0* | 105.0* |
| Filtering II (after kneading) | 15.0 | 15.0 |
| Filtering III (after dispersion) | 15.0 | 15.0 |
| Filtering IV (viscosity adjusting solution) | 32.0* | 32.0* |
| Filtering V (after viscosity adjustment) | 1.2 | 1.2 |
| Lower layer | | |
| Filtering I (binder solution) | 105.0 | 105.0 |
| Filtering II (after kneading) | 15.0 | 15.0 |
| Filtering III (after dispersion) | 15.0 | 15.0 |
| Filtering IV (viscosity adjusting solution) | 32.0 | 32.0 |
| Filtering V (after viscosity adjustment) | 15.0 | 15.0 |
| BC layer | | |
| Filtering VI (binder solution) | 5.0 | 5.0 |
| Filtering VII (after dispersion) | 15.0 | 15.0 |
| Filtering VIII (viscosity adjusting solution) | 1.2 | 1.2 |
| Filtering IX (after viscosity adjustment) | 1.2 | 1.2 |
| DO (5 μs-10 dB) after hot humid storage** | 2.0 | 2.3 |
| Measurement format | Hi-8 | Hi-8 |
| NTSC shortest record wavelength (μm) | 0.49 | 0.49 |
| Calender roll fouling (magnetic layer side) | O | O |
| Filtering system | | |
| parallel + circulatory filtration | O | O |
| multi-stage filtration | — | — |

*) values outside the limited range
**) Measured after tape samples were stored for 5 days in a 50° C./RH 80% environment and then allowed to stand for 24 hours in a 20° C./RH 60% envirorment.

TABLE 18

(Embodiment 5)

| | Sample No. | | | | |
|---|---|---|---|---|---|
| | 5-30 | 5-31 | 5-32 | 5-33 | 5-34 |
| Paint Upper magnetic layer | ① | ② | ③ | ① | ① |
| Coating thickness (μm) | | | | | |
| Upper magnetic layer | 2.0 | 3.0 | 3.0 | 0.3 | 0.2 |
| Lower magnetic layer | — | — | — | 1.7 | — |
| Lower non-magnetic layer | — | — | — | — | 1.8 |
| BC layer | 0.5 | 0.5 | 0.5 | 0.5 | 0.5 |

TABLE 18-continued (Embodiment 5)

| | Sample No. | | | | |
|---|---|---|---|---|---|
| | 5-30 | 5-31 | 5-32 | 5-33 | 5-34 |
| 95% cut filtration precision (μm) | | | | | |
| Upper layer | | | | | |
| Filtering I (binder solution) | 5.0 | 5.0 | 5.0 | 5.0 | 5.0 |
| Filtering II (after kneading) | 15.0 | 15.0 | 15.0. | 15.0 | 15.0 |
| Filtering III (after dispersion) | 15.0 | 15.0 | 15.0 | 15.0 | 15.0 |
| Filtering IV (viscosity adjusting solution) | 1.2 | 1.2 | 1.2 | 1.2 | 1.2 |
| Filtering V (after viscosity adjustment) | 1.2 | 1.2 | 1.2 | 1.2 | 1.2 |
| Lower layer | | | | | |
| Filtering I (binder solution) | — | — | — | 5.0 | 5.0 |
| Filtering II (after kneading) | — | — | — | 15.0 | 15.0 |
| Filtering III (after dispersion) | — | — | — | 15.0 | 15.0 |
| Filtering IV (viscosity adjusting solution) | — | — | — | 1.2 | 1.2 |
| Filtering V (after viscosity adjustment) | — | — | — | 15.0 | 15.0 |
| BC layer | | | | | |
| Filtering VI (binder solution) | 5.0 | 5.0 | 5.0 | 5.0 | 5.0 |
| Filtering VII (after dispersion) | 15.0 | 15.0 | 15.0 | 15.0 | is.0 |
| Filtering VIII (viscosity adjusting solution) | 1.2 | 1.2 | 1.2 | 1.2 | 1.2 |
| Filtering IX (after viscosity adjustment) | 1.2 | 1.2 | 1.2 | 1.2 | 1.2 |
| DO (5 μs-10 dB) after hot humid storage** | 1.0 | 0.5 | 0.8 | 1.8 | 1.7 |
| Measurement format | Hi-8 | S-VHS | VHS | Hi-8 | Hi-8 |
| NTSC shortest record wavelength (μm) | 0.49 | 0.83 | 1.32 | 0.49 | 0.49 |
| Calender roll fouling (magnetic layer side) | ○ | ○ | ○ | ○ | ○ |
| Filtering system | | | | | |
| parallel + circulatory filtration | ○ | ○ | ○ | ○ | ○ |
| multi-stage filtration | — | — | — | — | — |

**) Measured after tape samples were stored for 5 days in a 50° C./RH 80% environment and then allowed to stand for 24 hours in a 20° C./RH 60% environment.

The advantages of the invention are evident from the data shown in the Tables. More specifically, the samples wherein filters having a 95% cut filtration precision within the range of the invention were used in steps of filtering a binder solution and viscosity adjusting solution during preparation of the magnetic layer-forming paint composition and backcoat layer-forming paint composition produced substantially less dropouts even under the very rigorous slice level and after hot humid storage as compared with the comparative samples wherein a filter having a 95% cut filtration precision exceeding the range of the invention was used. Particularly when both the magnetic layer-forming paint composition and backcoat layer-forming paint composition were prepared according to the present invention, outstanding advantages were obtained.

The samples of the invention provided no difference between the dropout level after hot humid storage and the dropout level immediately after preparation, indicating little deterioration of performance during storage. In contrast, the comparative samples exhibited an acceptable dropout level immediately after preparation, but a substantial deterioration after storage.

Note that where filters having a 95% cut filtration precision of less than 4 μm were used in filtering steps I and VI and where filters having a 95% cut filtration precision of less than 1 μm were used in filtering steps IV and VIII, a pressure loss of more than 10 kg/cm² occurred to prohibit formation of a paint composition.

Like sample No. 5-7 in Table 12, a comparative sample was prepared by filtering the binder solution and viscosity adjusting solution pursuant to the filtering process described in JP-A 143118/1979. This comparative sample was apparently inferior to sample No. 5-7 with respect to the property (dropout).

Example 6 (Embodiment 6)

Paint composition for upper layer

A final paint composition was obtained by the same procedure as the upper layer-forming paint composition of Example 1.

Paint composition for lower layer (1) (for magnetic layer)

A final paint composition was obtained by the same procedure as the lower layer-forming paint composition (1) (for magnetic layer) in Example 1.

Paint composition for lower layer (2) (for non-magnetic layer)

A final paint composition was obtained by the same procedure as the lower layer-forming paint composition (2) (for non-magnetic layer) in Example 1.

Paint composition for backcoat layer

A final paint composition was obtained as in Example 1.

Preparation of magnetic tape

Using the above-prepared magnetic paint compositions, magnetic tape samples as reported in the following Tables were prepared as in the foregoing Examples. The following Tables report the degree of fouling of the calender rolls on the magnetic layer side after calendering treatment.

For each sample, dropouts (DO) were counted. Measurement was done on the samples as prepared and the samples after hot humid storage (which were stored for 5 days in a 50° C./RH 80% environment and then allowed to stand for 24 hours in a 20° C./RH 60% environment). On this measurement, a dropout was counted when an output drop of 16 dB or more continued over 15 μs or longer. Measurement was done for 10 minutes. Dropouts per minute of the samples after hot humid storage were reported in the Tables. EV-S900 by Sony Corporation (8-mm format VTR) was used for measurement.

Note that sample No. 6-1 wherein no multi-stage filtration was carried out is also reported in Table 20 for comparison purposes.

TABLE 19

(Embodiment 6)

| | Sample No. | | | | |
|---|---|---|---|---|---|
| | 6-1 | 6-2 | 6-3 (comparison) | 6-4 (comparison) | 6-5 |
| Paint Lower layer | Magnetic layer | Magnetic layer | Magnetic layer | Magnetic layer | Magnetic layer |
| Coating thickness (μm) | | | | | |
| Upper layer | 0.3 | 0.3 | — | 0.3 | 0.6 |
| Lower layer | 1.7 | 1.7 | — | 1.7 | 1.4 |
| BC layer | 0.5 | 0.5 | — | 0.5 | 0.5 |
| | 95% cut filtration precision (μm) | | | | |
| Upper layer | | | | | |
| Filtering I (binder solution) | 105.0 | 105.0 | — | 105.0 | 105.0 |
| Filtering II (after kneading) | 105.0 | 105.0 | — | 105.0 | 105.0 |
| Filtering III (after dispersion) | 105.0 | 105.0 | — | 105.0 | 105.0 |
| Filtering IV (viscosity adjusting solution) | 32.0 | 32.0 | — | 32.0 | 32.0 |
| Filtering V (after viscosity adjustment) | 1.2 | 1.2 | — | 1.2 | 1.2 |
| Lower layer | | | | | |
| Filtering I (binder solution) | 105.0 | 105.0 | 105.0 | 105.0 | 105.0 |
| Filtering II (after kneading) | 105.0 | 105.0 | 105.0 | 105.0 | 105.0 |
| Filtering III (after dispersion) | 105.0 | 105.0 | 105.0 | 105.0 | 105.0 |
| Filtering IV (viscosity adjusting solution) | 32.0 | 32.0 | 32.0 | 32.0 | 32.0 |
| Filtering V-1 (after viscosity adjustment) | — | — | — | — | — |
| Filtering V-2 (after viscosity adjustment) | — | — | — | — | — |
| Filtering V-3 (after viscosity adjustment) | 1.2 | 6.0 | 0.8* | 15.0* | 1.2 |
| BC layer | | | | | |
| Filtering VI (binder solution) | 105.0 | 105.0 | — | 105.0 | 105.0 |
| Filtering VII (after dispersion) | 105.0 | 105.0 | — | 105.0 | 105.0 |
| Filtering VIII (viscosity adjusting solution) | 32.0 | 32.0 | — | 32.0 | 32.0 |
| Filtering IX (after viscosity adjustment) | 15.0 | 15.0 | — | 15.0 | 15.0 |
| DO (15 μs-16 dB) after hot humid storage** | 2.5 | 2.8 | — | 35.0 | 1.9 |
| Measurement format | 8 mm | 8 mm | — | 8 mm | 8 mm |
| Calender roll fouling (magnetic layer side) | ○ | ○ | — | ○ | ○ |
| Filtering system | | | | | |
| parallel + circulatory filtration | ○ | ○ | ○ | ○ | ○ |
| multi-stage filtration | — | — | — | — | — |

| | Sample No. | | | | |
|---|---|---|---|---|---|
| | 6-6 | 6-7 (comparison) | 6-8 | 6-9 | 6-10 (comparison) |
| Paint Lower layer | Magnetic layer | Magnetic layer | Non-Magnetic layer | Non-Magnetic layer | Non-Magnetic layer |
| Coating thickness (μm) | | | | | |
| Upper layer | 0.6 | 0.6 | 0.2 | 0.2 | 0.2 |
| Lower layer | 1.4 | 1.4 | 1.8 | 1.8 | 1.8 |
| BC layer | 0.5 | 0.5 | 0.5 | 0.5 | 0.5 |
| | 95% cut filtration precision (μm) | | | | |
| Upper layer | | | | | |
| Filtering I (binder solution) | 105.0 | 105.0 | 105.0 | 105.0 | 105.0 |
| Filtering II (after kneading) | 105.0 | 105.0 | 105.0 | 105.0 | 105.0 |
| Filtering III (after dispersion) | 105.0 | 105.0 | 105.0 | 105.0 | 105.0 |
| Filtering IV (viscosity adjusting solution) | 32.0 | 32.0 | 32.0 | 32.0 | 32.0 |
| Filtering V (after viscosity adjustment) | 1.2 | 1.2 | 1.2 | 1.2 | 1.2 |
| Lower layer | | | | | |
| Filtering I (binder solution) | 105.0 | 105.0 | 105.0 | 105.0 | 105.0 |
| Filtering II (after kneading) | 105.0 | 105.0 | 105.0 | 105.0 | 105.0 |
| Filtering III (after dispersion) | 105.0 | 105.0 | 105.0 | 105.0 | 105.0 |
| Filtering IV (viscosity adjusting solution) | 32.9 | 32.0 | 32.0 | 32.0 | 32.0 |

TABLE 19-continued (Embodiment 6)

|  |  |  |  |  |  |
|---|---|---|---|---|---|
| Filtering V-1 (after viscosity adjustment) | — | — | — | — | — |
| Filtering V-2 (after viscosity adjustment) | — | — | — | — | — |
| Filtering V-3 (after viscosity adjustment) | 6.0 | 15.0* | 1.2 | 6.0 | 15.0* |
| BC layer |  |  |  |  |  |
| Filtering VI (binder solution) | 105.0 | 105.0 | 105.0 | 105.0 | 105.0 |
| Filtering VII (after dispersion) | 105.0 | 105.0 | 105.0 | 105.0 | 105.0 |
| Filtering VIII (viscosity adjusting solution) | 32.0 | 32.0 | 32.0 | 32.0 | 32.0 |
| Filtering IX (after viscosity adjustment) | 15.0 | 15.0 | 15.0 | 15.0 | 15.0 |
| DO (15 μs-16 dB) after hot humid storage** | 2.1 | 30.0 | 2.3 | 2.9 | 40.0 |
| Measurement format | 8 mm | 8 mm | 8 mm | 8 mm | 8 mm |
| Calender roll fouling (magnetic layer side) | ○ | ○ | ○ | ○ | ○ |
| Filtering system |  |  |  |  |  |
| parallel + circulatory filtration | ○ | ○ | ○ | ○ | ○ |
| multi-stage filtration | — | — | — | — | — |

*) values outside the limited range
**) Measured after tape samples were stored for 5 days in a 50° C./RH 80% environment and then allowed to stand for 24 hours in a 20° C./RH 60% environment.

TABLE 20

(Embodiment 6)

| | Sample No. | | |
|---|---|---|---|
| | 6-1 | 6-11 | 6-12 |
| Paint Lower layer | Magnetic layer | Magnetic layer | Magnetic layer |
| Coating thickness(μm) | | | |
| Upper layer | 0.3 | 0.3 | 0.3 |
| Lower layer | 1.7 | 1.7 | 1.7 |
| BC layer | 0.5 | 0.5 | 0.5 |
| 95% cut filtration precision (μm) | | | |
| Upper layer | | | |
| Filtering I (binder solution) | 105.0 | 105.0 | 105.0 |
| Filtering II (after kneading) | 105.0 | 105.0 | 105.0 |
| Filtering III (after dispersion) | 105.0 | 105.0 | 105.0 |
| Filtering IV (viscosity adjusting solution) | 32.0 | 32.0 | 32.0 |
| Filtering V (after viscosity adjustment) | 1.2 | 1.2 | 1.2 |
| Lower layer | | | |
| Filtering I (binder solution) | 105.0 | 105.0 | 105.0 |
| Filtering II (after kneading) | 105.0 | 105.0 | 105.0 |
| Filtering III (after dispersion) | 105.0 | 105.0 | 105.0 |
| Filtering IV (viscosity adjusting solution) | 32.0 | 32.0 | 32.0 |
| Filtering V-1 (after viscosity adjustment) | — | — | 6.0 |
| Filtering V-2 (after viscosity adjustment) | — | 2.9 | 2.9 |
| Filtering V-3 (after viscosity adjustment) | 1.2 | 1.2 | 1.2 |
| BC layer | | | |
| Filtering VI (binder solution) | 105.0 | 105.0 | 105.0 |
| Filtering VII (after dispersion) | 105.0 | 105.0 | 105.0 |
| Filtering VIII (viscosity adjusting solution) | 32.0 | 32.0 | 32.0 |
| Filtering IX (after viscosity adjustment) | 15.0 | 15.0 | 15.0 |
| DO (15 μs-16 dB) after hot humid storage** | 2.5 | 2.1 | 1.8 |
| Measurement format | 8 mm | 8 mm | 8 mm |
| Calender roll fouling (magnetic layer side) | ○ | ○ | ○ |
| Filtering system | | | |
| parallel + circulatory filtration | ○ | ○ | ○ |
| multi-stage filtration | — | ○ | ○ |

**Measured after tape samples were stored for 5 days in a 50° C./RH 80% environment and then allowed to stand for 24 hours in a 20° C./RH 60% environment.

The advantages of the invention are evident from the data shown in the Tables. More specifically, the samples wherein a filter having a 95% cut filtration precision within the range of the invention was used in filtering step V during preparation of the lower layer-forming paint composition produced substantially less dropouts as compared with the comparative samples wherein a filter having a 95% cut filtration precision exceeding the range of the invention was used. It is also seen that dropouts were reduced by multi-stage filtration plus circulatory filtration. Additionally, the comparative samples wherein a filter having a 95% cut filtration precision exceeding the range of the invention was used in filtering step V during preparation of the lower layer-forming paint composition exhibited less dropouts immediately after preparation, but significantly increased dropouts after hot humid storage whereas the samples according to the invention exhibited a dropout value after hot humid storage which was substantially unchanged from that immediately after preparation.

Note that where a filter having a 95% cut filtration precision of 0.8 μm was used in filtering step V, a pressure loss of more than 10 kg/cm² occurred to prohibit formation of a paint composition.

Example 7 (Embodiment 7)

Paint composition for upper layer

A final paint composition was obtained by the same procedure as the upper layer-forming paint composition of Example 1.

Paint composition for lower layer (1) (for magnetic layer)

A final paint composition was obtained by the same procedure as the lower layer-forming paint composition (1) (for magnetic layer) in Example 1.

Paint composition for lower layer (2) (for non-magnetic layer)

A final paint composition was obtained by the same procedure as the lower layer-forming paint composition (2) (for non-magnetic layer) in Example 1.

Paint composition for backcoat layer

A final paint composition was obtained as in Example 1.

Preparation of magnetic tape

Using the above-prepared magnetic paint compositions, magnetic tape samples as reported in the following Tables were prepared as in the foregoing Examples. The following Tables report the degree of fouling of the calender rolls on the backcoat layer side after calendering treatment.

For each sample, dropouts (DO) were counted. Measurement was done on the samples as prepared and the samples after hot humid storage (which were stored for 5 days in a 50° C./RH 80% environment and then allowed to stand for 24 hours in a 20° C./RH 60% environment). On this measurement, a dropout was counted when an output drop of 12 dB or more continued over 10 μs or longer. Measurement was done for 10 minutes. Dropouts per minute of the samples after hot humid storage were reported in the Tables. EV-S900 by Sony Corporation (Hi 8 format VTR) was used for measurement.

TABLE 21

(Embodiment 7)

| | Sample No. | | | | |
|---|---|---|---|---|---|
| | 7-1 | 7-2 | 7-3 | 7-4 (comparison) | 7-5 (comparison) |
| Paint Lower layer | Magnetic layer | Magnetic layer | Magnetic layer | Magnetic layer | Magnetic layer |
| Coating thickness(μm) | | | | | |
| Upper layer | 0.3 | 0.3 | 0.3 | 0.3 | — |
| Lower layer | 1.7 | 1.7 | 1.7 | 1.7 | — |
| BC layer | 0.5 | 0.5 | 0.5 | 0.5 | — |
| 95% cut filtration precision (μm) | | | | | |
| Upper layer | | | | | |
| Filtering I (binder solution) | 105.0 | 105.0 | 105.0 | 105.0 | — |
| Filtering II (after kneading) | 105.0 | 105.0 | 105.0 | 105.0 | — |
| Filtering III (after dispersion) | 105.0 | 105.0 | 105.0 | 105.0 | — |
| Filtering IV (viscosity adjusting solution) | 32.0 | 32.0 | 32.0 | 32.0 | — |
| Filtering V (after viscosity adjustment) | 1.2 | 1.2 | 1.2 | 1.2 | — |
| Lower layer | | | | | |
| Filtering I (binder solution) | 105.0 | 105.0 | 105.0 | 105.0 | 105.0 |
| Filtering II (after kneading) | 105.0 | 105.0 | 105.0 | 105.0 | 105.0 |
| Filtering III (after dispersion) | 105.0 | 105.0 | 105.0 | 105.0 | 105.0 |
| Filtering IV (viscosity adjusting solution) | 32.0 | 32.0 | 32.0 | 32.0 | 32.0 |
| Filtering V-1 (after viscosity adjustment) | — | — | — | — | — |
| Filtering V-2 (after viscosity adjustment) | — | — | — | — | — |
| Filtering V-3 (after viscosity adjustment) | 1.2 | 6.0 | 1.2 | 1.2 | 0.8* |
| BC layer | | | | | |
| Filtering VI (binder solution) | 105.0 | 105.0 | 105.0 | 105.0 | 105.0 |
| Filtering VII (after dispersion) | 105.0 | 105.0 | 105.0 | 105.0 | 105.0 |
| Filtering VIII (viscosity adjusting solution) | 32.0 | 32.0 | 32.0 | 32.0 | 32.0 |
| Filtering IX-1 (after viscosity adjustment) | — | — | — | — | — |
| Filtering IX-2 (after viscosity adjustment) | — | — | — | — | — |
| Filtering IX-3 (after viscosity adjustment) | 1.2 | 1.2 | 4.0 | 15.0* | 0.8* |
| DO (10 μs-12 dB) after hot humid storage** | 1.8 | 2.0 | 2.1 | 45.0 | — |
| Measurement format | Hi8 | Hi8 | Hi8 | Hi8 | — |
| Calender roll fouling (magnetic layer side) | o | o | o | x | — |
| Filtering system | | | | | |
| parallel + circulatory filtration | o | o | o | o | o |
| multi-stage filtration | — | — | — | — | — |

TABLE 21-continued (Embodiment 7)

|  | Sample No. | | | | |
| --- | --- | --- | --- | --- | --- |
|  | 7-6 (comparison) | 7-7 | 7-8 (comparison) | 7-9 | 7-10 (comparison) |
| Paint Lower layer | Magnetic layer | Magnetic layer | Magnetic layer | Magnetic layer | Magnetic layer |
| Coating thickness(μm) | | | | | |
| Upper layer | 0.3 | 0.3 | 0.3 | 0.6 | 0.6 |
| Lower layer | 1.7 | 1.7 | 1.7 | 1.4 | 1.4 |
| BC layer | 0.5 | 1.0 | 1.0 | 0.5 | 0.5 |
| 95% cut filtration precision (μm) | | | | | |
| Upper layer | | | | | |
| Filtering I (binder solution) | 105.0 | 105.0 | 105.0 | 105.0 | 105.0 |
| Filtering II (after kneading) | 105.0 | 105.0 | 105.0 | 105.0 | 105.0 |
| Filtering III (after dispersion) | 105.0 | 105.0 | 105.0 | 105.0 | 105.0 |
| Filtering IV (viscosity adjusting solution) | 32.0 | 32.0 | 32.0 | 32.0 | 32.0 |
| Filtering V (after viscosity adjustment) | 1.2 | 1.2 | 1.2 | 1.2 | 1.2 |
| Lower layer | | | | | |
| Filtering I (binder solution) | 105.0 | 105.0 | 105.0 | 105.0 | 105.0 |
| Filtering II (after kneading) | 105.0 | 105.0 | 105.0 | 105.0 | 105.0 |
| Filtering III (after dispersion) | 105.0 | 105.0 | 105.0 | 105.0 | 105.0 |
| Filtering IV (viscosity adjusting solution) | 32.0 | 32.0 | 32.0 | 32.0 | 32.0 |
| Filtering V-1 (after viscosity adjustment) | — | — | — | — | — |
| Filtering V-2 (after viscosity adjustment) | — | — | — | — | — |
| Filtering V-3 (after viscosity adjustment) | 15.0* | 1.2 | 1.2 | 1.2 | 1.2 |
| BC layer | | | | | |
| Filtering VI (binder solution) | 105.0 | 105.0 | 105.0 | 105.0 | 105.0 |
| Filtering VII (after dispersion) | 105.0 | 105.0 | 105.0 | 105.0 | 105.0 |
| Filtering VIII (viscosity adjusting solution) | 32.0 | 32.0 | 32.0 | 32.0 | 32.0 |
| Filtering IX-1 (after viscosity adjustment) | — | — | — | — | — |
| Filtering IX-2 (after viscosity adjustment) | — | — | — | — | — |
| Filtering IX-3 (after viscosity adjustment) | 1.2 | 6.0 | 15.0* | 1.2 | 15.0* |
| DO (10 μs-12 dB) after hot humid storage** | 38.0 | 2.4 | 34.0 | 1.7 | 36.0 |
| Measurement format | Hi8 | Hi8 | Hi8 | Hi8 | Hi8 |
| Calender roll fouling (magnetic layer side) | o | o | x | o | x |
| Filtering system | | | | | |
| parallel + circulatory filtration | o | o | o | o | o |
| multi-stage filtration | — | — | — | — | — |

*values outside the limited range
**Measured after tape samples were stored for 5 days in a 50° C./RH 80% environment and then allowed to stand for 24 hours in a 20° C./RH 60% environment.

TABLE 22

(Embodiment 7)

|  |  | Sample No. | | | | |
| --- | --- | --- | --- | --- | --- | --- |
|  |  | 7-11 | 7-12 (comparison) | 7-13 | 7-14 | 7-15 |
| Paint Lower layer |  | Non-Magnetic layer | Non-Magnetic layer | Magnetic layer | Magnetic layer | Magnetic layer |
| Coating thickness(μm) | Upper layer | 0.2 | 0.2 | 0.3 | 0.3 | 0.3 |
|  | Lower layer | 1.8 | 1.8 | 1.7 | 1.7 | 1.7 |
|  | BC layer | 0.5 | 0.5 | 0.5 | 0.5 | 0.5 |
| 95% cut filtration precision (μm) | | | | | | |
| Upper layer | | | | | | |
| Filtering I (binder solution) |  | 105.0 | 105.0 | 105.0 | 105.0 | 105.0 |
| Filtering II (after kneading) |  | 105.0 | 105.0 | 105.0 | 105.0 | 105.0 |
| Filtering III (after dispersion) |  | 105.0 | 105.0 | 105.0 | 105.0 | 105.0 |
| Filtering IV (viscosity adjusting solution) |  | 32.0 | 32.0 | 32.0 | 32.0 | 32.0 |
| Filtering V (after viscosity adjustment) |  | 1.2 | 1.2 | 1.2 | 1.2 | 1.2 |
| Lower layer | | | | | | |
| Filtering I (binder solution) |  | 105.0 | 105.0 | 105.0 | 105.0 | 105.0 |

TABLE 22-continued (Embodiment 7)

| | Sample No. | | | | |
|---|---|---|---|---|---|
| | 7-11 | 7-12 (comparison) | 7-13 | 7-14 | 7-15 |
| Filtering II (after kneading) | 105.0 | 105.0 | 105.0 | 105.0 | 105.0 |
| Filtering III (after dispersion) | 105.0 | 105.0 | 105.0 | 105.0 | 105.0 |
| Filtering IV (viscosity adjusting solution) | 32.0 | 32.0 | 32.0 | 32.0 | 32.0 |
| Filtering V-1 (after viscosity adjustment) | — | — | — | 6.0 | — |
| Filtering V-2 (after viscosity adjustment) | — | — | 2.9 | 2.9 | — |
| Filtering V-3 (after viscosity adjustment) | 1.2 | 1.2 | 1.2 | 1.2 | 1.2 |
| BC layer | | | | | |
| Filtering VI (binder solution) | 105.0 | 105.0 | 105.0 | 105.0 | 105.0 |
| Filtering VII (after dispersion) | 105.0 | 105.0 | 105.0 | 105.0 | 105.0 |
| Filtering VIII (viscosity adjusting solution) | 32.0 | 32.0 | 32.0 | 32.0 | 32.0 |
| Filtering IX-1 (after viscosity adjustment) | — | — | — | — | 6.0 |
| Filtering IX-2 (after viscosity adjustment) | — | — | — | — | 2.9 |
| Filtering IX-3 (after viscosity adjustment) | 1.2 | 15.0* | 1.2 | 1.2 | 1.2 |
| DO (10 μs-12 dB) after hot humid storage** | 1.7 | 33.0 | 1.8 | 1.6 | 1.7 |
| Measurement format | Hi8 | Hi8 | Hi8 | Hi8 | Hi8 |
| Calender roll fouling (magnetic layer side) | o | x | o | o | o |
| Filtering system | | | | | |
| parallel + circulatory filtration | o | o | o | o | o |
| multi-stage filtration | — | — | o | o | o |

*values outside the limited range
**Measured after tape samples were stored for 5 days in a 50° C./RH 80% environment and then allowed to stand for 24 hours in a 20° C./RH 60% environment.

The advantages of the invention are evident from the data shown in the Tables. More specifically, the samples wherein a filter having a 95% cut filtration precision within the range of the invention was used in filtering step V during preparation of the lower layer-forming paint composition and a filter having a 95% cut filtration precision within the range of the invention was used in filtering step IX during preparation of the backcoat layer-forming paint composition produced substantially less dropouts as compared with the comparative samples wherein a filter having a 95% cut filtration precision exceeding the range of the invention was used. It is also seen that dropouts were reduced by multi-stage filtration plus circulatory filtration. Additionally, the samples according to the invention exhibited a DO value after hot humid storage which was substantially unchanged from that immediately after preparation. The fact that these satisfactory results were obtained from the measurement after the storage in hot humid conditions using the rigorous standard that a dropout was countable when an output drop of 12 dB or more continued over 10 μs or longer suggests that the present invention is quite effective.

In contrast, the comparative samples wherein a filter having a 95% cut filtration precision exceeding the range of the invention was used in filtering step V during preparation of the lower layer-forming paint composition exhibited less dropouts immediately after preparation, but significantly increased dropouts after hot humid storage.

Note that where a filter having a 95% cut filtration precision of 0.8 μm was used in filtering step V or IX, a pressure loss of more than 10 kg/cm² occurred to prohibit formation of a paint composition.

Example 8 (Embodiment 8)

Paint composition for upper layer

A final paint composition was obtained by the same procedure as the upper layer-forming paint composition of Example 1.

Paint composition for lower layer (1) (for magnetic layer)

A final paint composition was obtained by the same procedure as the lower layer-forming paint composition (1) (for magnetic layer) in Example 1.

Paint composition for lower layer (2) (for non-magnetic layer)

A final paint composition was obtained by the same procedure as the lower layer-forming paint composition (2) (for non-magnetic layer) in Example 1.

Paint composition for backcoat layer

A final paint composition was obtained as in Example 1.

Preparation of magnetic tape

Using the above-prepared magnetic paint compositions, magnetic tape samples as reported in the following Tables were prepared as in the foregoing Examples. The following Tables report the degree of fouling of the calender rolls on the magnetic layer side after calendering treatment.

For each sample, dropouts (DO) were counted. Measurement was done on the samples as prepared and the samples after hot humid storage (which were stored for 5 days in a 50° C./RH 80% environment and then allowed to stand for 24 hours in a 20° C./RH 60% environment). On this measurement, a dropout was counted when an output drop of 10 dB or more continued over 5 μs or longer. Measurement was done for 10 minutes. Dropouts per minute of the samples after hot humid storage were reported in the Tables. EV-S900 by Sony Corporation (Hi 8 format VTR) was used for measurement.

TABLE 23

(Embodiment 8)

| | Sample No. | | | | |
|---|---|---|---|---|---|
| | 8-1 (comparison) | 8-2 (comparison) | 8-3 (comparison) | 8-4 | 8-5 |
| Paint  Lower layer | Magnetic layer | Magnetic layer | Magnetic layer | Magnetic layer | Magnetic layer |
| Coating thickness(μm) | | | | | |
| Upper layer | — | — | — | 0.3 | 0.3 |
| Lower layer | — | — | — | 1.7 | 1.7 |
| BC layer | — | — | — | 0.5 | 0.5 |
| 95% cut filtration precision (μm) | | | | | |
| Upper layer | | | | | |
| Filtering I (binder solution) | — | — | — | 105.0 | 105.0 |
| Filtering II (after kneading) | — | — | — | 15.0 | 15.0 |
| Filtering III (after dispersion) | — | — | — | 15.0 | 15.0 |
| Filtering IV (viscosity adjusting solution) | — | — | — | 32.0 | 32.0 |
| Filtering V (after viscosity adjustment) | — | — | — | 1.2 | 1.2 |
| Lower layer | | | | | |
| Filtering I (binder solution) | 105.0 | 105.0 | 105.0 | 105.0 | 105.0 |
| Filtering II-1 (after kneading) | — | — | — | — | — |
| Filtering II-2 (after kneading) | — | — | — | — | — |
| Filtering II-3 (after kneading) | 8.0* | 15.0 | 15.0 | 15.0 | 15.0 |
| Filtering III-1 (after dispersion) | — | — | — | — | — |
| Filtering III-2 (after dispersion) | — | — | — | — | — |
| Filtering III-3 (after dispersion) | — | 8.0* | 15.0 | 15.0 | 105.0* |
| Filtering IV (viscosity adjusting solution) | — | — | 32.0 | 32.0 | 32.0 |
| Filtering V-1 (after viscosity adjustment) | — | — | — | — | — |
| Filtering V-2 (after viscosity adjustment) | — | — | — | — | — |
| Filtering V-3 (after viscosity adjustment) | — | — | 0.8* | 1.2 | 1.2 |
| BC layer | | | | | |
| Filtering VI (binder solution) | — | — | — | 105.0 | 105.0 |
| Filtering VII (after dispersion) | — | — | — | 15.0 | 15.0 |
| Filtering VIII (viscosity adjusting solution) | — | — | — | 32.0 | 32.0 |
| Filtering IX (after viscosity adjustment) | — | — | — | 1.2 | 1.2 |
| DO (5 μs-10 dB) after hot humid storage** | — | — | — | 1.7 | 2.2 |
| Measurement format | — | — | — | Hi8 | Hi8 |
| Calender roll fouling (magnetic layer side) | — | — | — | ○ | ○ |
| Filtering system | | | | | |
| parallel + circulatory filtration | ○ | ○ | ○ | ○ | ○ |
| multi-stage filtration | — | — | — | — | — |

| | Sample No. | | | | |
|---|---|---|---|---|---|
| | 8-6 | 8-7 | 8-8 (comparison) | 8-9 (comparison) | 8-10 |
| Paint  Lower layer | Magnetic layer | Magnetic layer | Magnetic layer | Magnetic layer | Magnetic layer |
| Coating thickness(μm) | | | | | |
| Upper layer | 0.3 | 0.3 | 0.3 | 0.3 | 0.3 |
| Lower layer | 1.7 | 1.7 | 1.7 | 1.7 | 1.7 |
| BC layer | 0.5 | 1.0 | 1.0 | 0.5 | 0.5 |
| 95% cut filtration precision (μm) | | | | | |
| Upper layer | | | | | |
| Filtering I (binder solution) | 105.0 | 105.0 | 105.0 | 105.0 | 105.0 |
| Filtering II (after kneading) | 15.0 | 15.0 | 15.0 | 15.0 | 15.0 |
| Filtering III (after dispersion) | 15.0 | 15.0 | 15.0 | 15.0 | 15.0 |
| Filtering IV (viscosity adjusting solution) | 32.0 | 32.0 | 32.0 | 32.0 | 32.0 |
| Filtering V (after viscosity adjustment) | 1.2 | 1.2 | 1.2 | 1.2 | 1.2 |
| Lower layer | | | | | |
| Filtering I (binder solution) | 105.0 | 105.0 | 105.0 | 105.0 | 105.0 |
| Filtering II-1 (after kneading) | — | — | — | — | — |
| Filtering II-2 (after kneading) | — | — | — | — | — |
| Filtering II-3 (after kneading) | 105.0* | 15.0 | 15.0 | 105.0* | 75.0 |
| Filtering III-1 (after dispersion) | — | — | — | — | — |
| Filtering III-2 (after dispersion) | — | — | — | — | — |

TABLE 23-continued (Embodiment 8)

|  |  |  |  |  |  |
|---|---|---|---|---|---|
| Filtering III-3 (after dispersion) | 15.0 | 15.0 | 15.0 | 105.0* | 75.0 |
| Filtering IV (viscosity adjusting solution) | 32.0 | 32.0 | 32.0 | 32.0 | 32.0 |
| Filtering V-1 (after viscosity adjustment) | — | — | — | — | — |
| Filtering V-2 (after viscosity adjustment) | — | — | — | — | — |
| Filtering V-3 (after viscosity adjustment) | 1.2 | 6.0 | 15.0* | 1.2 | 1.2 |
| BC layer |  |  |  |  |  |
| Filtering VI (binder solution) | 105.0 | 105.0 | 105.0 | 105.0 | 105.0 |
| Filtering VII (after dispersion) | 15.0 | 15.0 | 15.0 | 15.0 | 15.0 |
| Filtering VIII (viscosity adjusting solution) | 32.0 | 32.0 | 32.0 | 32.0 | 32.0 |
| Filtering IX (after viscosity adjustment) | 1.2 | 1.2 | 1.2 | 1.2 | 1.2 |
| DO (5 μs-10 dB) after hot humid storage** | 2.3 | 2.9 | 40.0 | 35.0 | 2.7 |
| Measurement format | Hi8 | Hi8 | Hi8 | Hi8 | Hi8 |
| Calender roll fouling (magnetic layer side) | o | o | o | o | o |
| Filtering system |  |  |  |  |  |
| parallel + circulatory filtration | o | o | o | o | o |
| multi-stage filtration | — | — | — | — | — |

*values outside the limited range
**Measured after tape samples were stored for 5 days in a 50° C./RH 80% environment and then allowed to stand for 24 hours in a 20° C./RH 60% environment.

TABLE 24

(Embodiment 8)

| | | Sample No. | | | | | |
|---|---|---|---|---|---|---|---|
| | | 8-11 | 8-12 | 8-13 | 8-14 | 8-15 | 8-15 |
| Paint Lower layer | | Magnetic layer | Non-Magnetic layer | Magnetic layer | Magnetic layer | Magnetic layer | Magnetic layer |
| Coating thickness(μm) | Upper layer | 0.6 | 0.2 | 0.3 | 0.3 | 0.3 | 0.3 |
| | Lower layer | 1.4 | 1.8 | 1.7 | 1.7 | 1.7 | 1.7 |
| | BC layer | 0.5 | 0.5 | 0.5 | 0.5 | 0.5 | 0.5 |
| 95% cut filtration precision (μm) | | | | | | | |
| Upper layer | | | | | | | |
| Filtering I (binder solution) | | 105.0 | 105.0 | 105.0 | 105.0 | 105.0 | 105.0 |
| Filtering II (after kneading) | | 15.0 | 15.0 | 15.0 | 15.0 | 15.0 | 15.0 |
| Filtering III (after dispersion) | | 15.0 | 15.0 | 15.0 | 15.0 | 15.0 | 15.0 |
| Filtering IV (viscosity adjusting solution) | | 32.0 | 32.0 | 32.0 | 32.0 | 32.0 | 32.0 |
| Filtering V (after viscosity adjustment) | | 1.2 | 1.2 | 1.2 | 1.2 | 1.2 | 1.2 |
| Lower layer | | | | | | | |
| Filtering I (binder solution) | | 105.0 | 105.0 | 105.0 | 105.0 | 105.0 | 105.0 |
| Filtering II-1 (after kneading) | | — | — | — | 105.0 | — | — |
| Filtering II-2 (after kneading) | | — | — | 45.0 | 45.0 | — | — |
| Filtering II-3 (after kneading) | | 15.0 | 15.0 | 15.0 | 15.0 | 15.0 | 15.0 |
| Filtering III-1 (after dispersion) | | — | — | — | — | 105.0 | — |
| Filtering III-2 (after dispersion) | | — | — | — | — | 45.0 | — |
| Filtering III-3 (after dispersion) | | 15.0 | 15.0 | 15.0 | 15.0 | 15.0 | 15.0 |
| Filtering IV (viscosity adjusting solution) | | 32.0 | 32.0 | 32.0 | 32.0 | 32.0 | 32.0 |
| Filtering V-1 (after viscosity adjustment) | | — | — | — | — | — | 6.0 |
| Filtering V-2 (after viscosity adjustment) | | — | — | — | — | — | 2.9 |
| Filtering V-3 (after viscosity adjustment) | | 1.2 | 1.2 | 1.2 | 1.2 | 1.2 | 1.2 |
| BC layer | | | | | | | |
| Filtering VI (binder solution) | | 105.0 | 105.0 | 105.0 | 105.0 | 105.0 | 105.0 |
| Filtering VII (after dispersion) | | 15.0 | 15.0 | 15.0 | 15.0 | 15.0 | 15.0 |
| Filtering VIII (viscosity adjusting solution) | | 32.0 | 32.0 | 32.0 | 32.0 | 32.0 | 32.0 |
| Filtering IX (after viscosity adjustment) | | 1.2 | 1.2 | 1.2 | 1.2 | 1.2 | 1.2 |
| DO (10 μs-12 dB) after hot humid storage** | | 1.9 | 2.0 | 1.5 | 1.5 | 1.8 | 1.3 |
| Measurement format | | Hi8 | Hi8 | Hi8 | Hi8 | Hi8 | Hi8 |
| Calender roll fouling (magnetic layer side) | | O | o | o | o | o | o |
| Filtering system | | | | | | | |
| parallel + circulatory filtration | | O | o | o | o | o | o |
| multi-stage filtration | | — | — | o | o | o | o |

**Measured after tape samples were stored for 5 days in a 50° C./RH 80% environment and then allowed to stand for 24 hours in a 20° C./RH 60% environment.

The advantages of the invention are evident from the data shown in the Tables. More specifically, the samples wherein filters having a 95% cut filtration precision within the range of the invention were used in at least one of filtering steps II and III and filtering step V during preparation of the lower layer-forming paint composition produced substantially less dropouts as compared with the comparative samples wherein a filter having a 95% cut filtration precision exceeding the range of the invention was used. It is also seen that dropouts were reduced by multi-stage filtration plus circulatory filtration. Additionally, the samples according to the invention exhibited a DO value after hot humid storage which was substantially unchanged from that immediately after preparation. The fact that these satisfactory results were obtained from the measurement after the storage in hot humid conditions using the rigorous standard that a dropout was countable when an output drop of 10 dB or more continued over 5 μs or longer suggests that the present invention is quite effective.

In contrast, the comparative samples wherein filters having a 95% cut filtration precision exceeding the range of the invention were used in filtering steps II and III during preparation of the lower layer-forming paint composition and the comparative samples wherein a filter having a 95% cut filtration precision exceeding the range of the invention was used in filtering step V exhibited less dropouts immediately after preparation, but significantly increased dropouts after hot humid storage.

Note that where a filter having a 95% cut filtration precision below the range of the invention was used in filtering step II, III or V, a pressure loss of more than 10 kg/cm² occurred to prohibit formation of a paint composition.

Example 9 (Embodiment 9)

Paint composition for upper layer

A final paint composition was obtained by the same procedure as the upper layer-forming paint composition of Example 1.

Paint composition for lower layer (1) (for magnetic layer)

A final paint composition was obtained by the same procedure as the lower layer-forming paint composition (1) (for magnetic layer) in Example 1.

Paint composition for lower layer (2) (for non-magnetic layer)

A final paint composition was obtained by the same procedure as the lower layer-forming paint composition (2) (for non-magnetic layer) in Example 1.

Paint composition for backcoat layer

A final paint composition was obtained as in Example 1.

Preparation of magnetic tape

Using the above-prepared magnetic paint compositions, magnetic tape samples as reported in the following Tables were prepared as in the foregoing Examples. The following Tables report the degree of fouling of the calender rolls on the magnetic layer side after calendering treatment.

For each sample, dropouts (DO) were counted. Measurement was done on the samples as prepared and the samples after hot humid storage (which were stored for 5 days in a 50° C./RH 80% environment and then allowed to stand for 24 hours in a 20° C./RH 60% environment). On this measurement, a dropout was counted when an output drop of 10 dB or more continued over 5 μs or longer. Measurement was done for 10 minutes. Dropouts per minute of the samples after hot humid storage were reported in the Tables. EV-S900 by Sony Corporation (Hi 8 format VTR) was used for measurement.

Also for each sample, C/N (Y-C/N) at 7 MHz was measured. Measurement of Y-C/N was carried out both immediately after preparation and after hot humid storage like the measurement of dropouts. In the Tables, the difference between Y-C/N after storage and Y-C/N immediately after preparation is reported as "Y-C/N storage loss".

TABLE 25

(Embodiment 9)

| | Sample No. | | | | |
|---|---|---|---|---|---|
| | 9-1 (comparison) | 9-2 (comparison) | 9-3 (comparison) | 9-4 | 9-5 |
| Paint Lower layer | Magnetic layer | Magnetic layer | Magnetic layer | Magnetic layer | Magnetic layer |
| Coating thickness(μm) | | | | | |
| Upper layer | — | — | 0.3 | 0.3 | 0.3 |
| Lower layer | — | — | 1.7 | 1.7 | 1.7 |
| BC layer | — | — | 0.5 | 0.5 | 0.5 |
| 95% cut filtration precision (μm) | | | | | |
| Upper layer | | | | | |
| Filtering I (binder solution) | — | — | 5.0 | 5.0 | 5.0 |
| Filtering II (after kneading) | — | — | 15.0 | 15.0 | 15.0 |
| Filtering III (after dispersion) | — | — | 15.0 | 15.0 | 15.0 |
| Filtering IV (viscosity adjusting solution) | — | — | 1.0 | 1.0 | 1.0 |
| Filtering V (after viscosity adjustment) | — | — | 1.2 | 1.2 | 1.2 |
| Lower layer | | | | | |
| Filtering I-1 (binder solution) | — | — | — | — | — |
| Filtering I-2 (binder solution) | — | — | — | — | — |
| Filtering I-3 (binder solution) | 0.8* | 5.0 | 105.0* | 105.0* | 5.0 |
| Filtering II (after kneading) | — | 15.0 | 15.0 | 15.0 | 15.0 |
| Filtering III (after dispersion) | — | 15.0 | 15.0 | 15.0 | 15.0 |
| Filtering IV-1 (viscosity adjusting solution) | — | — | — | — | — |
| Filtering IV-2 (viscosity adjusting solution) | — | — | — | — | — |
| Filtering IV-3 (viscosity adjusting solution) | 0.8* | 1.2 | 32.0* | 1.2 | 32.0* |
| Filtering V-1 (after viscosity adjustment) | — | — | — | — | — |

TABLE 25-continued (Embodiment 9)

| | | | | | |
|---|---|---|---|---|---|
| Filtering V-2 (after viscosity adjustment) | — | — | — | — | — |
| Filtering V-3 (after viscosity adjustment) | — | 0.8* | 1.2 | 1.2 | 1.2 |
| BC layer | | | | | |
| Filtering VI (binder solution) | — | — | 5.0 | 5.0 | 5.0 |
| Filtering VII (after dispersion) | — | — | 15.0 | 15.0 | 15.0 |
| Filtering VIII (viscosity adjusting solution) | — | — | 1.2 | 1.2 | 1.2 |
| Filtering IX (after viscosity adjustment) | — | — | 1.2 | 1.2 | 1.2 |
| DO (5 μs-10 dB) after hot humid storage** | — | — | 1.5 | 1.3 | 1.3 |
| Y-C/N storage loss (dB) | — | — | −2.0 | −0.1 | 0.0 |
| Measurement format | — | — | Hi8 | Hi8 | Hi8 |
| Calender roll fouling (magnetic layer side) | — | — | ◯ | ◯ | ◯ |
| Filtering system | | | | | |
| parallel + circulatory filtration | ◯ | ◯ | ◯ | ◯ | ◯ |
| multi-stage filtration | — | — | — | — | — |

| | Sample No. | | | |
|---|---|---|---|---|
| | 9-6 | 9-7 | 9-8 | 9-9 (comparison) |
| Paint   Lower layer | Magnetic layer | Magnetic layer | Magnetic layer | Magnetic layer |
| Coating thickness(μm) | | | | |
| Upper layer | 0.3 | 0.3 | 0.3 | 0.3 |
| Lower layer | 1.7 | 1.7 | 1.7 | 1.7 |
| BC layer | 0.5 | 1.0 | 1.0 | 1.0 |
| 95% cut filtration precision (μm) | | | | |
| Upper layer | | | | |
| Filtering I (binder solution) | 5.0 | 5.0 | 5.0 | 5.0 |
| Filtering II (after kneading) | 15.0 | 15.0 | 15.0 | 15.0 |
| Filtering III (after dispersion) | 15.0 | 15.0 | 15.0 | 15.0 |
| Filtering IV (viscosity adjusting solution) | 1.0 | 1.0 | 1.0 | 1.0 |
| Filtering V (after viscosity adjustment) | 1.2 | 1.2 | 1.2 | 1.2 |
| Lower layer | | | | |
| Filtering I-1 (binder solution) | — | — | — | — |
| Filtering I-2 (binder solution) | — | — | — | — |
| Filtering I-3 (binder solution) | 5.0 | 75.0 | 5.0 | 5.0 |
| Filtering II (after kneading) | 15.0 | 15.0 | 15.0 | 15.0 |
| Filtering III (after dispersion) | 15.0 | 15.0 | 15.0 | 15.0 |
| Filtering IV-1 (viscosity adjusting solution) | — | — | — | — |
| Filtering IV-2 (viscosity adjusting solution) | — | — | — | — |
| Filtering IV-3 (viscosity adjusting solution) | 1.2 | 25.0* | 1.2 | 1.2 |
| Filtering V-1 (after viscosity adjustment) | — | — | — | — |
| Filtering V-2 (after viscosity adjustment) | — | — | — | — |
| Filtering V-3 (after viscosity adjustment) | 1.2 | 1.2 | 6.0 | 15.0* |
| BC layer | | | | |
| Filtering VI (binder solution) | 5.0 | 5.0 | 5.0 | 5.0 |
| Filtering VII (after dispersion) | 15.0 | 15.0 | 15.0 | 15.0 |
| Filtering VIII (viscosity adjusting solution) | 1.2 | 1.2 | 1.2 | 1.2 |
| Filtering IX (after viscosity adjustment) | 1.2 | 1.2 | 1.2 | 1.2 |
| DO (5 μs-10 dB) after hot humid storage** | 1.0 | 1.4 | 1.7 | 1.8 |
| Y-C/N storage loss (dB) | 0.0 | −0.1 | −0.1 | −2.5 |
| Measurement format | Hi8 | Hi8 | Hi8 | Hi8 |
| Calender roll fouling (magnetic layer side) | ◯ | ◯ | ◯ | ◯ |
| Filtering system | | | | |
| parallel + circulatory filtration | ◯ | ◯ | ◯ | ◯ |
| multi-stage filtration | — | — | — | — |

*values outside the limited range
**Measured after tape samples were stored for 5 days in a 50° C./RH 80% environment and then allowed to stand for 24 hours in a 20° C./RH 60% environment.

TABLE 26

(Embodiment 9)

| | | Sample No. | | | | | |
|---|---|---|---|---|---|---|---|
| | | 9-10 | 9-11 | 9-12 | 9-13 | 9-14 | 9-15 |
| Paint Lower layer | | Magnetic layer | Non-Magnetic layer | Magnetic layer | Magnetic layer | Magnetic layer | Magnetic layer |
| Coating thickness($\mu$m) | Upper layer | 0.6 | 0.2 | 0.3 | 0.3 | 0.3 | 0.3 |
| | Lower layer | 1.4 | 1.8 | 1.7 | 1.7 | 1.7 | 1.7 |
| | BC layer | 0.5 | 0.5 | 0.5 | 0.5 | 0.5 | 0.5 |
| 95% cut filtration precision ($\mu$m) | | | | | | | |
| Upper layer | | | | | | | |
| Filtering I (binder solution) | | 5.0 | 5.0 | 5.0 | 5.0 | 5.0 | 5.0 |
| Filtering II (after kneading) | | 15.0 | 15.0 | 15.0 | 15.0 | 15.0 | 15.0 |
| Filtering III (after dispersion) | | 15.0 | 15.0 | 15.0 | 15.0 | 15.0 | 15.0 |
| Filtering IV (viscosity adjusting solution) | | 1.0 | 1.0 | 1.0 | 1.0 | 1.0 | 1.0 |
| Filtering V (after viscosity adjustment) | | 1.2 | 1.2 | 1.2 | 1.2 | 1.2 | 1.2 |
| Lower layer | | | | | | | |
| Filtering I-1 (binder solution) | | — | — | — | 75.0 | — | — |
| Filtering I-2 (binder solution) | | — | — | 15.0 | 15.0 | — | — |
| Filtering I-3 (binder solution) | | 5.0 | 5.0 | 5.0 | 5.0 | 5.0 | 5.0 |
| Filtering II (after kneading) | | 15.0 | 15.0 | 15.0 | 15.0 | 15.0 | 15.0 |
| Filtering III (after dispersion) | | 15.0 | 15.0 | 15.0 | 15.0 | 15.0 | 15.0 |
| Filtering IV-1 (viscosity adjusting solution) | | — | — | — | — | 6.0 | — |
| Filtering IV-2 (viscosity adjusting solution) | | — | — | — | — | 2.9 | — |
| Filtering IV-3 (viscosity adjusting solution) | | 1.2 | 1.2 | 1.2 | 1.2 | 1.2 | 1.2 |
| Filtering V-1 (after viscosity adjustment) | | — | — | — | — | — | 6.0 |
| Filtering V-2 (after viscosity adjustment) | | — | — | — | — | — | 2.9 |
| Filtering V-3 (after viscosity adjustment) | | 1.2 | 1.2 | 1.2 | 1.2 | 1.2 | 1.2 |
| BC layer | | | | | | | |
| Filtering VI (binder solution) | | 5.0 | 5.0 | 5.0 | 5.0 | 5.0 | 5.0 |
| Filtering VII (after dispersion) | | 15.0 | 15.0 | 15.0 | 15.0 | 15.0 | 15.0 |
| Filtering VIII (viscosity adjusting solution) | | 1.2 | 1.2 | 1.2 | 1.2 | 1.2 | 1.2 |
| Filtering IX (after viscosity adjustment) | | 1.2 | 1.2 | 1.2 | 1.2 | 1.2 | 1.2 |
| DO (5 $\mu$s-10 dB) after hot humid storage** | | 1.5 | 1.5 | 1.0 | 0.9 | 1.1 | 0.9 |
| Y-C/N storage loss (dB) | | 0.0 | 0.0 | 0.0 | 0.0 | 0.0 | 0.0 |
| Measurement format | | Hi8 | Hi8 | Hi8 | Hi8 | Hi8 | Hi8 |
| Calender roll fouling (magnetic layer side) | | ○ | ○ | ○ | ○ | ○ | ○ |
| Filtering system | | ○ | ○ | ○ | ○ | ○ | ○ |
| parallel + circulatory filtration | | — | — | ○ | ○ | ○ | ○ |
| multi-stage filtration | | — | — | ○ | ○ | ○ | ○ |

**Measured after tape samples were stored for 5 days in a 50° C./RH 80% environment and then allowed to stand for 24 hours in a 20° C./RH 60% environment.

The advantages of the invention are evident from the data shown in the Tables. More specifically, the samples wherein filters having a 95% cut filtration precision within the range of the invention were used in at least one of filtering steps I and IV and filtering step V during preparation of the lower layer-forming paint composition produced substantially less dropouts as compared with the comparative samples wherein a filter having a 95% cut filtration precision exceeding the range of the invention was used. It is also seen that dropouts were reduced by multi-stage filtration plus circulatory filtration. Additionally, the samples according to the invention exhibited a DO value after hot humid storage which was substantially unchanged from that immediately after preparation. The fact that these satisfactory results were obtained from the measurement after the storage in hot humid conditions using the rigorous standard that a dropout was countable when an output drop of 10 dB or more continued over 5 $\mu$s or longer suggests that the present invention is quite effective. Additionally, no substantial Y-C/N loss after hot humid storage was acknowledged in the samples prepared according to the invention.

In contrast, the comparative sample wherein filters having a 95% cut filtration precision exceeding the range of the invention were used in filtering steps I and IV during preparation of the lower layer-forming paint composition and the comparative sample wherein a filter having a 95% cut filtration precision exceeding the range of the invention was used in filtering step V substantially deteriorated their Y-C/N by storage under hot humid conditions. Also they exhibited less dropouts immediately after preparation, but a little more dropouts after hot humid storage.

Note that where a filter having a 95% cut filtration precision below the range of the invention was used in filtering step I, IV or V, a pressure loss of more than 10 kg/cm$^2$ occurred to prohibit formation of a paint composition.

We claim:

1. A method of preparing a magnetic recording medium having at least two layers of coating on at least one surface of a non-magnetic substrate, the uppermost layer of coating being a magnetic layer of 0.1 to 0.8 $\mu$m thick, comprising:

a step of preparing a paint composition for the uppermost layer of coating, including a paint filtering step of filtering the paint through at least one filter means including an ultimate filter means, the ultimate filter means used in the paint filtering step having a 95% cut filtration precision of 1.0 to 6.0 $\mu$m.

2. A method for preparing a magnetic recording medium according to claim 1 wherein the step of preparing a paint composition for the uppermost layer of coating includes a kneading step of kneading solids and a binder solution, a dispersing step of dispersing the solids in the compound resulting from the kneading step, and a viscosity adjusting step of adding a viscosity adjusting solution to the dispersion resulting from the dispersing step to form the paint composition.

3. A method for preparing a magnetic recording medium according to claim 1 wherein said magnetic recording medium has at least two layers of coating on the at least one surface of the non-magnetic substrate, the lowermost layer of coating thereof being a non-magnetic layer.

4. A method for preparing a magnetic recording medium according to claim 1 wherein said magnetic recording medium has at least two layers of coating on the at least one surface of the non-magnetic substrate, all of the at least two layers of coating being magnetic layers.

5. A method for preparing a magnetic recording medium according to claim 1 wherein the layers of coating on the non-magnetic substrate surface are formed by a wet-on-wet coating technique.

6. A method for preparing a magnetic recording medium having at least one layer of coating on at least one surface of a non-magnetic substrate, the uppermost layer of coating being a magnetic layer, comprising:

a step of preparing a paint composition for the uppermost layer of coating, including a paint filtering step of filtering the paint through at least one filter means including an ultimate filter means, the ultimate filter means used in the paint filtering step having a 95% cut filtration precision of up to 10 times the shortest recording wavelength and ranging from 6.0 µm to 1.0 µm.

7. A method for preparing a magnetic recording medium according to claim 6 wherein the step of preparing a paint composition for the uppermost layer of coating includes a kneading step of kneading solids and a binder solution, a dispersing step of dispersing the solids in the compound resulting from the kneading step, and a viscosity adjusting step of adding a viscosity adjusting solution to the dispersion resulting from the dispersing step to form the paint composition.

8. A method for preparing a magnetic recording medium according to claim 6 wherein in at least one filtering step, at least two filter means are serially disposed in a flowpath of a fluid to be filtered, and a filter means having a greater 95% cut filtration precision than said ultimate filter means is disposed upstream of said ultimate filter means.

9. A method for preparing a magnetic recording medium according to claim 8 wherein the filter means are disposed in said flowpath such that their 95% cut filtration precision may gradually decline from the upstream to the downstream side of the flowpath.

10. A method for preparing a magnetic recording medium according to claim 8 wherein the filter means disposed upstream of said ultimate filter means has a 95% cut filtration precision which is up to 20 times the 95% cut filtration precision of said ultimate filter means.

11. A method for preparing a magnetic recording medium according to claim 6 wherein said filter means includes a parallel filter means comprising at least two filters with an identical 95% cut filtration precision disposed parallel in a flowpath of a fluid to be filtered.

12. A method for preparing a magnetic recording to medium according to claim 6 wherein a fluid to be filtered is passed at least 2 times through a least one filter means for effecting circulatory filtration.

13. A method for preparing a magnetic recording medium according to claim 6 wherein said ultimate filter means includes a depth type filter.

14. A method for preparing a magnetic recording medium having a magnetic layer on a front surface of a non-magnetic substrate and a backcoat layer formed by coating on a back surface of the non-magnetic substrate, the backcoat layer having a thickness of up to 1.0 µm, comprising:

a step of preparing a paint composition for the backcoat layer, including a paint filtering step of filtering the paint through at least one filter means including an ultimate filter means, the ultimate filter means used in the paint filtering step having a 95% cut filtration precision ranging from of 1.0 to 6.0 µm and up to 10 times the thickness of said backcoat layer.

15. A method for preparing a magnetic recording medium according to claim 14 wherein the step of preparing a paint composition for the backcoat layer includes a dispersing step of dispersing solids in a binder solution and a viscosity adjusting step of adding a viscosity adjusting solution to the dispersion resulting from the dispersing step to form the paint composition.

16. A method for preparing a magnetic recording medium according to claim 14 wherein said magnetic recording medium has at least two layers of coating on the front surface of the non-magnetic substrate, the uppermost layer of coating being a magnetic layer of 0.1 to 0.8 µm thick, and comprising:

a step of preparing a paint composition for the uppermost layer of coating, including a paint filter step of filtering the paint through at least one filter means including an ultimate filter means, the ultimate filter means used in the paint filtering step having a 95% cut filtration precision of 1.0 to 6.0 µm.

17. A method for preparing a magnetic recording medium according to claim 14 wherein said magnetic recording medium has at least one layer of coating on the front surface of the non-magnetic substrate, the uppermost layer of coating being a magnetic layer, and comprising:

a step of preparing a paint composition for the uppermost layer of coating, including a paint filtering step of filtering the paint through at least one filter means including an ultimate filter means, the ultimate filter means used in the paint filtering step having a 95% cut filtration precision of up to 10 times the shortest recording wavelength and ranging from 6.0 µm to 1.0 µm.

18. A method for preparing a magnetic recording medium according to claim 16 or 17 wherein the step of preparing a paint composition for the uppermost layer of coating includes a kneading step of kneading solids and a binder solution, a dispersing step of dispersing the solids in the compound resulting from the kneading step, and a viscosity adjusting step of adding a viscosity adjusting solution to the dispersion resulting from the dispersing step to form the paint composition.

19. A method for preparing a magnetic recording medium having at least one layer of coating on at least one surface of a non-magnetic substrate, the uppermost layer of coating being a magnetic layer, comprising:

a step of preparing a paint composition for the uppermost layer of coating, including a kneading step of kneading solids and a binder-solution, a dispersing step of dispersing the solids in the compound resulting from the kneading step, and a viscosity adjusting step of adding a viscosity adjusting solution to the dispersion resulting from the dispersing step to form the paint composition, and further including at least one of a compound filtering step of filtering the compound through at least one filter means including an ultimate filter means, and a dispersion filtering step of filtering the dispersion through at least one filter means including an ultimate filter means, the ultimate filter means used in the compound filtering step and the dispersion filtering step both having a 95% cut filtration precision of at least 15 µm, and the ultimate filter means used in at least one of the compound filtering step and the dispersion filtering step having a 95% cut filtration precision of up to 80 µm.

20. A method for preparing a magnetic recording medium according to claim 19 wherein said magnetic recording medium has at least two layers of coating on the at least one surface of the non-magnetic substrate, the uppermost layer of coating being the magnetic layer of 0.1 to 0.8 µm thick, and the step of preparing a paint composition for the uppermost layer of coating includes a paint filtering step of filtering the paint through at least one filter means including an ultimate filter means, the ultimate filter means used in the paint filtering step having a 95% cut filtration precision of 1.0 to 6.0 µm.

21. A method for preparing a magnetic recording medium according to claim 19 wherein the step of preparing a paint composition for the uppermost layer of coating includes a paint filtering step of filtering the paint through at least one filter means including an ultimate filter means, the ultimate filter means used in the paint filtering step having a 95% cut filtration precision of up to 10 times the shortest recording wavelength and ranging from 6.0 µm to 1.0 µm.

22. A method for preparing a magnetic recording medium according to claim 19 wherein said magnetic recording medium has a backcoat layer formed by coating on a back surface of the non-magnetic substrate, the backcoat layer having a thickness of up to 1.0 µm, comprising:

a step of preparing a paint composition for the backcoat layer, including a dispersing step of dispersing solids in a binder solution and a viscosity adjusting step of adding a viscosity adjusting solution to the dispersion resulting from the dispersing step to form the paint composition, and further including a dispersion filtering step of filtering the dispersion through at least one filter means including an ultimate filter means, the ultimate filter means used in the dispersion filtering step having a 95% cut filtration precision of 15 to 80 µm.

23. A method for preparing a magnetic recording medium according to claim 22 wherein the step of preparing a paint composition for the backcoat layer includes a paint filtering step of filtering the paint through at least one filter means including an ultimate filter means, the ultimate filter means used in the paint filtering step having a 95% cut filtration precision ranging from 1.0 to 6.0 µm and up to 10 times the thickness of said backcoat layer.

24. A method for preparing a magnetic recording medium having at least one layer of coating on at least one surface of a non-magnetic substrate, the uppermost layer of coating being a magnetic layer, comprising:

a step of preparing a paint composition for the uppermost layer of coating, including a kneading step of kneading solids and a binder solution, a dispersing step of dispersing the solids in the compound resulting from the kneading step, and a viscosity adjusting step of adding a viscosity adjusting solution to the dispersion resulting from the dispersing step to form the paint composition, and further including at least one of a binder solution filtering step of filtering said binder solution through at least one filter means including an ultimate filter means, and a viscosity adjusting solution filtering step of filtering said viscosity adjusting solution through at least one filter means including an ultimate filter means, the ultimate filter means used in the binder solution filtering step having a 95% cut filtration precision of at least 4.0 µm and the ultimate filter means used in the viscosity adjusting solution filtering step having a 95% cut filtration precision of at least 1.0 µm, and at least one of the requirements that the ultimate filter means used in the binder solution filtering step has a 95% cut filtration precision of up to 80 µm and the ultimate filter means used in the viscosity adjusting viscosity adjusting solution filtering step has a 95% cut filtration precision of up to 30 µm is met.

25. A method for preparing a magnetic recording medium according to claim 24 wherein the step of preparing a paint composition for the uppermost layer of coating includes at least one step of a compound filtering step of filtering the compound through at least one filter means including an ultimate filter means, and a dispersion filtering step of filtering the dispersion through at least one filter means including an ultimate filter means, the ultimate filter means used in the compound filtering step and the dispersion filtering step both having a 95% cut filtration precision of at least 15 µm, and the ultimate filter means used in at least one of the compound filtering step and the dispersion filtering step having a 95% cut filtration precision of up to 80 µm.

26. A method for preparing a magnetic recording medium according to claim 24 wherein said magnetic recording medium has at least two layers of coating on the at least one surface of the non-magnetic substrate, the uppermost layer of coating being a magnetic layer of 0.1 to 0.8 µm thick, comprising:

the step of preparing a paint composition for the uppermost layer of coating, including a paint filtering step of filtering the paint through at least one filter means including an ultimate filter means, the ultimate filter means used in the paint filtering step having a 95% cut filtration precision of 1.0 to 6.0 µm.

27. A method for preparing a magnetic recording medium according to claim 24 wherein the step of preparing a paint composition for the uppermost layer of coating includes a paint filtering step of filtering the paint through at least one filter means including an ultimate filter means, the ultimate filter means used in the paint filtering step having a 95% cut filtration precision of up to 10 times the shortest recording wavelength and ranging from 6.0 µm to 1.0 µm.

28. A method for preparing a magnetic recording medium having a magnetic layer on a front surface of a non-magnetic substrate and a backcoat layer formed by coating on a back surface of the non-magnetic substrate, the backcoat layer having a thickness of up to 1.0 µm, comprising:

a step of preparing a paint composition for the backcoat layer of coating, including a dispersing step of dispersing solids in a binder solution and a viscosity adjusting step of adding a viscosity adjusting solution to the dispersion resulting from the dispersing step to form the paint composition, and further including at least one of a binder solution filtering step of filtering said binder solution through at least one filter means including an ultimate filter means, and a viscosity adjusting solution filtering step of filtering said viscosity adjusting solution through at least one filter means including an ultimate filter means, the ultimate filter means used in the binder solution filtering step having a 95% cut filtration precision of at least 4.0 µm and the ultimate filter means used in the viscosity adjusting solution filtering step having a 95% cut filtration precision of at least 1.0 µm, and least one of the requirements that the ultimate filter means used in the binder solution filtering step has a 95% cut filtration precision of up to 80 µm and the ultimate filter means used in the viscosity adjusting solution filtering step has a 95% cut filtration precision of up to 30 µm is met.

29. A method for preparing a magnetic recording medium according to claim 28 wherein the step of preparing a paint composition for the backcoat layer includes a dispersion filtering step of filtering the dispersion through at least one filter means including an ultimate filter means, the ultimate filter means used in the dispersion filtering step having a 95% cut filtration precision of 15 to 80 µm.

30. A method for preparing a magnetic recording medium according to claim 28 wherein the step of preparing a paint composition for the backcoat layer includes a paint filtering step of filtering the paint through at least one filter means including an ultimate filter means, the ultimate filter means used in the paint filtering step having a 95% cut filtration precision ranging from 1.0 µm to 6.0 µm and up to 10 times the thickness of the backcoat layer.

31. A method for preparing a magnetic recording medium according to claim 28 wherein said magnetic recording medium has at least one layer of coating on at least one surface of the non-magnetic substrate, the uppermost layer of coating being a magnetic layer, a step of preparing a paint composition for the uppermost layer of coating includes a kneading step of kneading solids and a binder solution, a dispersing step of dispersing the solids in the compound resulting from the kneading step, and a viscosity adjusting step of adding a viscosity adjusting solution to the dispersion resulting from the dispersing step to form the paint composition, and further includes at least one step of a binder solution filtering step of filtering said binder solution through at least one filter means and a viscosity adjusting solution filtering step of filtering said viscosity adjusting solution through at least one filter means, the ultimate filter means used in the binder solution filtering step has a 95% cut filtration precision of at least 4.0 µm and the ultimate filter means used in the viscosity adjusting solution filtering step has a 95% cut filtration precision of at least 1.0 µm, and at least one of the requirements that the ultimate filter means used in the binder solution filtering step has a 95% cut filtration precision of up to 80 µm and the ultimate filter means used in the viscosity adjusting solution filtering step has a 95% cut filtration precision of up to 30 µm is met.

32. A method for preparing a magnetic recording medium having at least two layers of coating on at least one surface of a non-magnetic substrate, the uppermost layer of coating being a magnetic layer of 0.1 to 0.8 µm thick, comprising:

a step of preparing a paint composition for a coating contiguous to at least the uppermost layer of coating, including a paint filtering step filtering the paint through at least one filter means including an ultimate filter means, the ultimate filter means used in the paint filtering step having a 95% cut filtration precision of 1.0 to 6.0 µm.

33. A method for preparing a magnetic recording medium according to claim 32 wherein the step of preparing a paint composition for a coating contiguous to at least the uppermost layer of coating includes a kneading step of kneading solids and a binder solution, a dispersing step of dispersing the solids in the compound resulting from the kneading step, and a viscosity adjusting step of adding a viscosity adjusting solution to the dispersion resulting from the dispersing step to form the paint composition.

34. A method for preparing a magnetic recording medium according to claim 32 wherein a step of preparing a paint composition for the uppermost layer of coating includes a paint filtering step of filtering the paint through at least one filter means including an ultimate filter means, the ultimate filter means used in the paint filtering step having a 95% cut filtration precision of 1.0 to 6.0 µm.

35. A method for preparing a magnetic recording medium according to claim 34 wherein the step of preparing a paint composition for the uppermost layer of coating includes a kneading step of kneading solids and a binder solution, a dispersing step of dispersing the solids in the compound resulting from the kneading step, and a viscosity adjusting step of adding a viscosity adjusting solution to the dispersion resulting from the dispersing step to form the paint composition.

36. A method for preparing a magnetic recording medium according to claim 32 wherein said magnetic recording medium has a backcoat layer formed by coating on a back surface of the non-magnetic substrate, the backcoat layer having a thickness of up to 1.0 µm, comprising:

a step of preparing a paint composition for the backcoat layer, including a paint filtering step of filtering the paint through at least one filter means including an ultimate filter means, the ultimate filter means used in the paint filtering step having a 95% cut filtration precision ranging from 1.0 µm to 6.0 µm and up to 10 times the thickness of said backcoat layer.

37. A method for preparing a magnetic recording medium according to claim 36 wherein the step of preparing a paint composition for the backcoat layer includes a dispersing step of dispersing solids in a binder solution and a viscosity adjusting step of adding a viscosity adjusting solution to the dispersion resulting from the dispersing step to form the paint composition.

38. A method for preparing a magnetic recording medium according to claim 36 wherein said magnetic recording medium has a backcoat layer formed by coating on a back surface of the non-magnetic substrate, the backcoat layer having a thickness of up to 1.0 µm, comprising:

a step of preparing a paint composition for the backcoat layer, including a dispersing step of dispersing solids in a binder solution and a viscosity adjusting step of adding a viscosity adjusting solution to the dispersion resulting from the dispersing step to form the paint composition, and further including a dispersion filtering step of filtering said dispersion through at least one filter means including an ultimate filter means, and a paint filtering step of filtering said paint composition through at least one filter means including an ultimate filter means, the ultimate filter means used in the dispersion filtering step having a 95% cut filtration precision ranging from 15 to 80 μm, and the ultimate filter means used in the paint filtering step having a 95% cut filtration precision ranging from 1.0 μm to 6.0 μm and up to 10 times the thickness of said backcoat layer.

39. A method for preparing a magnetic recording medium according to claim 32 wherein the step of preparing a paint composition for a coating contiguous to at least the uppermost layer of coating includes a kneading step of kneading solids and a binder solution, a dispersing step of dispersing the solids in the compound resulting from the kneading step, and a viscosity adjusting step of adding a viscosity adjusting solution to the dispersion resulting from the dispersing step to form the paint composition, and further includes at least one of a compound filtering step of filtering said compound through at least one filter means including an ultimate filter means, and a dispersion filtering step of filtering said dispersion through at least one filter means including an ultimate filter means, the ultimate filter means used in the compound filtering step and the dispersion filtering step both having a 95% cut filtration precision of at least 15 μm, and the ultimate filter means used in at least one of the compound filtering step and the dispersion filtering step having a 95% cut filtration precision of up to 80 μm.

40. A method for preparing a magnetic recording medium according to claim 39 wherein the step of preparing a paint composition for the uppermost layer of coating includes a kneading step of kneading solids and a binder solution, a dispersing step of dispersing the solids in the compound resulting from the kneading step, and a viscosity adjusting step of adding a viscosity adjusting solution to the dispersion resulting from the dispersing step to form the paint composition, and further includes at least one of a compound filtering step of filtering said compound through at least one filter means including an ultimate filter means, and a dispersion filtering step of filtering said dispersion through at least one filter means including an ultimate filter means, and a paint filtering step of filtering the paint through at least one filter means including an ultimate filter means, the ultimate filter means used in the compound filtering step and the dispersion filtering step both having a 95% cut filtration precision of at least 15 μm, the ultimate filter means used in at least one of the compound filtering step and the dispersion filtering step having a 95% cut filtration precision of up to 80 μm, and the ultimate filter means used in the paint filtering step having a 95% cut filtration precision of 1.0 to 6.0 μm.

41. A method for preparing a magnetic recording medium according to claim 32 wherein the step of preparing a paint composition for a coating contiguous to at least the uppermost layer of coating includes a kneading step of kneading solids and a binder solution, a dispersing step of dispersing the solids in the compound resulting from the kneading step, and a viscosity adjusting step of adding a viscosity adjusting solution to the dispersion resulting from the dispersing step to form the paint composition, and further includes at least one of a binder solution filtering step of filtering said binder solution through at least one filter means including an ultimate filter means, and a viscosity adjusting solution filtering step of filtering said viscosity adjusting solution through at least one filter means including an ultimate filter means, the ultimate filter means used in the binder solution filtering step having a 95% cut filtration precision of at least 4.0 μm, the ultimate filter means used in the viscosity adjusting solution filtering step having a 95% cut filtration precision of at least 1.0 μm, and at least one of the requirements that the ultimate filter means used in the binder solution filtering step has a 95% cut filtration precision of up to 80 μm and the ultimate filter means used in the viscosity adjusting solution filtering step has a 95% cut filtration precision of up to 30 μm is met.

42. A method for preparing a magnetic recording medium according to claim 41 wherein the step of preparing a paint composition for the uppermost layer of coating includes a kneading step of kneading solids and a binder solution, a dispersing step of dispersing the solids in the compound resulting from the kneading step, and a viscosity adjusting step of adding a viscosity adjusting solution to the dispersion resulting from the dispersing step to form the paint composition, and further includes at least one of a binder solution filtering step of filtering said binder solution through at least one filter means including an ultimate filter means, and a viscosity adjusting solution filtering step of filtering said viscosity adjusting solution through at least one filter means including an ultimate filter means, and a paint filtering step of filtering the paint through at least one filter means including an ultimate filter means, the ultimate filter means used in the binder solution filtering step having a 95% cut filtration precision of at least 4.0 μm, the ultimate filter means used the viscosity adjusting solution filtering step having a 95% cut filtration precision of at least 1.0 μm, at least one of the requirements that the ultimate filter means used in the binder solution filtering step has a 95% cut filtration precision of up to 80 μm and the ultimate filter means used in the viscosity adjusting solution filtering step has a 95% cut filtration precision of up to 30 μm is met, and the ultimate filter means used in the paint filtering step having a 95% cut filtration precision of 1.0 to 6.0 μm.

43. A method for preparing a magnetic recording medium according to claim 41 wherein said magnetic recording medium has a backcoat layer formed by coating on a back surface of the non-magnetic substrate, the backcoat layer having a thickness of up to 1.0 μm, comprising:

a step of preparing a paint composition for the backcoat layer, including a dispersing step of dispersing solids in a binder solution and a viscosity adjusting step of adding a viscosity adjusting solution to the dispersion resulting from the dispersing step to form the paint composition, and further including at least one of a binder solution filtering step of filtering said binder solution through at least one filter means including an ultimate filter means, and a viscosity adjusting solution filtering step of filtering said viscosity adjusting solution through at least one filer means including an ultimate filter means, and a paint filtering step of filtering the paint through at least one filter means including an ultimate filter means, the ultimate filter means used in the binder solution filtering step having a 95% cut filtration precision of at least 4.0 pm, the ultimate filter means used in the viscosity adjusting solution filtering step having a 95% cut filtration precision of at least 1.0 μm, at least one of the requirements that the ultimate filter means used in the binder solution filtering step has a 95% cut filtration precision of up to 80 μm and the ultimate filter means used in the viscosity adjusting solution filtering step has a 95% cut filtration precision of up to 30 μm is met, and the ultimate filter means used in the paint filtering step having a 95% cut filtration precision of from 1.0 μm to 6.0 μm.

* * * * *